(12) United States Patent
Brockman et al.

(10) Patent No.: US 8,712,871 B2
(45) Date of Patent: Apr. 29, 2014

(54) METHOD AND APPARATUS FOR SUPPORTING DELIVERY, SALE AND BILLING OF PERISHABLE AND TIME-SENSITIVE GOODS SUCH AS NEWSPAPERS, PERIODICALS AND DIRECT MARKETING AND PROMOTIONAL MATERIALS

(75) Inventors: Gary B. Brockman, Marietta, GA (US); John Philip Modisette, Lawrenceville, GA (US); John C. Mellott, Marietta, GA (US)

(73) Assignee: Cox Enterprises, Inc., Atlanta, GA (US)

( * ) Notice: Subject to any disclaimer, the term of this patent is extended or adjusted under 35 U.S.C. 154(b) by 0 days.

(21) Appl. No.: 13/324,269

(22) Filed: Dec. 13, 2011

(65) Prior Publication Data

US 2012/0109799 A1 May 3, 2012

Related U.S. Application Data

(62) Division of application No. 12/604,453, filed on Oct. 23, 2009, now Pat. No. 8,117,095, which is a division of application No. 10/318,237, filed on Dec. 13, 2002, now Pat. No. 7,627,535.

(51) Int. Cl.
*G06Q 10/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | |
|---|---|---|
| 5,666,493 A | 9/1997 | Wojcik et al. |
| 5,797,113 A | 8/1998 | Kambe et al. |
| 6,385,537 B2 | 5/2002 | Gaspard, II |
| 6,401,085 B1 | 6/2002 | Gershman et al. |
| 6,408,243 B1 | 6/2002 | Yofu |
| 6,411,897 B1 | 6/2002 | Gaspard, II |
| 6,425,525 B1 | 7/2002 | Swaminathan et al. |
| 6,535,857 B1 | 3/2003 | Clarke et al. |
| 7,257,552 B1 | 8/2007 | Franco |
| 7,734,478 B2 | 6/2010 | Goodall et al. |
| 2001/0047285 A1 | 11/2001 | Borders et al. |
| 2002/0004703 A1 | 1/2002 | Gaspard, II |
| 2002/0019761 A1 | 2/2002 | Lidow |

(Continued)

FOREIGN PATENT DOCUMENTS

| | | |
|---|---|---|
| EP | 1113378 A2 | 7/2001 |
| GB | 2364800 | 2/2002 |
| JP | 2002183264 | 6/2002 |

OTHER PUBLICATIONS

Web site information: www.singlecopy.com (copyright 2002).

(Continued)

*Primary Examiner* — Seye Iwarere
(74) *Attorney, Agent, or Firm* — Nixon & Vanderhye P.C.

(57) ABSTRACT

Tracking, controlling, optimizing, and otherwise managing the delivery of goods with a web server, a database server, and handheld computers. A database has at least route delivery information. At least portions of the database are communicated to respective handheld devices for display. Time-sensitive goods may be delivered based on information displayed on the handheld devices, which are also used to collect information during delivery. The collected information is communicated to the database for buffing, reporting and analysis.

8 Claims, 59 Drawing Sheets

(56) References Cited

U.S. PATENT DOCUMENTS

| | | | |
|---|---|---|---|
| 2002/0055818 A1 | 5/2002 | Gaspard, II | |
| 2002/0072945 A1 | 6/2002 | Yang | |
| 2003/0061086 A1 | 3/2003 | Chen et al. | |
| 2003/0114206 A1 | 6/2003 | Timothy et al. | |
| 2003/0195791 A1 | 10/2003 | Waller et al. | |
| 2004/0054607 A1 | 3/2004 | Waddington et al. | |
| 2004/0210489 A1 | 10/2004 | Jackson et al. | |
| 2005/0055260 A1 | 3/2005 | Yamamoto | |
| 2005/0194437 A1 | 9/2005 | Dearing et al. | |
| 2005/0216553 A1* | 9/2005 | Mallonee et al. | 709/203 |
| 2006/0085250 A1* | 4/2006 | Kantarjiev et al. | 705/11 |
| 2007/0112647 A1* | 5/2007 | Borders et al. | 705/27 |
| 2008/0275643 A1* | 11/2008 | Yaqub et al. | 701/209 |
| 2010/0042463 A1 | 2/2010 | Brockman et al. | |

OTHER PUBLICATIONS

Nayalkar, Supriya, "Cyberbook Ensures Print Delivery," www.naa.org, NAA®: TechNews vol. 6, No. 2 (Mar./Apr. 2000).

Enterprise Solutions, "The Atlanta Journal-Constitution boosts sales force productivity by 30% while improving service for customers and advertisers," 2 pages (2001).

Cole's Newswire, Mar. 8, 2000, vol. 6, No. 10, "Advanced Technical Solutions Inc.," 6 pages.

America, Anna, "Powell Applauds Papers," TechNews, San Francisco, CA, pp. 1 & 46 (Jun. 18, 2000).

SMC Palm Screens, 7 pages (last modified Mar. 21, 2001).

SMC Palm Unit Reference Card, AJC Direct.

SMC Web Site Reference Card, Version 2.0, Revised Apr. 25, 2001.

PalmX Route Accounting, Home page, www.palmx.com (copyright 2002), Profile, Services, Customer Care, Route Accounting Suite, General Manager Professional, Route Salesman 3, Visual Analyst, Connect, General Manager Professional GARAGE, Test Drive PalmX Products.

Mobile Products and Solutions from Symbol Technologies, www.symbol.com/products/mobile.

Stefanie Scott, "From the truck to the store," Beverage Industry, v100 n4, pp. 56-58 (Apr. 2009).

* cited by examiner

Fig. 2 A typical day in the life of a single copy manager and staff

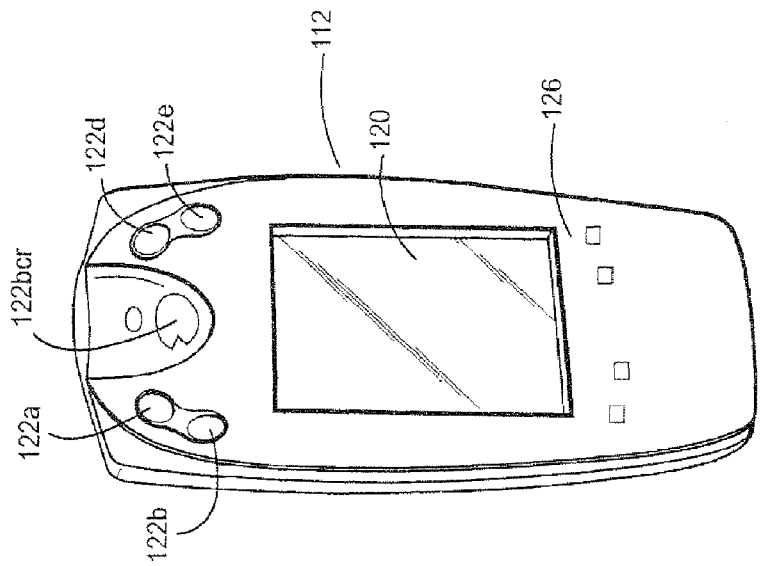
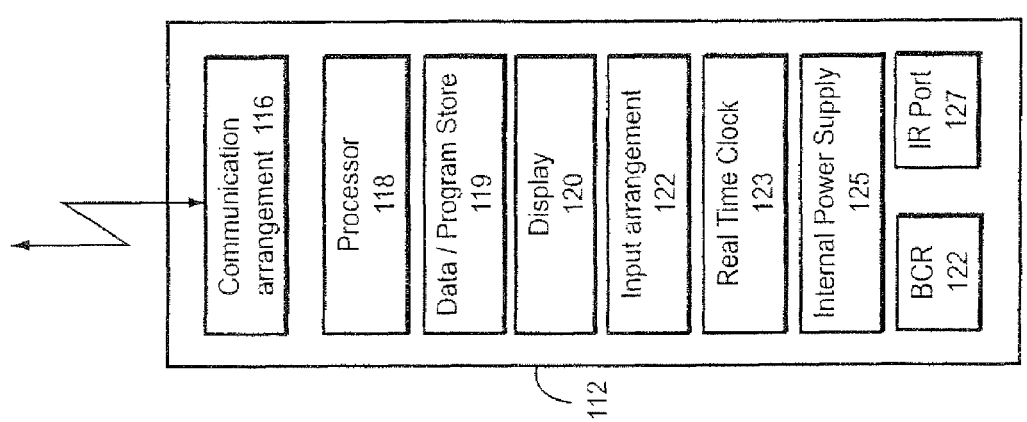
Fig. 3B
Fig. 3A

| | |
|---|---|
| RTE-ROUTE-NBR | route number |
| RTE-DAZ-CODE | department, area, zone code |
| RTE-DIST-NBR | district number |
| RTE-MULTIPLE-ROUTE-INDICATOR | multiple route access indicator |
| RTE-PRIMARY-ROUTE-NBR | primary route number |
| RTE-SECONDARY-ROUTE-NBR-1 | secondary route number -1 |
| RTE-SECONDARY-ROUTE-NBR-2 | secondary route number -2 |
| RTE-SECONDARY-ROUTE-NBR-3 | secondary route number -3 |
| RTE-DIV-MGR-NAME | division managers name |
| RTE-DIV-MGR-PAGER-NBR | division manager's pager number |
| RTE-DIV-MGR-EMAIL | division manager's email address |
| RTE-DIV-MGR-PRIORITY-NBR | division mgr contact priority number |
| RTE-AREA-MGR-NAME | area manager's name |
| RTE-AREA-MGR-PAGER | area manager's pager number |
| RTE-AREA-MGR-EMAIL | area manager's email address |
| RTE-AREA-MGR-PRIORITY-NBR | area manager's contact priority number |
| RTE-ROUTE-MGR-NAME | route manager's name |
| RTE-ROUTE-MGR-PAGER-NBR | route manager's pager number |
| RTE-ROUTE-MGR-EMAIL | route manager's email address |
| RTE-ROUTE-MGR-PRIORITY-NBR | route manager's contact priority number |
| RTE-BRANCH-OFFICE-NBR | branch office phone number |
| RTE-ASST-ROUTE-MGR-NAME | route manager's name |
| RTE-ASST-ROUTE-MGR-PAGER-NBR | route manager's pager number |
| PTE-ASST-ROUTE-MGR-EMAIL | route manager's email address |
| RTE-ROUTE-MGR-PRIORITY-NBR | route manager's contact priority number |

*Fig. 10*: Example Route Table Database

| | | |
|---|---|---|
| OUTLET-NUMBER | outlet number | numeric 8 bytes |
| OUTLET-NAME | outlet name | alphanumeric 32 bytes |
| OUTLET-TYPE-CODE | outlet type code | alphanumeric 4 bytes |
| OUTLET-ROUTE-NBR | outlet route number | alphanumeric 4 bytes |
| OUTLET-DIST-NBR | outlet district number | alphanumeric 4 bytes |
| OUTLET-DAZ-CODE | outlet department, area, zone code | alphanumeric 6 bytes |
| OUTLET-ADDR | outlet address | alphanumeric 30 bytes |
| OUTLET-ADDR-UNIT-NBR | outlet address unit number | alphanumeric 10 bytes |
| OUTLET-MGR-NAME | outlet manager's name | alphanumeric 32 bytes |
| OUTLET-PHONE-NBR | outlet phone number | alphanumeric 10 bytes |
| OUTLET-INFO | outlet information | alphanumeric 100 bytes |
| OUTLET-DIRECTIONS | outlet directions | alphanumeric 100 bytes |
| OUTLET-SIGNATURE-INDICATOR | outlet signature indicator | alphanumeric 1 byte |
| OUTLET-RECEIPT-INDICATOR | outlet receipt indicator | alphanumeric 1 byte |
| OUTLET-RECEIPT-FREQUENCY | outlet receipt frequency | alphanumeric 1 byte |
| OUTLET-RECEIPT-TYPE | outlet receipt type | alphanumeric 1 byte |
| OUTLET-RECEIPT-DESTINATION | outlet receipt destination | alphanumeric 40 bytes |
| OUTLET-URGENT-INSTR | outlet urgent instructions | alphanumeric 100 bytes |
| OUTLET-DELIVERY-MESSAGE-SEL | outlet delivery message selection | alphanumeric 1 byte |

*Fig. 11*: *Example Outlet Table Database*

| Element Name | Description | Data Type |
|---|---|---|
| Outlet-Number | Outlet Number | Alphanumeric, 4 Bytes |
| Route-Number | Route nubmer this Outlet is assigned to | Numeric, 4 Digit |
| Stop-Number | Stop Number on this route | Numeric, 3 Digits |
| Trip-Num | Trip Number this outlet is assigned to | Numeric, 1 Byte |
| Draw | AJC Draw for the day and edition for this outlet | Numeric, 5 Digits |
| Num-Deliveries | Number of additional delivery types | Numeric, 2 Digits (1 Byte) |
| Num-Delivery-Type1 | Edition-Number | Numeric, 1 Digits (1 Byte) |
| Delivery-Draw1 | Draw for Delivery-Type1 | Numeric, 5 Digits |
| (Above Repeated for Num-Deliveries) | | |
| Num Shuffles | Number of paper types being shuffled | Numeric |
| Shuf-Pub-Date1 | Edition date | |
| Shuf-Pub-Type1 | Edition Type | Valid Edition-Number |
| Shuf-Quantity1 | Quantity, may be negative | Numeric |
| Urgent-Instructions | Urgent Instructions exist, see "Urgent Instructions" Database for text | Logical (T/F) |

Fig. 12:
Example Route List Database

| | |
|---|---|
| DRW-OUTLET-NBR (key) | draw outlet number |
| DRW-EDTN-CODE (key) | draw edition number |
| DRW-HST-MON-DATE 1 | Monday date (week 1) (yyyymmdd) |
| DRW-HST-EDTN-CODE 1 | edition code (week 1) |
| DRW-HST-CATG-CODE 1 | history catagory code (week 1) |
| DRW-HST-DRAW-QTY (1,1) | history draw (week 1, Monday) |
| DRW-HST-DRAW-QTY (1,2) | history draw (week 1, Tuesday) |
| DRW-HST-DRAW-QTY (1,3) | history draw (week 1, Wednesday) |
| DRW-HST-DRAW-QTY (1,4) | history draw (week 1, Thursday) |
| DRW-HST-DRAW-QTY (1,5) | history draw (week 1, Friday) |
| DRW-HST-DRAW-QTY (1,6) | history draw (week 1, Saturday) |
| DRW-HST-DRAW-QTY (1,7) | history draw (week 1, Sunday) |
| DRW-HST-RTRN-QTY (1,1) | history return (week 1, Monday) |
| DRW-HST-RTRN-QTY (1,2) | history return (week 1, Tuesday) |
| DRW-HST-RTRN-QTY (1,3) | history return (week 1, Wednesday) |
| DRW-HST-RTRN-QTY (1,4) | history return (week 1, Thursday) |
| DRW-HST-RTRN-QTY (1,5) | history return (week 1, Friday) |
| DRW-HST-RTRN-QTY (1,6) | history return (week 1, Saturday) |
| DRW-HST-RTRN-QTY (1,7) | history return (week 1, Sunday) |
| DRW-NET-SALES (1,1) | net sales (week 1, Monday) |
| DRW-NET-SALES (1,2) | net sales (week 1, Tuesday) |
| DRW-NET-SALES (1,3) | net sales (week 1, Wednesday) |
| DRW-NET-SALES (1,4) | net sales (week 1, Thursday) |
| DRW-NET-SALES (1,5) | net sales (week 1, Friday) |
| DRW-NET-SALES (1,6) | net sales (week 1, Saturday) |
| DRW-NET-SALES (1,7) | net sales (week 1, Sunday) |
| DRW-HST-MON-DATE 2 | Monday date (week 2)(yyyymmdd) |
| DRW-HST-EDTN-CODE 2 | history edition code (week 2) |
| DRW-HST-CATG-CODE 2 | history category code (week 2) |
| DRW-HST-DRAW-QTY (2,1) | history category (week 2, Monday) |
| DRW-HST-DRAW-QTY (2,2) | history draw (week2, Tuesday) |

●
●
●

*Fig. 13* :Example Draw History Database

| Edition-Number | Edition Name | Edition-Day | Edition-Symbol |
|---|---|---|---|
| 1 Byte | 20 Characters | 1 5 Characters | 4 Characters |
| 13 | Early Bird | Daily AM | 13 Con |
| 14 | Constitution | Daily AM | 14 Con |
| 15 | Daily Other1 | Daily | 15 Con |
| 16 | Daily Other2 | Daily | Unused |
| 22 | Journal | Daily PM | 22 Jnl |
| 24 | Final | Daily PM | 24 Jnl |
| 25 | Unused | Daily PM | Unused |
| 33 | Saturday | Saturday | 33 Sat |
| 34 | Saturday | Saturday | 34 Sat |
| 35 | Saturday | Saturday | 35 Sat |
| 36 | Saturday | Saturday | Unused |
| 37 | Saturday | Saturday | Unused |
| 41 | Sunday Bulldog | Sunday | 41 Bdog |
| 43 | Sunday | Sunday | 43 Sun |
| 44 | Sunday | Sunday | 44 Sun |
| 45 | Sunday | Sunday | 45 Sun |
| 46 | Unused | Sunday | Unused |
| 47 | Unused | Sunday | Unused |
| 51 | Sunday Double Deal | Sunday | 51 SDD |
| 70 | NYT Daily | Daily | NYT |
| 71 | NYT Saturday | Saturday | NYT |
| 72 | NYT Sunday | Sunday | NYT |
| 80 | IBD Daily | Daily | IBD |
| 81 | IBD Saturday | Saturday | IBD |
| 82 | Unused | Unused | Unused |

*Fig. 14* : Example Edition Table Database

| Element Name | Description |
|---|---|
| Outlet-Number | Outlet Number |
| Delivered | Number of the current AJC edition |
| Delivered1 | Number of papers delivered of Delivery-Type1 |
| (Above repeated for Num-Deliveries) | |
| Num-Return-Types | Number of return instances, an instance being a return of a date and type |
| Return-Date1 | Date of the return |
| Return-Type1 | Edition-Number |
| Return-Qty1 | Number of returned papers for this date and edition |
| Num-Shuffle-Type | Number of paper editions being shuffled |
| Shuffle-Type1 | The Edition Number of the first shuffle type |
| Shuffle-Date1 | Date |
| Shuffle-Qty1 | The number of shuffle papers for the first shuffle type |
| (Repeat for all Shuffle types) | |
| Report-item | Number of selected report item, zero if none |
| Report-Comments | Report Comments, if any entered on report screen, Null Terminated string. |

*Fig. 15* :Example Run Delivery Database

| Paper Type Verification | | | | |
|---|---|---|---|---|
| You selected the following products. | | | | |
| Route | AJC ✓ | | | |
| 0661 | 387 | 23 | 13 | 0 |

Trip Draw  387  ......  ......  ......

[ Back ]   [ OK ]

*Fig. 16O*

| Deliver Trip | |
|---|---|
| ECKERD DRUGS # 809 | |
| | Draw |
| COMPAQ | 12 |
| PRESERVE AT DEERFILED | 3 |
| SODEXHO MARRIOT GT | 12 |
| SODEXHO MARRIOT NORTE | 10 |
| CRESCENT CITY DINER | 6 |
| X  KROGER # 495 | 20 |
| ECKERD DRUGS # 8091 | 4 |
| AMACO # 4313 | 18 |

[ Back ]  [ Check Out ]  [ SELECT ]

*Fig. 16P*

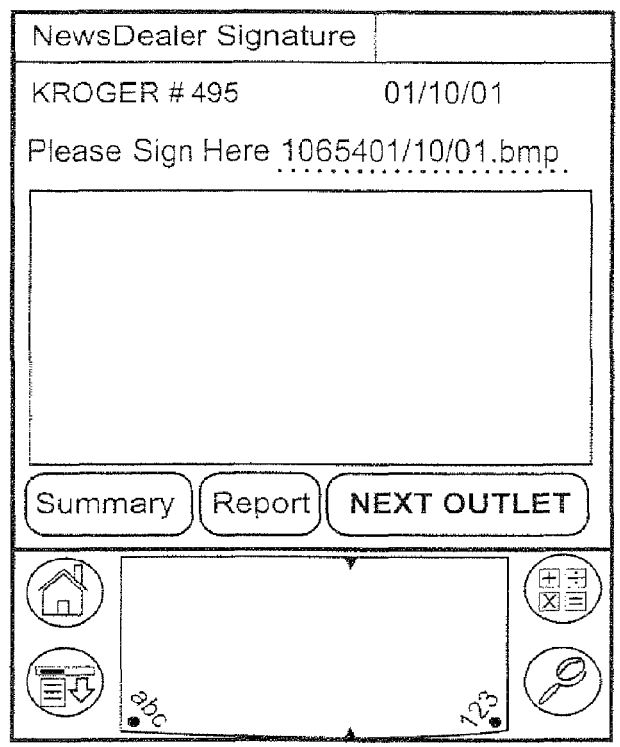
Fig. 16U1

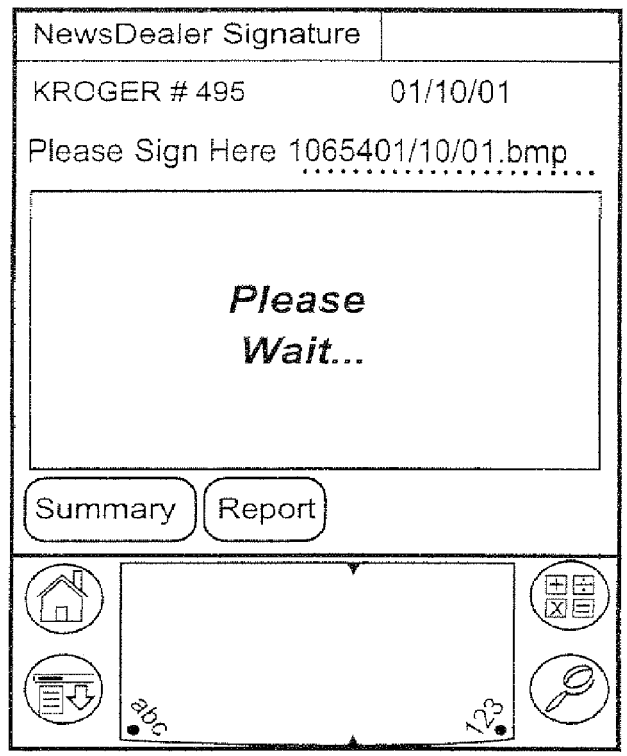
Fig. 16U2
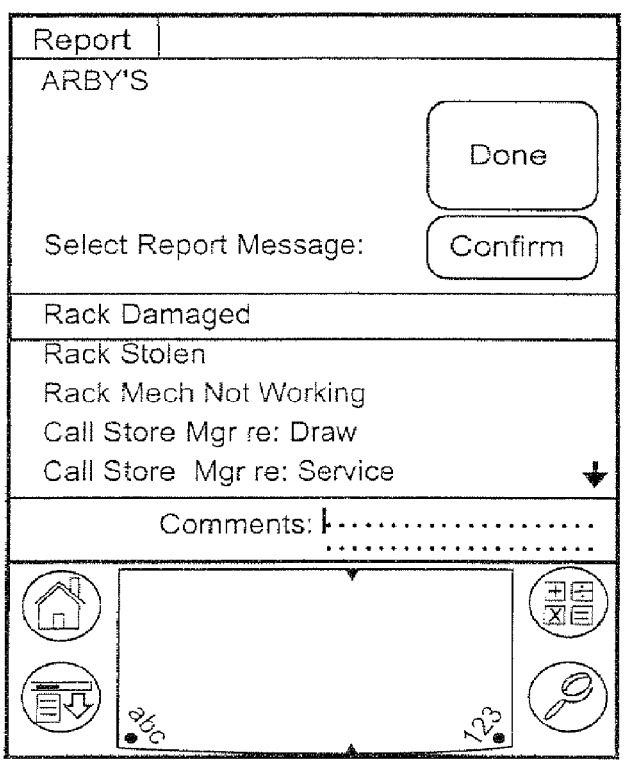
Fig. 16U3

*Fig. 16U4*
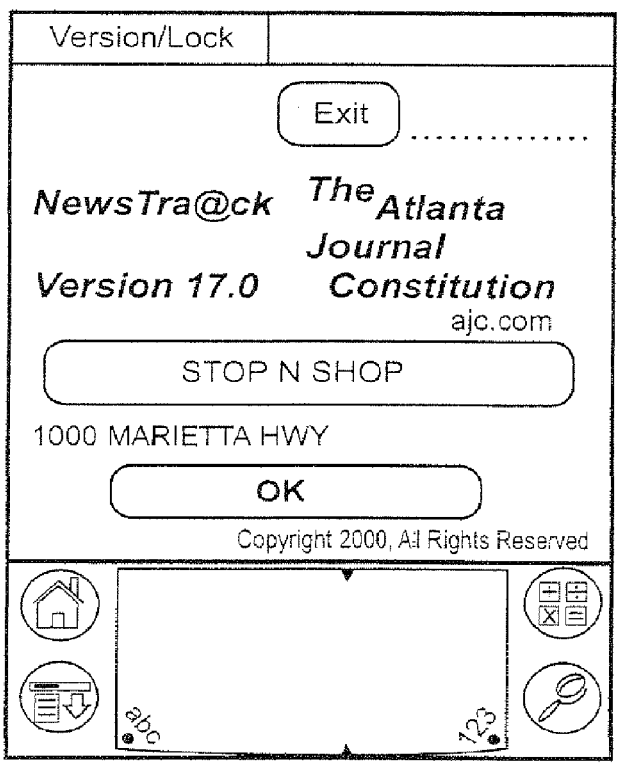
*Fig. 16U5*

6 Appendix - Reports 6.1 Daily Sales Summary by Route Report

Daily Sales Summary by Route

Select Date: Tuesday, June 6, 2000
Enter Branch Code: AP

| ROUTE | | EDITION | | | | | | | | | | | | | |
|---|---|---|---|---|---|---|---|---|---|---|---|---|---|---|---|
| | | 13 | | 14 | | 15 | | 22 | | 24 | | IBD | | NYT | |
| | | Orig | Final | Orig | Final | Orig | Final | Orig | Final | Orig | Final | Orig | Final | Orig | Final |
| 3603-0622 | Draw | 300 | 300 | 0 | 0 | 120 | 120 | 200 | 200 | 0 | 0 | 10 | 10 | 20 | 20 |
| | Returns | | 54 | | 0 | | 34 | | 46 | | 0 | | 3 | | 7 |
| | Sales | | 246 | | 0 | | 86 | | 154 | | 0 | | 7 | | 13 |
| | Rtns% | | 18.0% | | #### | | 28.3% | | 23.0% | | #### | | 30.0% | | 35.0% |
| | R Sellouts | | 7 | | 0 | | 0 | | 5 | | 0 | | 0 | | 0 |
| | N Sellouts | | 11 | | 0 | | 4 | | 7 | | 0 | | 1 | | 1 |
| | # Outlets | | 47 | | 0 | | 26 | | 43 | | 0 | | 2 | | 2 |
| | Sellout % | | 38.3% | | #### | | 15.4% | | 27.9% | | #### | | 50.0% | | 50.0% |
| 3603-0631 | Draw | 400 | 403 | 0 | 0 | 150 | 150 | 240 | 240 | 0 | 0 | 5 | 5 | 10 | 10 |
| | Returns | | 102 | | 0 | | 31 | | 98 | | 0 | | 3 | | 3 |
| | Sales | | 301 | | 0 | | 119 | | 142 | | 0 | | 2 | | 7 |
| | Rtns% | | 25.3% | | #### | | 20.7% | | 40.8% | | #### | | 60.0% | | 30.0% |
| | R Sellouts | | 7 | | 0 | | 0 | | 5 | | 0 | | 0 | | 0 |
| | N Sellouts | | 11 | | 0 | | 4 | | 7 | | 0 | | 1 | | 1 |
| | # Outlets | | 47 | | 0 | | 26 | | 43 | | 0 | | 2 | | 2 |
| | Sellout % | | 38.3% | | #### | | 15.4 | | 27.9% | | #### | | 50.0% | | 50.0% |
| 3603-0642 | Draw | 325 | 325 | 0 | 0 | 100 | 100 | 200 | 200 | 0 | 0 | 0 | 0 | 0 | 0 |
| | Returns | | 121 | | 0 | | 12 | | 56 | | 0 | | 0 | | 0 |
| | Sales | | 204 | | 0 | | 88 | | 144 | | 0 | | 0 | | 0 |
| | Rtns% | | 37.2% | | #### | | 12.0% | | 28.0% | | #### | | #### | | #### |
| | R Sellouts | | 7 | | 0 | | 0 | | 5 | | 0 | | 0 | | 0 |
| | N Sellouts | | 11 | | 0 | | 4 | | 7 | | 0 | | 1 | | 1 |
| | # Outlets | | 47 | | 0 | | 26 | | 43 | | 0 | | 2 | | 2 |
| | Sellout % | | 38.3% | | #### | | 15.4% | | 27.9% | | #### | | 50.0% | | 50.0% |
| 3603-0643 HOTEL ROUTE | Draw | 200 | 200 | 0 | 0 | 0 | 0 | 0 | 0 | 0 | 0 | 0 | 0 | 0 | 0 |
| | Returns | | 15 | | 0 | | 0 | | 0 | | 0 | | 0 | | 0 |
| | Sales | | 185 | | 0 | | 0 | | 0 | | 0 | | 0 | | 0 |
| | Rtns% | | 7.5% | | #### | | #### | | #### | | #### | | #### | | #### |
| | R Sellouts | | 7 | | 0 | | 0 | | 5 | | 0 | | 0 | | 0 |
| | N Sellouts | | 11 | | 0 | | 4 | | 7 | | 0 | | 1 | | 1 |
| | # Outlets | | 47 | | 0 | | 26 | | 43 | | 0 | | 2 | | 2 |
| | Sellout % | | 38.3% | | #### | | 15.4% | | 27.9% | | #### | | 50.0% | | 50.0% |
| TOTALS | Draw | 2780 | 2783 | 0 | 0 | 1060 | 1060 | 1675 | 1979 | 0 | 0 | 93 | 93 | 150 | 150 |
| | Returns | | 736 | | 0 | | 237 | | 609 | | 0 | | 41 | | 53 |
| | Sales | | 2047 | | 0 | | 823 | | 1070 | | 0 | | 52 | | 97 |
| | Rtns% | | 26.4% | | #### | | 22.4% | | 36.3% | | #### | | 44.1% | | 35.3% |
| | R Sellouts | | 71 | | 0 | | 1 | | 51 | | 0 | | 0 | | 0 |
| | N Sellouts | | 112 | | 0 | | 42 | | 76 | | 0 | | 10 | | 10 |
| | # Outlets | | 490 | | 0 | | 274 | | 450 | | 0 | | 24 | | 24 |
| | Sellout % | | 37.3% | | #### | | 15.7% | | 28.2% | | #### | | 41.7% | | 41.7% |

| TOTAL CONSTITUTION | Draw | 3840 3843 |
|---|---|---|
| | Returns | 973 |
| | Sales | 2870 |
| | Rtns% | 25.3% |

| TOTAL JOURNAL | Draw | 1675 1679 |
|---|---|---|
| | Returns | 609 |
| | Sales | 1070 |
| | Rtns% | 36.3% |

*Fig. 18*

6.2 Daily Sales Summary by Branch Report

| | | Daily Sales Summary by Branch | | | | | | | | | | | | |
|---|---|---|---|---|---|---|---|---|---|---|---|---|---|---|
| | | Select Date | | | Tuesday, June 6, 2000 | | | | | | | | | |
| | | Enter Department Code | | | NO | | | | | | | | | |
| | | EDITION | | | | | | | | | | | | |
| | | 13 | | 14 | | 15 | | 22 | | 24 | | IBD | | NYT | |
| ROUTE | | Orig | Final | Orig | Final | Orig | Final | Orig | Final | Orig | Final | Orig | Final | Orig | Final |
| Alpharetta | Draw | 2780 | 2783 | 0 | 0 | 1060 | 1060 | 1675 | 1679 | 0 | 0 | 93 | 93 | 150 | 150 |
| | Returns | | 736 | | 0 | | 237 | | 609 | | 0 | | 41 | | 53 |
| | Sales | | 2047 | | 0 | | 823 | | 1070 | | 0 | | 52 | | 97 |
| | Rtns% | | 26.4% | | #### | | 22.4% | | 36.3% | | #### | | 44.1% | | 35.3% |
| | R Sellouts | | 71 | | 0 | | 1 | | 51 | | 0 | | 0 | | 0 |
| | N Sellouts | | 112 | | 0 | | 42 | | 76 | | 0 | | 10 | | 10 |
| | # Outlets | | 490 | | 0 | | 274 | | 450 | | 0 | | 24 | | 24 |
| | Sellout % | | 37.3% | | #### | | 15.7% | | 28.2% | | #### | | 41.7% | | 41.7% |
| Bartow County | Draw | 400 | 403 | 0 | 0 | 0 | 0 | 240 | 240 | 0 | 0 | 0 | 0 | 0 | 0 |
| | Returns | | 102 | | 0 | | 0 | | 98 | | 0 | | 0 | | 0 |
| | Sales | | 301 | | 0 | | 0 | | 142 | | 0 | | 0 | | 0 |
| | Rtns% | | 25.3% | | #### | | #### | | 40.8% | | #### | | #### | | #### |
| | R Sellouts | | 7 | | 0 | | 0 | | 5 | | 0 | | 0 | | 0 |
| | N Sellouts | | 11 | | 0 | | 0 | | 7 | | 0 | | 0 | | 0 |
| | # Outlets | | 47 | | 0 | | 0 | | 43 | | 0 | | 0 | | 0 |
| | Sellout % | | 38.3% | | #### | | #### | | 27.9% | | #### | | #### | | #### |
| Cherokee County | Draw | 1900 | 1900 | 0 | 0 | 0 | 0 | 750 | 750 | 0 | 0 | 0 | 0 | 0 | 0 |
| | Returns | | 342 | | 0 | | 0 | | 176 | | 0 | | 0 | | 0 |
| | Sales | | 1558 | | 0 | | 0 | | 574 | | 0 | | 0 | | 0 |
| | Rtns% | | 18.0% | | #### | | #### | | 23.5% | | #### | | #### | | #### |
| | R Sellouts | | 19 | | 0 | | 0 | | 14 | | 0 | | 0 | | 0 |
| | N Sellouts | | 15 | | 0 | | 0 | | 15 | | 0 | | 0 | | 0 |
| | # Outlets | | 167 | | 0 | | 0 | | 164 | | 0 | | 0 | | 0 |
| | Sellout % | | 20.4% | | #### | | #### | | 17.7 | | #### | | #### | | #### |
| NW Perimeter | Draw | 2240 | 2240 | 0 | 0 | 750 | 750 | 1250 | 1250 | 0 | 0 | 35 | 35 | 80 | 80 |
| | Returns | | 632 | | 0 | | 165 | | 237 | | 0 | | 14 | | 24 |
| | Sales | | 1608 | | 0 | | 585 | | 1013 | | 0 | | 21 | | 56 |
| | Rtns% | | 28.2% | | #### | | 22.0% | | 19.0% | | #### | | 40.0% | | 30.0% |
| | R Sellouts | | 36 | | 0 | | 10 | | 17 | | 0 | | 0 | | 0 |
| | N Sellouts | | 27 | | 0 | | 26 | | 21 | | 0 | | 1 | | 3 |
| | # Outlets | | 321 | | 0 | | 215 | | 310 | | 0 | | 7 | | 9 |
| | Sellout % | | 19.6% | | #### | | 16.7% | | 12.3% | | #### | | 14.3% | | 33.3% |
| TOTALS | Draw | 7320 | 7326 | 0 | 0 | 1810 | 1810 | 3915 | 3915 | 0 | 0 | 128 | 128 | 230 | 230 |
| | Returns | | 1812 | | 0 | | 402 | | 1120 | | 0 | | 55 | | 77 |
| | Sales | | 5514 | | 0 | | 1408 | | 2799 | | 0 | | 73 | | 153 |
| | Rtns% | | 24.7% | | #### | | 22.2% | | 28.6% | | #### | | 43.0% | | 33.5% |
| | R Sellouts | | 133 | | 0 | | 11 | | 87 | | 0 | | 0 | | 0 |
| | N Sellouts | | 165 | | 0 | | 68 | | 119 | | 0 | | 11 | | 13 |
| | # Outlets | | 1,025 | | 0 | | 489 | | 967 | | 0 | | 31 | | 33 |
| | Sellout % | | 29.1% | | #### | | 16.2% | | 21.3% | | #### | | 35.5% | | 39.4% |

| TOTAL CONSTITUTION | Draw | 9130 | 9136 |
|---|---|---|---|
| | Returns | | 2214 |
| | Sales | | 6922 |
| | Rtns% | | 24.2% |

| TOTAL JOURNAL | Draw | 3915 | 3919 |
|---|---|---|---|
| | Returns | | 1120 |
| | Sales | | 2799 |
| | Rtns% | | 28.6% |

Fig. 19

6.3 Daily Sales by Department Report

| Daily Sales Summary by Department |||||||||||||||
|---|---|---|---|---|---|---|---|---|---|---|---|---|---|---|
| Select Date | | Tuesday, June 6, 2000 ||||||||||||
| | | EDITION ||||||||||||
| | | 13 || 14 || 15 || 22 || 24 || IBD || NYT ||
| ROUTE | | Orig | Final | Orig | Final | Orig | Final | Orig | Final | Orig | Final | Orig | Final | Orig | Final |
| East Department | Draw | 9880 | 9880 | 0 | 0 | 2300 | 2300 | 4560 | 4560 | 0 | 0 | 200 | 200 | 600 | 600 |
| | Returns | | 2654 | | 0 | | 521 | | 1231 | | 0 | | 41 | | 175 |
| | Sales | | 7226 | | 0 | | 1779 | | 3329 | | 0 | | 159 | | 425 |
| | Rtns% | | 26.9% | | #### | | 22.7% | | 27.0% | | #### | | 20.5% | | 29.2% |
| | R Sellouts | | 234 | | 0 | | 65 | | 321 | | 0 | | 0 | | 5 |
| | N Sellouts | | 198 | | 0 | | 123 | | 179 | | 0 | | 10 | | 8 |
| | # Outlets | | 1,254 | | 0 | | 543 | | 1,210 | | 0 | | 45 | | 77 |
| | Sellout % | | 34.4% | | #### | | 34.6% | | 41.3% | | #### | | 22.2% | | 16.9% |
| North Department | Draw | 7320 | 7326 | 0 | 0 | 1810 | 1810 | 3915 | 3919 | 0 | 0 | 128 | 128 | 230 | 230 |
| | Returns | | 1812 | | 0 | | 402 | | 1120 | | 0 | | 55 | | 77 |
| | Sales | | 5514 | | 0 | | 1408 | | 2799 | | 0 | | 73 | | 153 |
| | Rtns% | | 24.7% | | #### | | 22.2% | | 28.6% | | #### | | 43.0% | | 33.5% |
| | R Sellouts | | 133 | | 0 | | 11 | | 87 | | 0 | | 0 | | 0 |
| | N Sellouts | | 165 | | 0 | | 68 | | 119 | | 0 | | 11 | | 13 |
| | # Outlets | | 1,025 | | 0 | | 489 | | 967 | | 0 | | 31 | | 33 |
| | Sellout % | | 29.1% | | #### | | 16.2% | | 21.3% | | #### | | 35.5% | | 39.4% |
| Northeast Department | Draw | 9880 | 9880 | 0 | 0 | 2300 | 2300 | 4560 | 4560 | 0 | 0 | 200 | 200 | 600 | 600 |
| | Returns | | 2654 | | 0 | | 521 | | 1231 | | 0 | | 41 | | 175 |
| | Sales | | 7226 | | 0 | | 1779 | | 3329 | | 0 | | 159 | | 425 |
| | Rtns% | | 26.9% | | #### | | 22.7% | | 27.0% | | #### | | 20.5% | | 29.2% |
| | R Sellouts | | 234 | | 0 | | 65 | | 321 | | 0 | | 0 | | 5 |
| | N Sellouts | | 198 | | 0 | | 123 | | 179 | | 0 | | 10 | | 8 |
| | # Outlets | | 1,254 | | 0 | | 543 | | 1,210 | | 0 | | 45 | | 77 |
| | Sellout % | | 34.4% | | #### | | 34.6% | | 41.3% | | #### | | 22.2% | | 16.9% |
| South Department | Draw | 7320 | 7326 | 0 | 0 | 1810 | 1810 | 3915 | 3919 | 0 | 0 | 128 | 128 | 230 | 230 |
| | Returns | | 1812 | | 0 | | 402 | | 1120 | | 0 | | 55 | | 77 |
| | Sales | | 5514 | | 0 | | 1408 | | 2799 | | 0 | | 73 | | 153 |
| | Rtns% | | 24.7% | | #### | | 22.2% | | 28.6% | | #### | | 43.0% | | 33.5% |
| | R Sellouts | | 133 | | 0 | | 11 | | 87 | | 0 | | 0 | | 0 |
| | N Sellouts | | 165 | | 0 | | 68 | | 119 | | 0 | | 11 | | 13 |
| | # Outlets | | 1,025 | | 0 | | 489 | | 967 | | 0 | | 31 | | 33 |
| | Sellout % | | 29.1% | | #### | | 16.2% | | 21.3% | | #### | | 35.5% | | 39.4% |
| West Department | Draw | 7320 | 7326 | 0 | 0 | 1810 | 1810 | 3915 | 3919 | 0 | 0 | 128 | 128 | 230 | 230 |
| | Returns | | 1812 | | 0 | | 402 | | 1120 | | 0 | | 55 | | 77 |
| | Sales | | 5514 | | 0 | | 1408 | | 2799 | | 0 | | 73 | | 153 |
| | Rtns% | | 24.7% | | #### | | 22.2% | | 28.6% | | #### | | 43.0% | | 33.5% |
| | R Sellouts | | 133 | | 0 | | 11 | | 87 | | 0 | | 0 | | 0 |
| | N Sellouts | | 165 | | 0 | | 68 | | 119 | | 0 | | 11 | | 13 |
| | # Outlets | | 1,025 | | 0 | | 489 | | 967 | | 0 | | 31 | | 33 |
| | Sellout % | | 29.1% | | #### | | 16.2% | | 21.3% | | #### | | 35.5% | | 39.4% |
| TOTALS | Draw | 51600 | 51618 | 0 | 0 | 12330 | 12330 | 25425 | 25437 | 0 | 0 | 984 | 984 | 2490 | 2490 |
| | Returns | | 13398 | | 0 | | 2769 | | 7053 | | 0 | | 288 | | 756 |
| | Sales | | 28220 | | 0 | | 9561 | | 18384 | | 0 | | 696 | | 1734 |
| | Rtns% | | 26.0% | | #### | | 22.5% | | 27.7% | | #### | | 29.3% | | 30.4% |
| | R Sellouts | | 1101 | | 0 | | 228 | | 1224 | | 0 | | 0 | | 15 |
| | N Sellouts | | 1089 | | 0 | | 573 | | 894 | | 0 | | 63 | | 63 |
| | # Outlets | | 6837 | | 0 | | 3096 | | 6531 | | 0 | | 228 | | 330 |
| | Sellout % | | 32.0% | | #### | | 25.9% | | 32.4% | | #### | | 27.6% | | 23.6% |

| TOTAL CONSTITUTION | Draw | 63930 | 63948 |
|---|---|---|---|
| | Returns | | 16167 |
| | Sales | | 47781 |
| | Rtns% | | 25.3% |

| TOTAL JOURNAL | Draw | 25425 | 25437 |
|---|---|---|---|
| | Returns | | 7053 |
| | Sales | | 18384 |
| | Rtns% | | 27.7% |

*Fig. 20*

6.4 Route Time Stamp Report

Route Time-Stamp Report

Select Date: Tuesday, June 6, 2000    Enter Route Number: 0661

Select Edition to View

| | | | Check In | 1st Outlet | Last Outlet | Check Out |
|---|---|---|---|---|---|---|
| [X] | Edition 13 | Trip 1 | 2:27 AM | 3:01 AM | 4:15 AM | 5:08 AM |
| [ ] | | Trip 2 | 1:53 AM | 2:54 AM | 5:03 AM | 5:36 AM |
| [ ] | | Trip 3 | 2:46 AM | 3:27 AM | 5:15 AM | 6:04 AM |
| [ ] | Edition 15 | Trip 1 | 4:20 AM | 6:04 AM | 6:24 AM | 7:12 AM |
| [ ] | Edition 22 | Trip 1 | 9:48 AM | 10:57 AM | 12:24 PM | 1:15 PM |
| [ ] | | Trip 2 | 10:15 AM | 11:08 AM | 12:59 PM | 1:30 PM |

| Outlet Name<br>Outlet Address | Outlet Type | Delivery Screen | Returns Screen | Shuffle Screen | Summary Screen | Time on Outlet |
|---|---|---|---|---|---|---|
| Amoco #4331<br>3700 Old Alabama Rd<br>Alpharetta, GA 30022 | ND | 3:01 AM | 3:06 AM | | 3:07 AM | 00:06 |
| Amoco C-First, Inc.<br>2957 Holcomb Bridge Rd<br>Alpharetta, GA 30022 | ND | 3:01 AM | 3:06 AM | | 3:07 AM | 00:06 |
| Brothers Liquor<br>2882 Holcomb Bridge Rd<br>Alpharetta, GA 30022 | R | 3:01 AM | 3:06 AM | | 3:07 AM | 00:06 |
| BP Oil<br>9915 Haynes Bridge Rd<br>Alpharetta, GA 30022 | ND | 3:01 AM | 3:06 AM | | 3:07 AM | 00:06 |
| Chesapeake Bagel<br>9925 Haynes Bridge Rd<br>Alpharetta, GA 30022 | ND | 3:01 AM | 3:06 AM | | 3:07 AM | 00:06 |
| Chevron #013<br>2970 Holcomb Bridge Rd<br>Alpharetta, GA 30022 | ND | 3:01 AM | 3:06 AM | | 3:07 AM | 00:06 |
| Chic Fil A<br>8475 Holcomb Bridge Rd<br>Alpharetta, GA 30022 | R | 3:01 AM | 3:06 AM | | 3:07 AM | 00:06 |
| Circle K<br>9780 Nesbit Ferry Rd<br>Alpharetta, GA 30022 | ND | 3:01 AM | 3:06 AM | | 3:07 AM | 00:06 |
| Shuffle Papers | SH | | | | | |

*Fig. 21*

6.5 Branch Time Stamp Report

Branch Time-Stamp Report

Select Date: June 6, 2000    Select Branch: Alpharetta

3603-0622

| | | Check In | 1st Outlet | Last Outlet | Check Out |
|---|---|---|---|---|---|
| Edition 13 | Trip 1 | 2:27 AM | 3:01 AM | 4:15 AM | 5:08 AM |
| | Trip 2 | 1:53 AM | 2:54 AM | 5:03 AM | 5:36 AM |
| | Trip 3 | 2:46 AM | 3:27 AM | 4:15 AM | 6:04 AM |
| Edition 15 | Trip 1 | 4:20 AM | 5:10 AM | 6:24 AM | 7:12 AM |
| Edition 22 | Trip 1 | 9:48 AM | 10:57 AM | 12:24 PM | 1:15 PM |
| | Trip 2 | 10:15 AM | 11:08 AM | 12:59 PM | 1:30 PM |

3603-0631

| | | Check In | 1st Outlet | Last Outlet | Check Out |
|---|---|---|---|---|---|
| Edition 13 | Trip 1 | 2:27 AM | 3:01 AM | 4:15 AM | 5:08 AM |
| | Trip 2 | 1:53 AM | 2:54 AM | 5:03 AM | 5:36 AM |
| | Trip 3 | 2:46 AM | 3:27 AM | 4:15 AM | 6:04 AM |
| Edition 15 | Trip 1 | 4:20 AM | 5:10 AM | 6:24 AM | 7:12 AM |
| Edition 22 | Trip 1 | 9:48 AM | 10:57 AM | 12:24 PM | 1:15 PM |
| | Trip 2 | 10:15 AM | 11:08 AM | 12:59 PM | 1:30 PM |

3603-0642

| | | Check In | 1st Outlet | Last Outlet | Check Out |
|---|---|---|---|---|---|
| Edition 13 | Trip 1 | 2:27 AM | 3:01 AM | 4:15 AM | 5:08 AM |
| | Trip 2 | 1:53 AM | 2:54 AM | 5:03 AM | 5:36 AM |
| | Trip 3 | 2:46 AM | 3:27 AM | 4:15 AM | 6:04 AM |
| Edition 15 | Trip 1 | 4:20 AM | 5:10 AM | 6:24 AM | 7:12 AM |
| Edition 22 | Trip 1 | 9:48 AM | 10:57 AM | 12:24 PM | 1:15 PM |
| | Trip 2 | 10:15 AM | 11:08 AM | 12:59 PM | 1:30 PM |

3603-0643

| | | Check In | 1st Outlet | Last Outlet | Check Out |
|---|---|---|---|---|---|
| Edition 13 | Trip 1 | 2:27 AM | 3:01 AM | 4:15 AM | 5:08 AM |
| | Trip 2 | 1:53 AM | 2:54 AM | 5:03 AM | 5:36 AM |
| | Trip 3 | 2:46 AM | 3:27 AM | 4:15 AM | 6:04 AM |
| Edition 15 | Trip 1 | 4:20 AM | 5:10 AM | 6:24 AM | 7:12 AM |
| Edition 22 | Trip 1 | 9:48 AM | 10:57 AM | 12:24 PM | 1:15 PM |
| | Trip 2 | 10:15 AM | 11:08 AM | 12:59 PM | 1:30 PM |

*Fig. 22*

6.6 Setout Sheet Report

Setout Sheet

Enter Branch Name  Alpharetta

OR

Enter Route Number

Select Date  June 6, 2000

3603-0622

|  | AJC | NYT | IBD |
|---|---|---|---|
| Edition 13 | 300 | 20 | 10 |
| Trip 1 | 75 | 3 | 0 |
| Trip 2 | 90 | 8 | 0 |
| Trip 3 | 135 | 9 | 10 |
| Edition 15 | 120 | 20 | 10 |
| Trip 1 | 56 | 13 | 10 |
| Trip 2 | 64 | 7 | 0 |
| Edition 22 | 200 | 20 | 10 |
| Trip 1 | 110 | 14 | 10 |
| Trip 2 | 90 | 6 | 0 |

3603-0631

|  | AJC | NYT | IBD |
|---|---|---|---|
| Edition 13 | 300 | 20 | 10 |
| Trip 1 | 75 | 3 | 0 |
| Trip 2 | 90 | 6 | 0 |
| Trip 3 | 135 | 9 | 10 |
| Edition 15 | 120 | 20 | 10 |
| Trip 1 | 56 | 13 | 10 |
| Trip 2 | 64 | 7 | 0 |
| Edition 22 | 200 | 20 | 10 |
| Trip 1 | 110 | 14 | 10 |
| Trip 2 | 90 | 6 | 0 |

*Fig. 23*

6.7 Daily Draw Variance Report

| Daily Draw Variance Report ||||||||
|---|---|---|---|---|---|---|---|
| Select Date | June 27, 2000 |||||||
| Enter Branch Code | AP |||||||
| Route | Draw | 13 | 14 | 15 | 22 | 24 | IBD | NYT |
| 3603-0622 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0631 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0642 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0643 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0644 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0652 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0661 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0671 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0672 | Manifested<br>Delivered<br>Variance | 390<br>410<br>20 | | 150<br>150<br>0 | | 235<br>233<br>(2) | 35<br>35<br>0 | 40<br>40<br>0 |
| 3603-0681 | Manifested<br>Delivered<br>Variance | 390<br>410<br>20 | | 150<br>150<br>0 | | 235<br>233<br>(2) | 35<br>35<br>0 | 40<br>40<br>0 |
| 3603-1671 | Manifested<br>Delivered<br>Variance | 390<br>410<br>20 | | 150<br>150<br>0 | | 235<br>233<br>(2) | 35<br>35<br>0 | 40<br>40<br>0 |
| BRANCH | Manifested<br>Delivered<br>Variance | 4290<br>4510<br>220 | 0<br>0<br>0 | 1650<br>1650<br>0 | 0<br>0<br>0 | 2585<br>2563<br>(22) | 385<br>385<br>0 | 440<br>440<br>0 |

*Fig. 24*

NewsTr@ck Login

*Fig. 25A*

Home

*Fig. 25B*

Route

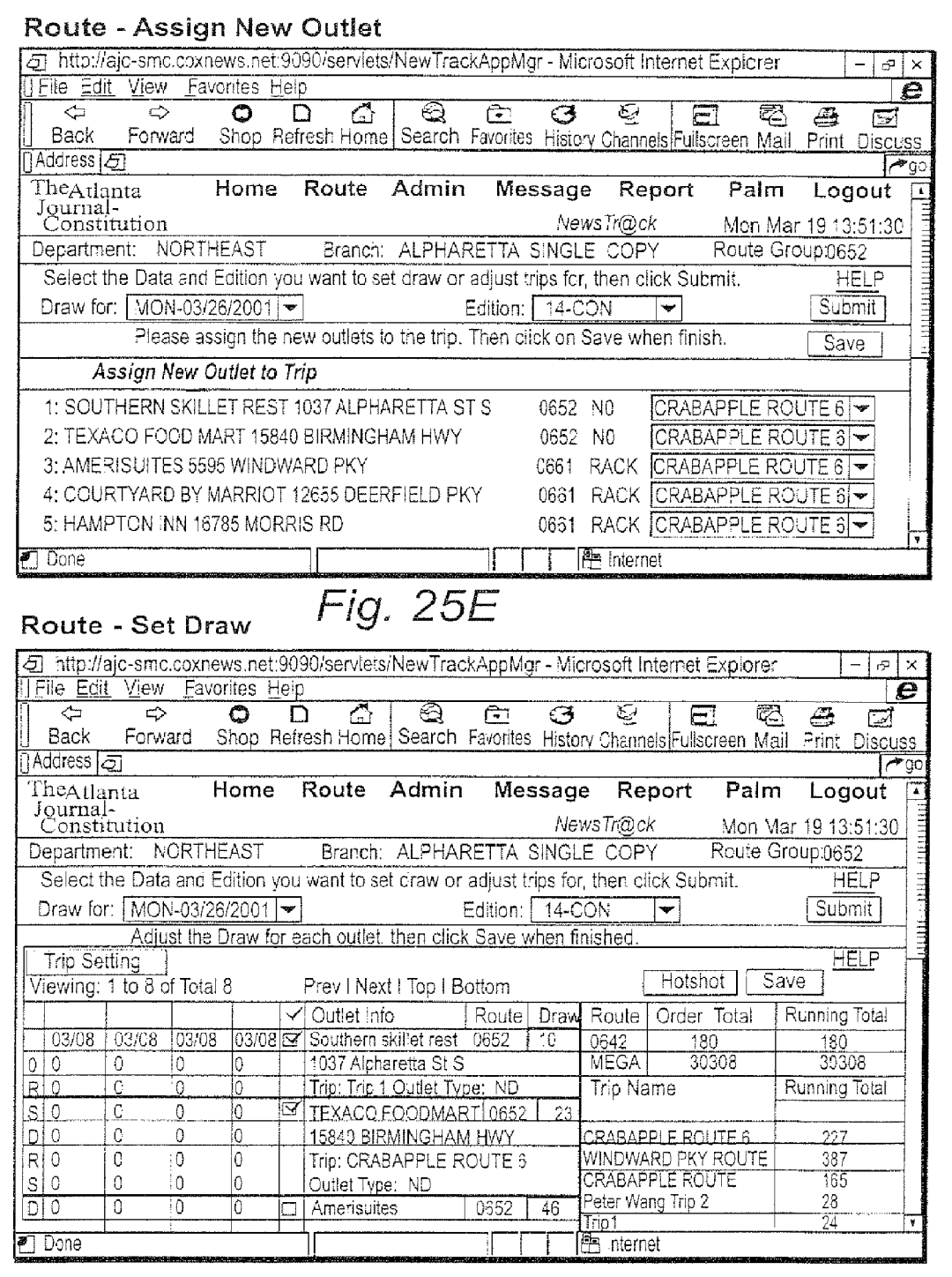

Route - Assign New Outlet

| | | | |
|---|---|---|---|
| 1: SOUTHERN SKILLET REST 1037 ALPHARETTA ST S | 0652 | NO | CRABAPPLE ROUTE 6 |
| 2: TEXACO FOOD MART 15840 BIRMINGHAM HWY | 0652 | NO | CRABAPPLE ROUTE 6 |
| 3: AMERISUITES 5595 WINDWARD PKY | 0661 | RACK | CRABAPPLE ROUTE 6 |
| 4: COURTYARD BY MARRIOT 12655 DEERFIELD PKY | 0661 | RACK | CRABAPPLE ROUTE 6 |
| 5: HAMPTON INN 16785 MORRIS RD | 0661 | RACK | CRABAPPLE ROUTE 6 |

*Fig. 25E*

Route - Set Draw

Admin

The Atlanta Journal-Constitution

Home  Route  Admin  Message  Report  Palm  Logout
Employee | Holiday | Edition | RGroup Profile | Outlet Detail
NewsTr@ck    Mon Mar 19 13:51:30

Department: NORTHEAST    Branch: ALPHARETTA SINGLE COPY    Route Group:0652

To browse employee information, please enter the search criteria selections.
Then click on employee Number Search or Name Search!

*Search & Add Employee*

Employee Number [ ]    [Employee Number Search]
First Name [ ]    Last Name [ ]    [Name Search]

*Fig. 25I*

Admin - Employee

The Atlanta Journal-Constitution

Home  Route  Admin  Message  Report  Palm  Logout
Employee | Holiday | Edition | RGroup Profile | Outlet Detail
NewsTr@ck    Mon Mar 19 13:51:30

Department: NORTHEAST    Branch: ALPHARETTA SINGLE COPY    Route Group:0652

One Match Found! To add a new employee, click add. To modify an employee, click th Employee Name.

*Search & Add Employee*

Employee Number [ ]    [Employee Number Search]
First Name [ ]    Last Name [wang]    [Name Search]

(Click on the Name to modify employee information)    [Add]

| Name | Department | Branch | Branch Phone | Palm Log | Web Log | Associate Level |
|---|---|---|---|---|---|---|
| WANG PETER | NORTHEAST | AP | 7702058900 | Show Palm Log | Show Web Log | DEPT |

[Add]

*Fig. 25J*

Admin - Add New Employee

| | | | |
|---|---|---|---|
| Department: NORTHEAST | Branch: ALPHARETTA SINGLE COPY | | Route Group:0652 |

To view employee information, enter the search criteria and click on Employee Number or Name Search.

Add New Employee

| First Name: | | Middle Initial: | |
|---|---|---|---|
| Last Name: | wang | Employee Number: | |

*Personal*

| Home Address | | | | Address Unit | |
|---|---|---|---|---|---|
| City | | State | | Zip Code | |
| Work Phone | | Home Phone | | Cell Phone | |
| Pager Number | | E-mail | | | |

*HR Information*

| Security Level | 1-WAREHOUSE | | BGROUP |
|---|---|---|---|
| Job Code | CL555 | | 3-0622 |
| Report To | | | 4-0631 |

*Fig. 25M*

Admin - Modify Employee

| | | | |
|---|---|---|---|
| Department: NORTHEAST | Branch: ALPHARETTA SINGLE COPY | | Route Group:0652 |

To save the change(s), click on Save.

Modify Employee

| Employee ID | 111111111 | Last Modify By: | | Modify Date: | |
|---|---|---|---|---|---|
| First Name: | PETER | Middle Initial: | | Last Name: | WANG |

*Personal*

| Home Address | 123 MAIN ST | | | Address Unit | |
|---|---|---|---|---|---|
| City | ATLANTA | State | GA | Zip Code | 30314 |
| Work Phone | 4045267856 | Home Phone | 4045267856 | Cell Phone | 4045267856 |
| Pager Number | 4045267856 | E-mail | | | |

*HR Information*

| Security Level | 10-SR MNGR/PR | | DEPT | |
|---|---|---|---|---|
| Job Code | MG050 | | 1- NORTHEAST | |
| Report To | 24 | | 2-WEST | |
| | | | 3- SOUTH | |

*Fig. 25N*

Admin - Holiday

Department: NORTHEAST   Branch: ALPHARETTA SINGLE COPY   Route Group:0652

This page lists the Holidays and Combined Editions. To add new date, click on Add.
To modify a date, click the Holiday / Combined Edition link.

Holiday Operations

*Holiday / Combined Editions*

| Holiday / Combined Editions | Publication Date | Cut Off Days | Cut Off Hours:Minutes |
|---|---|---|---|
| NEW-HOL | 02/01/2001 | 1 | 11:00 |
| MY DAY | 02/07/2001 | 1 | 03:30 |
| GARY'S DAY | 03/09/2001 | 4 | 11:30 |
| NEWSTR@CK DAY | 03/16/2001 | 1 | 00:00 |
| BIRTHDAY | 04/14/2001 | 1 | 01:300 |
| MEMORIAL DAY | 05/28/2001 | 5 | 12:00 |
| COMBINED EDITION | 07/03/2001 | 6 | 10:00 |
| INDEPENDENCE DAY | 07/04/2001 | 1 | 00:00 |
| LABOR DAY | 09/03/2001 | 5 | 15:30 |
| THANKSGIVING DAY | 11/22/2001 | 1 | 01:30 |
| CHRISTMAS DAY | 12/25/2001 | 1 | 01:30 |

*Fig. 25O*

Admin - Modify/Delete Holiday

Department: NORTHEAST   Branch: ALPHARETTA SINGLE COPY   Route Group:0652

Update the information. To save the changes, click on Save. To cancel the changes, click on Reset. To remove a date from the holiday list, click on Delete.

*Modify / delete Holiday information*

First Name:

Holiday / Combined Name: THANKSGIVING DAY
Publication Date: 11/22/2001
Cut off Days: 1
Cut off Hours: 00
Cut off Minutes: 30

[Save] [Delete] [Reset]

*Fig. 25P*

Admin -Edition

Department: NORTHEAST    Branch: ALPHARETTA SINGLE COPY    Route Group 0652

This page shows the editions allowed in current selected branch.
Click the check box to add (checked) or remove (unchecked) an edition.

| Edition Operations |
|---|
| *Standard Editions* |
| Daily Edition Allowed |

| | |
|---|---|
| ☑ | CON 13 |
| ☑ | CON 14 |
| ☐ | CON 15 |
| ☑ | JNL 22 |
| ☐ | JNL 24 |
| ☑ | COMBO 33 |
| ☑ | COMBO 35 |
| ☑ | NYT 70 |
| ☑ | IBD 80 |
| ☑ | WSJ 90 |

*Fig. 25Q*

Admin - Route Group Profile

Department: NORTHEAST    Branch: ALPHARETTA SINGLE COPY    Route Group 0652
ROUTE GROUP PROFILE

*Route Group Profile for 0652*

Route Group Code: 0652
Branch Phone: (707) 205-8900

| | | | |
|---|---|---|---|
| Division Manager | BUDDY WHITEHEAD | Area Manager | LOUIS ALVAREZ |
| Pager # Priority | 4 | Pager # Priority | (707)929-7390  4 |
| Email Address | W WHITEHEAD.COM | Email Address | W WHITEHEAD.COM |
| Route Group Manager | | Asst Route Group Manager | LALVAREZ@AJO.COM |
| Pager # Priority | 2 | | |
| Email Address | | Pager # Priority | 3 |

*Fig. 25R*

Admin -Outlet Details http://ajc-smc.coxnews.net:9090/servlets/NewTrackAppMgr - Microsoft Internet Explorer File Edit View Favorites Help Back Forward Shop Refresh Home | Search Favorites History Channels | Fullscreen Mail Print Discuss Address The Atlanta Journal-Constitution    Home   Route   Admin   Message   Report   Palm   Logout
Employee | Holiday | Edition | RGroup Profile | Outlet Detail
NewsTr@ck    Mon Mar 19 13:51:30

Department: NORTHEAST    Branch: ALPHARETTA SINGLE COPY    Route Group: 0652

To view outlet detail information, enter the search criteria selections and click on Search.

| Outlet Search | |
|---|---|
| Outlet Code Search | Outlet Code Search |
| Outlet Name Search | Outlet Name Search |

Done    Internet

File Edit View Favorites Help

Back Forward Shop Refresh Home | Search Favorites History Channels | Fullscreen Mail Print Discuss Address The Atlanta Journal-Constitution    Home   Route   Admin   Message   Report   Palm   Logout
Employee | Holiday | Edition | RGroup Profile | Outlet Detail
NewsTr@ck    Mon Mar 19 13:51:30

Department: NORTHEAST    Branch: ALPHARETTA SINGLE COPY    Route Group: 0652

You can do search again or click on Outlet Information to check outlet message.

| Outlet Search | |
|---|---|
| Outlet Code Search | Outlet Code Search |
| Outlet Name Search | Outlet Name Search |

*(Click on Outlet infor to see outlet detail)*

| Outlet Information | Outlet Type | Route | Code |
|---|---|---|---|
| 1: MCDONALDS 12340 ARNOLD MILL RD | RACK | 0652 | |
| 2: ROSWELL KITCHEN 659 ATLANTA ST S | RACK | 0652 | |
| 3: SOUTHERN SKILLETT REST 1037 ALPHARETTA ST S | RACK | 0652 | |
| 4: WAFFLE HOUSE 12370 ARNOLD MILL RD | RACK | 0652 | |
| 5: WENDER & ROBERTS 10930 CRABAPPLE RD | RACK | 0652 | |
| 6: BLUE SKY EXXON # 749 855 WOODSTOCK RD | ND | 0652 | |
| 7: BP OIL #2018 12335 ARNOLD MILL RD | ND | 0652 | |
| 8: BP OIL #8112 10980 CRABAPPLE RD | ND | 0652 | |

Done    Internet

Message- Field Message

| | |
|---|---|
| The Atlanta Journal-Constitution | Home Route Admin Message Report Palm Logout Employee ∣ Holiday ∣ Edition ∣ RGroup Profile ∣ Outlet Detail NewsTr@ck    Mon Mar 19 13:51:30 |

Department: NORTHEAST    Branch: ALPHARETTA SINGLE COPY    Route Group: 0652

To view Field Messages, enter the search criteria and click on Search.

To search Field Message, select the criterions from the lists. Then click Submit button. You can also click Add to add new message.

Field Message Date: MON-03/19/2001
Send to: DEPT

NORTHEAST
WEST
SOUTH
EAST
21 COUNTY

[Submit]

*(Click on Field Message Link to modify.)*

[Add]

*Fig. 25W*

Message- Add Field Message

Department: NORTHEAST    Branch: ALPHARETTA SINGLE COPY    Route Group: 0652

To Add Field Message, please first select the Field Message Date, Send to level and the send to DEPT, enter field message text, then click on Save.

To Add Field Message, please first select the Field Message Date, Send to level and the send to DEPT.

Field Message Date: MON-03/19/2001
Send to: DEPT

NORTHEAST
WEST
SOUTH
EAST
21 COUNTY

*Add New Field Message*

*Field Message Text*

[Save] [Reset]

*Fig. 25X*

Message - Outlet Instructions

Report

Newstr@ck Returns Variance by Route

Route Code: 0652  
Publication Date: 01/08/2001  
Department: NORTHEAST  Branch: ALPHARETTA SINGLE COPY  Route Group: 0652  
Date: 03/19/2001

| Palm ID | Distributor Name | Pub Date | Edition Code | Draw # | Verified # | Time Verified | # Variance | % Variance |
|---|---|---|---|---|---|---|---|---|
| PALM 1 | | | | | | | | |
| | FROST, JIM | 01/08/2001 | 14 | 250 | 300 | 12:00 am | -50 | 120.00% |
| | Total For Palm: PALM 1 | | | 250 | 300 | | -950 | 480.00% |
| PALM 2 | | | | | | | | |
| | WHITEHEAD, BUDDY | 01/08/2001 | 22 | 200 | 200 | 12:00 am | -99 | 149.50% |
| | Total For Palm: PALM 2 | | | 200 | 200 | | -398 | 299.00% |

*Fig. 25AC*

Palm

Department: NORTHEAST  Branch: ALPHARETTA SINGLE COPY  Route Group: 0652

To view palm information, enter the search criteria and then click on Search.

Palm Search

| Palm Name Search | | Palm Name Search |
|---|---|---|
| Palm Serial Search | | Serial Search |

Palm - Information

Fig. 25AF

METHOD AND APPARATUS FOR SUPPORTING DELIVERY, SALE AND BILLING OF PERISHABLE AND TIME-SENSITIVE GOODS SUCH AS NEWSPAPERS, PERIODICALS AND DIRECT MARKETING AND PROMOTIONAL MATERIALS

CROSS-REFERENCES TO RELATED APPLICATIONS

This application is a division of application Ser. No. 12/604,453 filed Oct. 23, 2009, now U.S. Pat. No. 8,117,095; which application is a division of application Ser. No. 10/318,237 filed Dec. 13, 2002, now U.S. Pat. No. 7,627,535; both of which are hereby incorporated by reference in their entirety.

STATEMENT REGARDING FEDERALLY SPONSORED RESEARCH OR DEVELOPMENT

Not applicable.

FIELD OF THE INVENTION

This invention relates to computer-assisted processes for supporting delivery of time-sensitive goods including but not limited to newspapers, periodicals and other timely publications; and to the field of data collection and market control. Still more particularly, aspects of the invention provide web-based automated planning tools for scheduling and confirming delivery; distributed data collection and messaging networks including portable handheld devices for supporting delivery of perishable and time-sensitive goods; and methods for operating such a distributed network on a shared basis among distinct and/or geographically separated entities.

BACKGROUND AND SUMMARY

Newspaper and magazine publishers have benefited from modern computer technology. For example, digital typesetting and copy preparation have mostly replaced manual operations to provide much higher levels of efficiency and flexibility than were previously possible. Images to appear in publications can be digitized and transmitted electronically across the world in seconds. The copy and format of entire publications such as newspapers are now routinely transmitted by satellite or other high speed data transmission paths to multiple printing sites to provide national and international publication and distribution. Digital computer technology has also allowed publishers to produce variable, targeted versions of publications with variable advertising and other content aimed at different micro-audiences or even individual subscribers.

While many formerly-manual processes involved in newspaper, magazine and other publishing have been virtually revolutionized by digital computer technology, the process of actually delivering newspapers and other publications to readers has remained largely unchanged. Some futurists have long predicted the obsolescence of paper copies in favor of digital data transmission and display, but most attempts at delivering data instead of paper to readers have met with only marginal success. While many newspapers provide web sites supplementing distribution of hard copies to doorsteps and newsstands every morning, the idea of replacing paper copy distribution with digital data has not yet become a commercial reality. Most people like to read their newspapers and magazines at the breakfast table, on the train, sitting in an easy chair and in various other places that do not require proximity to a computer display. The resolution, convenience, cost-effectiveness and other advantages of printed copy cannot currently be matched by practical present day digital distribution techniques.

Because the distribution of paper copies of newspapers, magazines and other daily or periodic publications remains critical to readership and the associated generation of advertising revenue, effective publishing businesses continue to rely on traditional methods of distributing printed copy to readers. For example, newspapers still continue to make wide use of full-time and part-time delivery personnel to deliver newspapers to residential and business customers. The delivery process continues to be highly manual and labor-intensive. In larger population centers, delivery boys and girls have been largely replaced by professional delivery men and women whose careers are to deliver newspapers and magazines, but not much has changed in the way most newspapers are delivered.

Anyone who ever had a paper route remembers the general steps involved in getting a daily newspaper from the publisher to customers. Typically, newspapers are printed overnight and are readied for distribution early in the morning. Route delivery men and women meet at distribution depots to pick up newspapers for delivery. If necessary, the newspapers may be manually prepared by adding inserts, placed into plastic bags to protect them from weather, etc. The delivery people pick up their allotment of newspapers and drive along predetermined delivery routes, distributing newspapers as they go. Residential delivery routes usually involve leaving a newspaper at each subscriber's home or office. Some newspapers are now using their delivery workforce as service organizations to deliver national newspapers such as the New York Times or the Wall Street Journal. Billing is now done principally by mail.

Delivery people are also used to distribute newspapers to retail outlets, vending machines and other locations that receive multiple copies, often following a predetermined route. These delivery people are sent out into the field on predetermined delivery trips including a number of delivery locations. The locations can include for example newsstands, retail outlets, vending machines, etc. The delivery people are given a total "draw" (number of copies) based on historical sales. Historical sales are often looked at based on different days of the week since Tuesday sales may be radically different than Friday sales, and Saturday and Sunday sales are different from weekday sales. The delivery people allocate their total "draw" based on historical sales in each retail outlet or other sales location (e.g., "this particular store usually sells at least a dozen papers on Tuesdays so I'll leave 15 copies this Tuesday"). In the process of delivering the current edition, the delivery people may also pick up unsold copies of the previous edition as returns (retail outlets typically are not charged for unsold copies). The delivery people bring the returns back to the depot where they are counted manually, and the returns by location are collected and reported to the data processing center for bill generation.

Meanwhile, route managers may receive telephone complaints or requests from customers and retail outlets such as "I didn't get enough papers today", "Where is my newspaper delivery", or "My paper is wet, I need another one." Additional delivery people may be dispatched or delivery personnel already out in the field may be contacted to remedy these problems. In some cases, additional delivery personnel may go out into the field later in the day to adjust the distribution by, for example, taking copies from slower-selling locations and shifting them to "hot" locations where they are more likely to sell. These so-called "shuffle" runs can be important to maximizing sales based on a given day's total circulation.

The newspaper delivery scenarios described above and other scenarios involving the delivery of perishable or time-sensitive goods to retail outlets, vending machines and the like typically involve delivering the goods in quantities based on historic demand. Inaccurate monitoring, analysis and planning of retail outlet draws and sales may result in disparities between the quantity of goods delivered to a retail outlet and the quantity of goods sold. If the number of newspapers and other periodicals delivered to a retail outlet are substantially more or less than those actually purchased, the inefficient allocation directly results in lost revenue and lost opportunities for customers to enjoy the benefits of the product. Retail outlets that sell out of newspapers early in the day represent lost sales. Because newspapers and other timely publications are highly perishable (few people are interested in reading yesterday's newspaper), unsold overstock is simply wasted. While "shuffle runs" as discussed above provide a manual way to try to remedy some of these allocation disparities, it would be highly desirable to provide improved tools for managing the efficient distribution of perishable products such as but not limited to newspapers, magazines and other timely periodicals.

There have been attempts in the past to apply digital computing technology to the challenges associated with distribution and delivery of perishable products. As one example, The Atlanta Journal—Constitution and the Arizona Republic have each implemented delivery data distribution networks that place handheld computing devices into the hands of newspaper delivery personnel. Such handheld computing devices may be used to specify a delivery route, provide messaging or other instructions, and for certain data collection purposes. However, further improvements are possible and desirable. In particular, there is a need for improved automation to support the allocation and tracking of perishable and time-sensitive goods delivered to retail outlets, vending machines and other distribution locations serving multiple potential customers.

In general, the present invention solves existing problems and improves upon prior approaches by providing systems and methods for tracking, controlling, optimizing and otherwise managing the mass delivery of similar goods including but not limited to time-sensitive goods such as newspapers, periodicals, and promotional materials.

In one exemplary illustrative non-limiting embodiment, newspaper delivery personnel are provided with portable handheld devices loaded with information pertaining to delivery routes and schedules. These handheld devices provide for the efficient collection of route delivery information at the retail or other outlet level. The system automatically collects, aggregates and formats the collected information into usable data for a variety of business reports, customer billings, and other planning purposes.

In addition to providing outlet-level sales information, the illustrative exemplary system and method improves the accuracy of deliveries and returns. It also can eliminate the use of paper to keep track of route lists, deliveries, shuffles, and returns. The illustrative system can be used to replace previous methods of tracking "single copy" delivery information to provide a more comprehensive solution.

One illustrative method of delivering goods comprises creating a database including at least route delivery information, communicating at least portions of said database to respective handheld devices for display thereon; delivering said goods based at least in part on said displayed database portions; using said handheld devices to collect information during said delivering step, and communicating said collected information to said database, wherein said collected information comprises shuffle information.

The communicating steps may be performed intermittently in batch mode, wirelessly or continually in real time. Automatic reading of bar codes from goods may be performed. The goods may comprise time-sensitive goods such as newspapers or other periodicals. The route delivery information specifies multiple products. The data collection may comprise collecting retail store representative signatures and/or return depot signatures. The data collection may comprise collecting and automatically counting the number of return goods. The handheld devices may be operated to modify said route delivery information, and communicating said modifications between said handheld devices over an infrared link or otherwise. The data collection step may comprise collecting at least one time stamp. The database may be maintained by plural geographically separated entities. Bills may be generated based at least in part on said data collected by said data collecting step.

A system for delivering time-sensitive goods such as newspapers or other publications may comprise: a database server that stores database information including at least route delivery information, a communications server coupled to said database server, said communications server communicating selected subsets of said database information to respective handheld devices for display thereon; said respective handheld devices each including a display that displays information for, in use, guiding the delivery of said time-sensitive goods, said handheld devices including a data communications arrangement that communicates said collected information to said database, wherein said collected information comprises shuffle information.

A further method of providing delivery management services may comprise operating web-enabled computing equipment providing a database and web enabled applications; allowing plural users to access said web-enabled computing equipment to define at least plural delivery routes; communicating said delivery routes to respective remote handheld devices; using said handheld devices to collect delivery information; and reporting said collected delivery information to said computing equipment for bill generation.

One exemplary more detailed but non-limiting arrangement includes a mainframe computer, a web server connected to the mainframe computer, a communications server connected to the web server, and a handheld computer linked to the communications server. The mainframe computer houses databases of demographic and field data information about consumers, including both subscribers and non-subscribers, delivery routes and draws for retail outlets. The web server provides software applications that access the mainframe computer's databases to maintain, update and create customized versions of subscription data, subscriber profiles, delivery routes and retail outlet draws. Users can access the web server via the Internet using conventional web browsing software/hardware. The communications server permits users to download data to and upload data from the handheld devices. The handheld devices display customized versions of subscription data, subscriber profiles, delivery routes and retail outlet draws and enable users to input field data for inclusion in the mainframe computer's databases. In another exemplary arrangement, the mainframe computer functionality is not used and database information is maintained on a database server coupled to the web server.

Further features and advantages of exemplary illustrative arrangements include:
- intelligent advanced shuffle handling and tracking
- web-based planning tools
- sequencing of distribution outlets along a trip or route
- delivery without employing paper lists
- trip management/tracking
- intermittent or continual connectivity and/or data reporting
- time stamping/time-based tracking
- retail manager signature input as part of data collection
- billing support (time stamping and signatures)
- maximizing ease and speed of development and deployment
- server centric, Java based component model and toolset accommodating a variety of different client devices
- providing portability across a diverse server environment
- supporting open, unifying Java platform to provide flexible scalability and quality of service
- leveraging and extending existing assets to improve time to market and reduce cost of development
- secure, reliable, and scalable applications
- supporting web browser clients and other new technologies and paradigms
- supporting ASP, service-oriented business models

BRIEF DESCRIPTION OF THE DRAWINGS

These and other features and advantages provided in accordance with illustrative exemplary non-limiting embodiments will be better and more completely understood by referring to the following detailed description in connection with drawings, of which:

FIGS. 3A and 3B illustrate example illustrative implementations of handheld devices;

FIGS. 10-15 show example illustrative non-limiting databases;

FIGS. 18-24 show example illustrative report formats;

DETAILED DESCRIPTION OF PRESENTLY PREFERRED EXEMPLARY NON-LIMITING EMBODIMENTS

Figure 1:
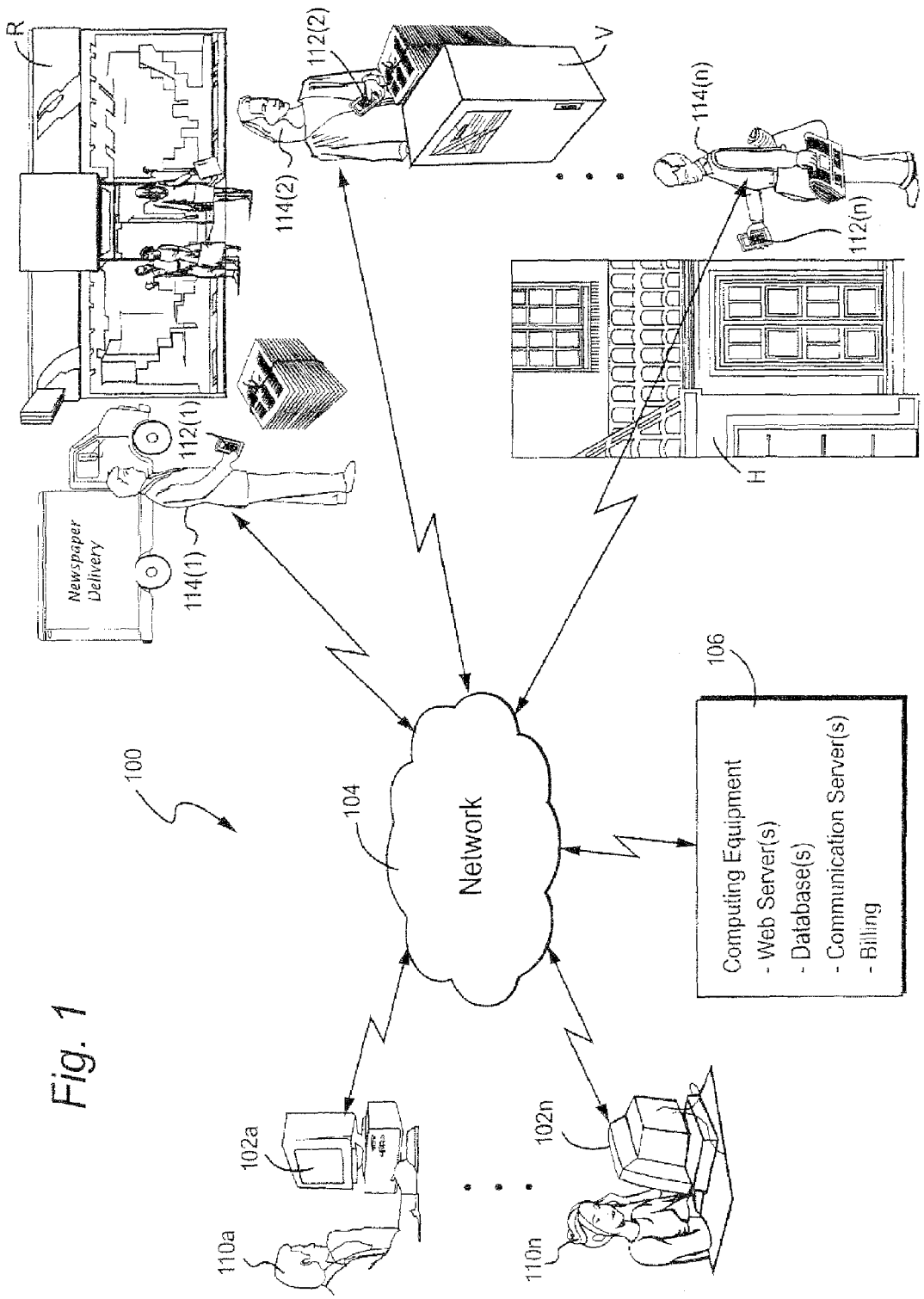
FIG. 1 is a schematic illustration of an exemplary illustrative non-limiting embodiment of a perishable and time-sensitive good distribution system 100.

FIG. 1 shows a non-limiting exemplary illustrative embodiment of a perishable and time-sensitive goods distribution system 100. System 100 includes one or more planning workstations 102 coupled via a network 104 to computing equipment 106. Computing equipment 106 executes delivery planning tools and in the exemplary embodiment provides a browser-based user interface that can be accessed by one or more planning workstations 102. Route managers 110 use web-based planning tools operating on computing equipment 106 to develop delivery schedules, quantities and the like. For example, the web application(s) running on computing equipment 106 allows route managers 110 to manipulate the draw and run lists associated with each of any number of delivery routes. Computing equipment 106 also allows route managers 110 to view, analyze and change delivery route information stored and maintained by computing equipment 106. For example, route managers 110 can run a variety of reports providing all sorts of different types of information about individual delivery routes.

Network 104 also exchanges information between computing equipment 106 and any number of handheld or portable computing devices 112 used by delivery personnel 114. For example, exemplary FIG. 1 shows a delivery person 114 (1) using a portable computing device 112(1) to deliver time-sensitive products such as newspapers to retail outlet R. FIG. 1 shows as another example a further delivery person 114(2) using a handheld computing device 112(2) to assist him to deliver perishable products such as newspapers to a vending machine V. Exemplary FIG. 1 further shows a delivery person 114(n) using a portable handheld computing device 112(n) to assist him in delivering newspapers to a home H or other residence. Of course, many other delivery scenarios are possible. System 100 could be used for the delivery of virtually any type of perishable or other goods to virtually any destination.

In the illustrative embodiment, devices 112 are preferably small enough to be easily portable and hand-carried by delivery personnel 114. This portability provides advantages in terms of access and allowing delivery personnel 114 to interact with retail managers and the like. In the exemplary embodiment, portable computing devices 112 may be any type of device including but not limited to:
- personal digital assistant (PDA),
- pocket personal computer,
- cellular telephone,
- laptop or other small computer,
- wearable computing equipment,
- dashboard mounted special purpose computing device,
- smart card with display,
- any other computing arrangement capable of at least intermittently exchanging data via network 104.

In some embodiments, devices 112 may be mounted within a vehicle used by the delivery person, or they could be located at the retail outlet itself. For example, some or all of the capabilities of devices 112 could be integrated within vending machines, or devices 112 could comprise web-enabled kiosk style or other appliances permanently located at retail sites.

In the illustrative exemplary embodiment, computing equipment 106 periodically downloads delivery information over network 104 into each of handheld devices 112. Handheld devices 112 present this downloaded information visually and/or aurally to delivery personnel 114 in order to guide the delivery personnel. For example, the downloaded information displayed by handheld devices 112 can instruct delivery personnel 114 as to how many newspapers or other units to deliver to each of a number of specified locations on a delivery route. In the illustrative exemplary embodiment, computing equipment 106 downloads information into handheld devices 112 at sufficient frequency to provide a desired level of flexibility on the part of route managers 110. For example, in the context of a daily newspaper delivery service, route managers 110 are able to change delivery routes on at least a daily basis to add, delete and/or change delivery locations such as retail outlets, subscribers, and the like. In this scenario, information is downloaded into handheld devices 112 at least every night so that the route changes effected the previous day can be implemented during the next delivery day. Nightly information downloads can be accomplished by placing handheld devices 112 into appropriate data exchange cradles and providing a conventional data synchronization or other data exchange operation via hardwired, wireless, dialup or any other data exchange link. In implementations where even more timely data exchange is desired, handheld devices 112 may be provided with cellular or other wireless telecommunication capabilities to allow virtually instantaneous two-way data exchange and synchronization.

In the exemplary illustrative embodiment, handheld devices 112 also provide data collection capabilities. The illustrative exemplary embodiment of system 100 uses handheld devices 112 to collect a variety of different types of data including for example:

- number and type of newspapers or other units delivered to each retail location or other delivery site ("draw");
- number and type of newspaper or other unit returns collected from each retail or other delivery site ("returns");
- signature of retail outlet representative attesting to accuracy of draw and return quantity and type information;
- time stamps corresponding to certain events;
- vehicle odometer reading, other location information, and other parameters associated with each delivery;
- during a "shuffle" run, the number of units moved from one delivery location to another;
- problem indications associated with particular delivery locations (e.g., vending machine defective, upset store manager, delivery location not open or otherwise inaccessible, etc.);
- other information associated with delivery.

The data collected by handheld devices 112 is periodically uploaded over network 104 to computing equipment 106. In the illustrative exemplary embodiment, this data uploading preferably occurs at the same time as download of data into the handheld devices 112 for purposes of efficiency, although in other applications it may be desirable to provide data reporting by the handheld devices before new data is available to be downloaded into the devices. Thus, the exemplary embodiment encompasses both one-way and two-way data exchanges in either direction between computing equipment 106 and the handheld devices 112.

Once the computing equipment 106 receives the data collected by the various handheld devices 112, it analyzes this collected data and stores it into appropriate locations within one or more databases. This collected information may then be accessed by route managers 110, who can run a variety of reports and other analyses. For example, route managers can use data collected from a just-executed delivery to modify or otherwise affect instructions for a next delivery. Collected data indicating that too many or too few newspapers or other units were delivered to a retail outlet or other location may be used to modify quantity delivery instructions for the next delivery. Collected information indicating that a new store or other potential retail outlet has just opened or otherwise become available may trigger a contact or survey of that retail outlet or other location to establish it as a regular delivery location. Collected data indicating that a retail location has closed or otherwise become unavailable or that a residential customer has unsubscribed may be used to remove that scheduled delivery from subsequent route delivery instructions. Collected data indicating problems with delivery locations (e.g., defective vending machine, upset retail store manager, etc.) may trigger action by customer service representatives, equipment repair personnel or the like to solve these problems. Route managers 110 and/or computing equipment 106 in a illustrative exemplary embodiment also use the collected data to generate bills and other billing information. Additionally, route managers 110 may use collected data as a basis for evaluating the performance of individual delivery people 114.

Briefly, in one exemplary illustrative non-limiting embodiment, route managers 110 and other administrative personnel can access and revise route and delivery data via desktop computers or other appliances located at the distribution center or elsewhere. The computers can link to the server(s) via a password-protected web browser application for example. Such revised route and delivery information can be downloaded to the handheld devices 112 such as for example while they are in cradles the night before delivery.

To begin using the handheld devices 112, user ID's and passwords are input to operate the handhelds in the non-limiting exemplary embodiment. Handheld displays aggregate route information such as total newspapers to be delivered, totals divided by newspaper title (for example local or regional newspapers, national or international newspapers, etc.). A list of all stops on a given route or trip can also be displayed. The handheld devices 112 can provide route functionality including display of name, address and delivery data of first and subsequent locations.

In one exemplary non-limiting embodiment, the handheld devices 112 can automatically lock the screen to avoid accidental tampering before reaching the destination if desired; the user can unlock the screen to proceed to delivery and return functions (described below) or to request additional address information and phone number for delivery location.

The illustrative handheld devices can provide a "delivery" function that gives the carrier instructions on what to deliver where. Such delivery instructions can include, for example, inventory of the number and type of products (e.g., newspapers by newspaper title) to be delivered at an outlet. The illustrative handheld devices 112 may also provide return function including accounting for delivery person retrieving left-over products such as newspapers from previous days' delivery (in some business models, the outlet does not pay for returned products such as newspapers). The user can input the number of returned products such as newspapers by edition. Product type (e.g., edition of returned newspapers) may be scanned in using handheld device's infrared scanner (for example, each newspaper can have a barcode that, when scanned using the infrared scanner, provides the newspaper title and date). The product type such as edition of returned newspaper may alternatively be manually keyed-in by the user. The user may also input the date of the returned products such as newspapers if the products are amenable to date description (the user may select date from a pull-up calendar for example). In a newspaper context, the user selects the edition of the returned newspaper by clicking the appropriate newspaper title indicated in a drop-down menu generated after the date of a returned newspaper is selected.

In an illustrative non-limiting embodiment, the handheld devices 112 may provide summary functionality including a summary report of delivery and return activity, including time of delivery and time of returns for example. The handheld devices 112 may provides outlet signature block capture (e.g., if the outlet requires a signature of employee to confirm summary report). The handheld devices 112 can for example prompt the user to obtain a signature before going to next outlet. The signature block may appear on screen of the handheld device 112, and an outlet employee may sign the display itself using handheld device's "pen" or stylus. Display for a next delivery can appear after either acceptance of summary report by user when no signature required or signature by outlet employee.

After a delivery route is completed, aggregate delivery and return data can be compiled by handheld device 112. Return data can be verified against hand-counts of returned newspapers at distribution center. Such information can be uploaded to a server(s). A variety of reports may then be accessible via the local computers, including e.g., route information by delivery person, draw data by outlet, return data by outlet, shuffle data by outlet, and/or signature data by outlet.

Figure 2:
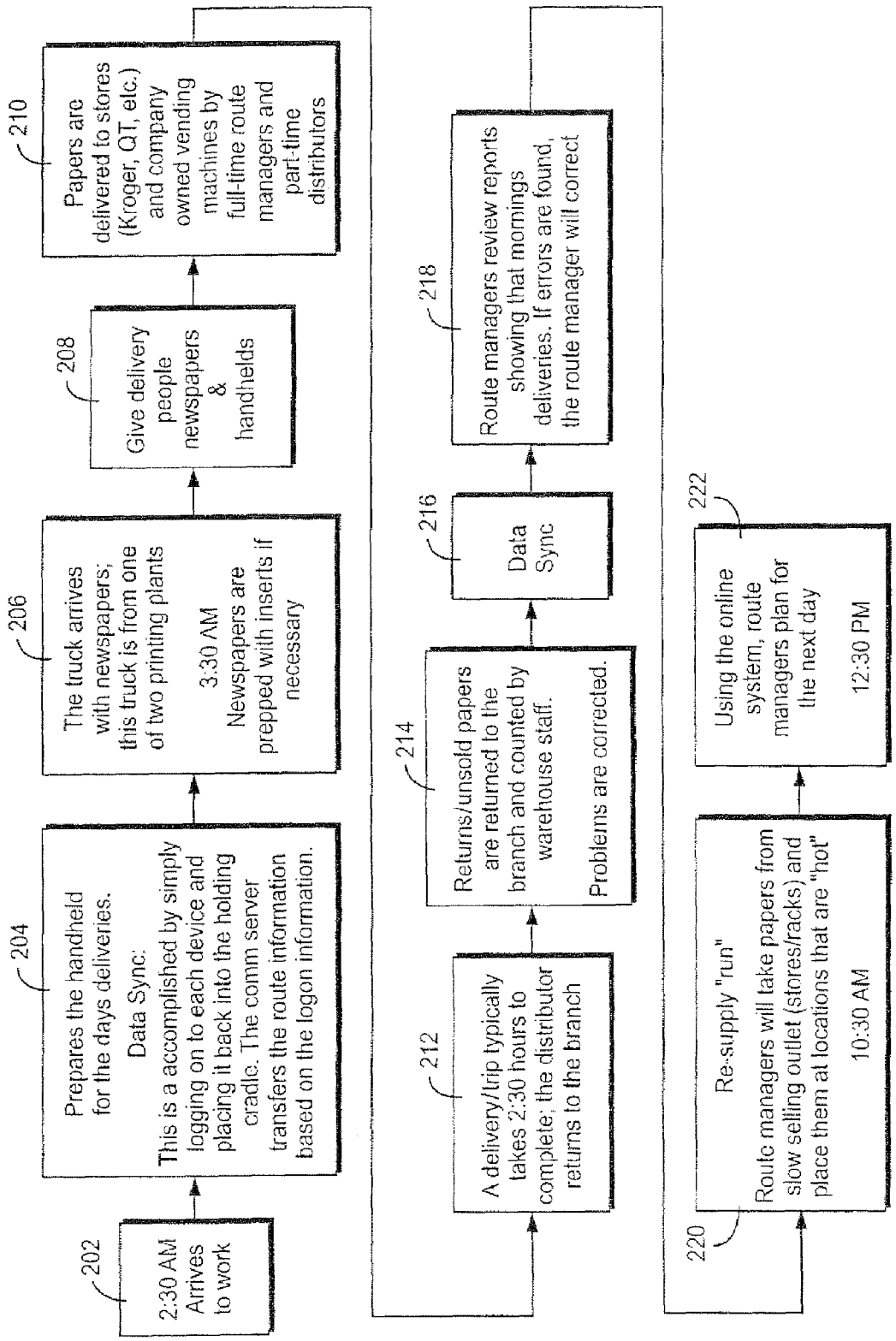
FIG. 2 is a flowchart showing example illustrative non-limiting perishable and time-sensitive goods distribution steps.

In more detail, FIG. 2 shows a flow chart of an example illustrative typical day of a delivery person 114 using exemplary illustrative system 100. A delivery manager typically arrives to work very early in the morning just before printed newspapers are scheduled to arrive at the distribution depot (block 202). The manager in one exemplary application prepares handheld devices 112 for use (FIG. 2, block 204). In one exemplary embodiment, the delivery manager places each of handheld devices 112 into a data exchange cradle coupled to network 104 and initiates a data synchronization operation. Many handheld devices 112 can be synchronized simultaneously in a "nursery" of cradles and associated handheld devices 112. Data synchronization can be performed automatically by automatically "waking up" each of handheld devices 112 and automatically initiating a data exchange/synchronization operation.

Soon, a truck arrives with the newspapers to be delivered (FIG. 2, block 206). The delivery manager and/or other personnel prepare the newspapers or other units as necessary (e.g., by placing them into waterproof bags if weather dictates, insert appropriate inserts, etc.). The delivery manager then gives each delivery person 114 an allotment of newspapers or other units and a handheld device 112 programmed with particular delivery route/trip instructions (FIG. 2, block 208). Handheld devices 112 can be pre-associated with particular delivery personnel 114 since it is often more efficient for the same person to follow the same route and trip every day.

The delivery personnel 114 all leave on their respective delivery routes to deliver the newspapers or other units to retail stores, vending machines, and other distribution locations (FIG. 2, block 210). The delivery personnel 114 use handheld devices 112 to determine the particular locations to which they are to deliver newspapers and other units, the sequence in which they are to visit these locations, and the quantity and type of units to deliver to each location. In the newspaper business, it is usually desirable to deliver newspapers to retail locations just before they open but after store employees have arrived to accept the delivery. Different retail locations open at different times of the morning (for example, grocery stores may open before drug stores, and gas stations and convenience stores may be open twenty-four hours a day). System 100 allows route managers 110 to schedule delivery sequences based on retail outlet opening times to maximize efficiency and reduce delivery personnel down time—thereby getting as many newspapers into open retail outlets as early as possible consistent with retail outlet opening times. Route managers 110 may also schedule deliveries to vending machines and other locations in terms of sequence either by time or by location in order to maximize the efficiency of the delivery personnel 114.

In the exemplary embodiment, handheld devices 112 provide opportunities for delivery personnel 114 to provide feedback to route managers 110 by, for example, inputting messages concerning retail outlet opening times, inconveniences or inefficiencies experienced by the delivery personnel actually running the delivery route, etc.

In the exemplary embodiment, when a delivery person 114 visits a retail outlet, he or she supplies the number and type of newspapers or other units specified by the information programmed into handheld device 112 for that particular retail outlet or other location. In one exemplary embodiment, delivery personnel 114 may be delivering more than one product (e.g., a local or regional newspaper, and one or more national or international newspapers as one example). Handheld devices 112 can instruct delivery personnel 114 as to the quantity of each of several types of products to deliver to each location. Typically, the delivery person 114 permits the retail store owner or other representative to count the number of newspapers of each type that are being delivered. The delivery person 114 at the same time takes back and counts the number of unsold units from the previous delivery. Since the retail location may be billed and charged based on the number of units actually sold (i.e., number of units delivered and not returned), these counts translate directly into payments to be made by the retail outlet and it is therefore important to all concerned that these counts be accurate.

In the illustrative exemplary embodiment, when the delivery person 114 and the retail outlet representative have finished counting the number of units being delivered and the number of units being returned, the delivery person 114 can control handheld unit 112 to display these counts along with a space where the retail outlet owner or other representative can initial, sign or otherwise assent to the counts. Collecting retail store representative signatures verifying count accuracy can help resolve later disputes concerning billing or other problems. By eliminating paper signatures, system 100 avoids lost documents and simplifies filing and organization of retail store verification.

The delivery personnel 114 also has an opportunity to input into handheld device 112, for each retail outlet or other delivery location, any comments, problem observations or the like. These messages will be uploaded via network 104 to computing equipment 106 and brought to the attention of route managers 110 or other appropriate personnel as action items.

The delivery people 114 return to the distribution branch once they have completed their routes (FIG. 2, block 212). At this time, each delivery person 114 supplies the returns/unsold papers or other units to the warehouse staff for counting (FIG. 2, block 214). In the illustrative exemplary embodiment, handheld devices 112 compute return totals for the day based upon the number of returns logged at each retail outlet or other delivery location. This return total computed by handheld device 112 should match the number of returned units the delivery person supplies to the return depot. Any disagreements are resolved on the spot, and handheld devices 112 may be used to collect appropriate verification or authorization information confirming the returns (e.g., by collecting signatures, initials, or verifying employee identification information in real time).

In the exemplary embodiment, a data synchronization operation may then be performed to upload the data collected by handheld devices 112 (FIG. 2, block 216). This data synchronization operation thus provides efficient "batch mode" data uploading of an entire delivery route immediately after the route has been completed. In other applications or embodiments, it may be desirable to provide real time instantaneous feedback over a wireless or other link so that computing equipment 106 can monitor delivery routes in real time and dynamically adjust them while they are still in progress. The intermittent "batch mode" uploading technique has advantages in terms of cost-effectiveness, but as wireless communications capabilities become more pervasive and cost-effective, many applications may benefit from an instantaneous real time feedback and data collection reporting.

As collected data is reported via network to computing equipment 106, route managers 110 may review reports showing deliveries (FIG. 2, block 218; see also FIGS. 18-24). Reports may include daily sales summary by route (FIG. 18), branch (FIG. 19) or department (FIG. 20); route time stamp (FIG. 21); Branch time stamp (FIG. 22); setout sheets (FIG. 23); and daily draw variance (FIG. 24). Route managers 110 may also be notified of an exceptions or messages collected by handheld devices 112 during the course of a route or trip delivery.

If route managers 110 discover, based on the data collected by the handheld devices 112, that delivery errors have been made, the route managers can take corrective action. In one example, such corrective action may include a variety of options, for example picking up the telephone and asking a delivery manager to solve the problem. However, system 100 provides additional flexibility in allowing the route managers 110 to formulate additional re-supply delivery routes directing delivery staff 114 to go out into the field again to cure problems. Such additional delivery instructions can be created using computing equipment 106 and transmitted to the same or additional handheld devices 112 so as to increase efficiency and maintain all delivery instructions within the context of system 100.

Meanwhile, it may be desirable for distribution personnel 114 to operate a so-called re-supply or "shuffle" run. This involves delivery staff 114 taking newspapers or other items from slow-selling outlets and moving them to locations where they are more likely to sell (FIG. 2, block 220). For example, a retail outlet having a substantial overstock of daily newspapers will not mind if some of its overstock is shifted to another location so long as accurate records are maintained (so that the retail outlet is not charged for the shifted overstock) and the first retail outlet with overstock still has enough units to sell.

In the exemplary illustrative embodiment, a delivery person 114 who performs a "shuffling" operation inputs the count and type of newspapers or other products being moved from one delivery location to another into handheld devices 112. The handheld devices 112 collect this data and report it to computing equipment 106 to update the maintained database(s) and provide accurate reporting, billing and the like. Delivery personnel 114 take appropriate action (e.g., returning to the distribution depot or otherwise) causing their handheld devices 112 having collected such "shuffle run" data to report the updated information to computing equipment 106 via network 104.

In one exemplary illustrative embodiment, all handheld devices 112 are returned by delivery personnel 114 to the distribution depot at the end of their work shift so that data collection is completed and the devices are available to be programmed for the next delivery. In other arrangements, delivery personnel 114 might maintain possession of the handheld devices 112 and trigger data synchronization and reporting via a cradle connected to network 104, a wireless link such as radio frequency or infrared, via a dial up link, or by supplying a removable memory module to the distribution manager, or via any other convenient data exchange mechanism.

In the exemplary embodiment of system 100, computing equipment 106 provides complete updated information concerning the delivery run soon after the delivery has been completed. Route managers 110 can go online via web browsing appliances 102 to do route planning for the next delivery (FIG. 2, block 222). The route managers 110 have the benefit of all of the data and information collected during the immediately preceding delivery in formulating the plan for the next delivery. This data is very helpful in allowing the route managers 110 to dynamically respond to a variety of changing conditions that may impact the efficiency of the next delivery.

Example Implementation of Computing Equipment 106 and Handheld Devices 112

Figure 3:
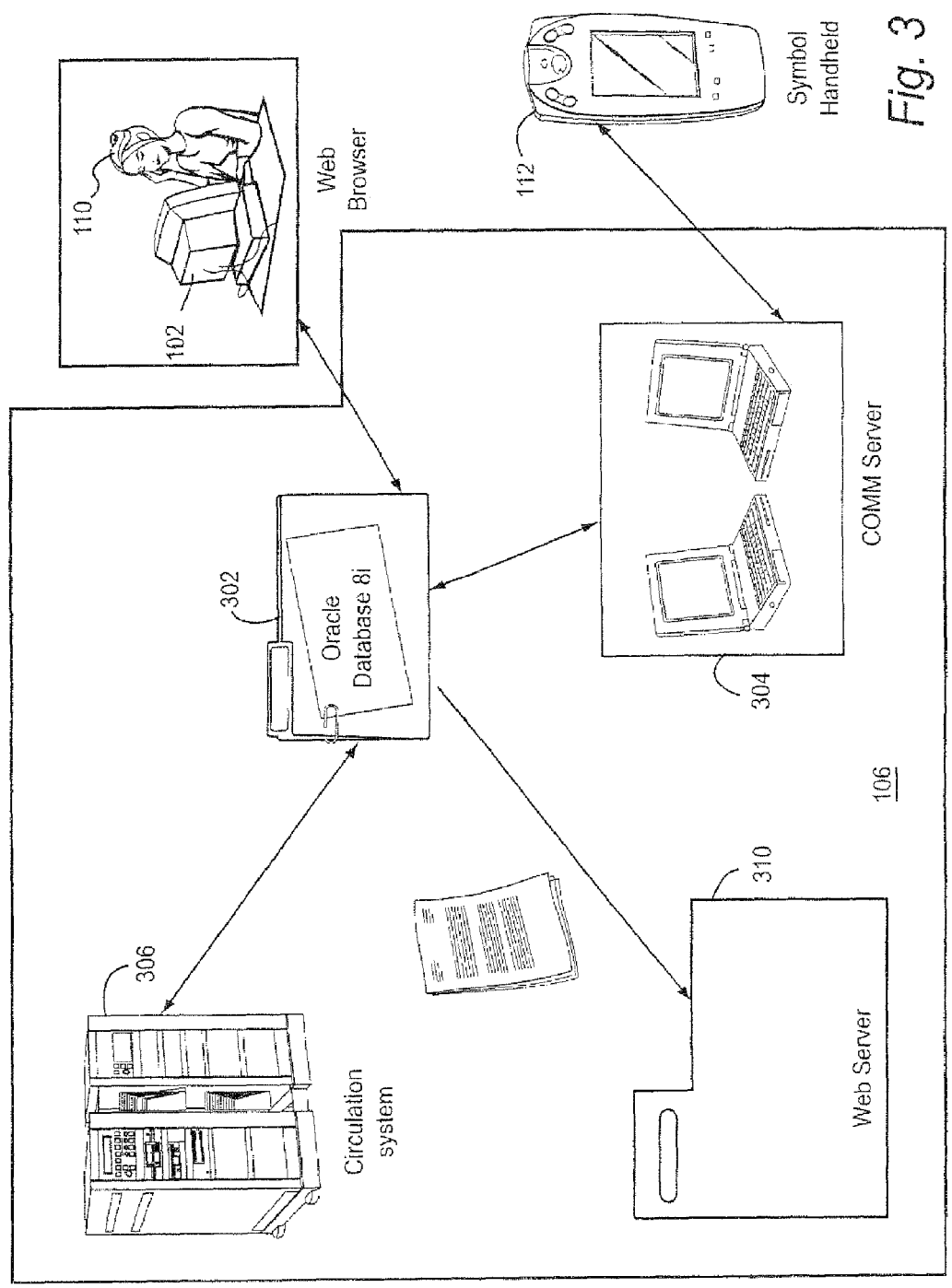
FIG. 3 is a schematic illustration of an exemplary illustrative implementation of system 100 computer infrastructure.

FIG. 3 is a schematic illustration of one illustrative example implementation of computing equipment 106. In the FIG. 3 illustrative implementation, computing equipment 106 includes:
 a database server 302,
 a communications server 304,
 a circulation computer system 306, and
 an application web server 310.

As illustrated in FIG. 3, route managers 110 access database server 302 via web enabled appliances such as, for example, personal computers or any other appliances having a display and a user input means. Appliances 102 can be connected to a local area network, the Internet, wireless networks, or by any other convenient means. Database server 302 works in conjunction with application web server 310 to provide a web-based user interface that permits route managers 110 to easily and conveniently input data into database 302 as well as to view raw or analyzed data on easy to understand user interface screens. Because system 106 is web-enabled, a variety of conventional existing technology can be used or adapted to provide effective and efficient functionality accessible via appliances 102.

In the example shown in FIG. 3, a communications server 304 coupled to database server 302 handles all communications between computing equipment 106 and handheld devices 112. The particular configuration of communications server 304 depends on the number and type of handheld devices 112, the communications links used to communicate with the handheld devices, and other factors. In the example shown, a circulation computer system 306 may interface with database server 302 to provide a variety of conventional "back office" functions including for example billing support, additional data entry capabilities, access to legacy data stores, etc. In some installations, for example, the "back office" computer system 306 might comprise a large mainframe computer having a variety of legacy software and other functionality. In other installations, circulation computer system 306 might be limited in its functionality to billing matters with web server 310 supplying the primary functionality in terms of maintaining subscriptions and delivery data in conjunction with database 302 and web browser 102.

In one exemplary illustrative embodiment, devices 112 comprise conventional portable handheld data entry and display devices with customized programming. For example, in one exemplary configuration, devices 112 may provide the basic architecture shown in FIG. 3A including:
 a communication arrangement 116,
 a processor 118,
 a data/program store 119,
 a display 120,
 an input arrangement 122,
 a real time clock/calendar 123,
 an internal power supply 125,
 a bar code reader 112,
 an infrared data transceiver port 127,
 other capabilities.

FIG. 3B shows one example implementation of a handheld device 112 including a rugged housing 126 providing a large, easy-to-read display 120 and a number of input arrangements 122 including buttons, a bar code scanner 122bcr, etc. The various buttons 122 are used to input information into device 112 and/or to navigate displays provided on display 120 based upon information stored on internal data/program store 119. In one exemplary illustrative embodiment, display 120 comprises a touch screen type display that allows selection of displayed "buttons" through use of a stylus (not shown).

In the case of the FIG. 2B illustrative device 112, communications arrangement 116 provides for intermittent data exchange via network 104 by placing the device into a cradle such that information can be uploaded from and downloaded into the data/program store 119. Such data exchange may be accomplished in any number of ways using any number of standard conventional protocols. Examples include:

Ethernet or other local area network data exchanges,
wireless messaging such as WAP, BlueTooth, 802.11, etc.,
dialup data exchanges,
DSL, broadband or other high bandwidth data exchange,
insertion/removal/replacement of Flash or other non-volatile replaceable memory,
infrared data exchange,
any other technique for providing continual, intermittent or other data exchange.

More Detailed Exemplary Implementation of Computing Equipment 106

Figure 4:
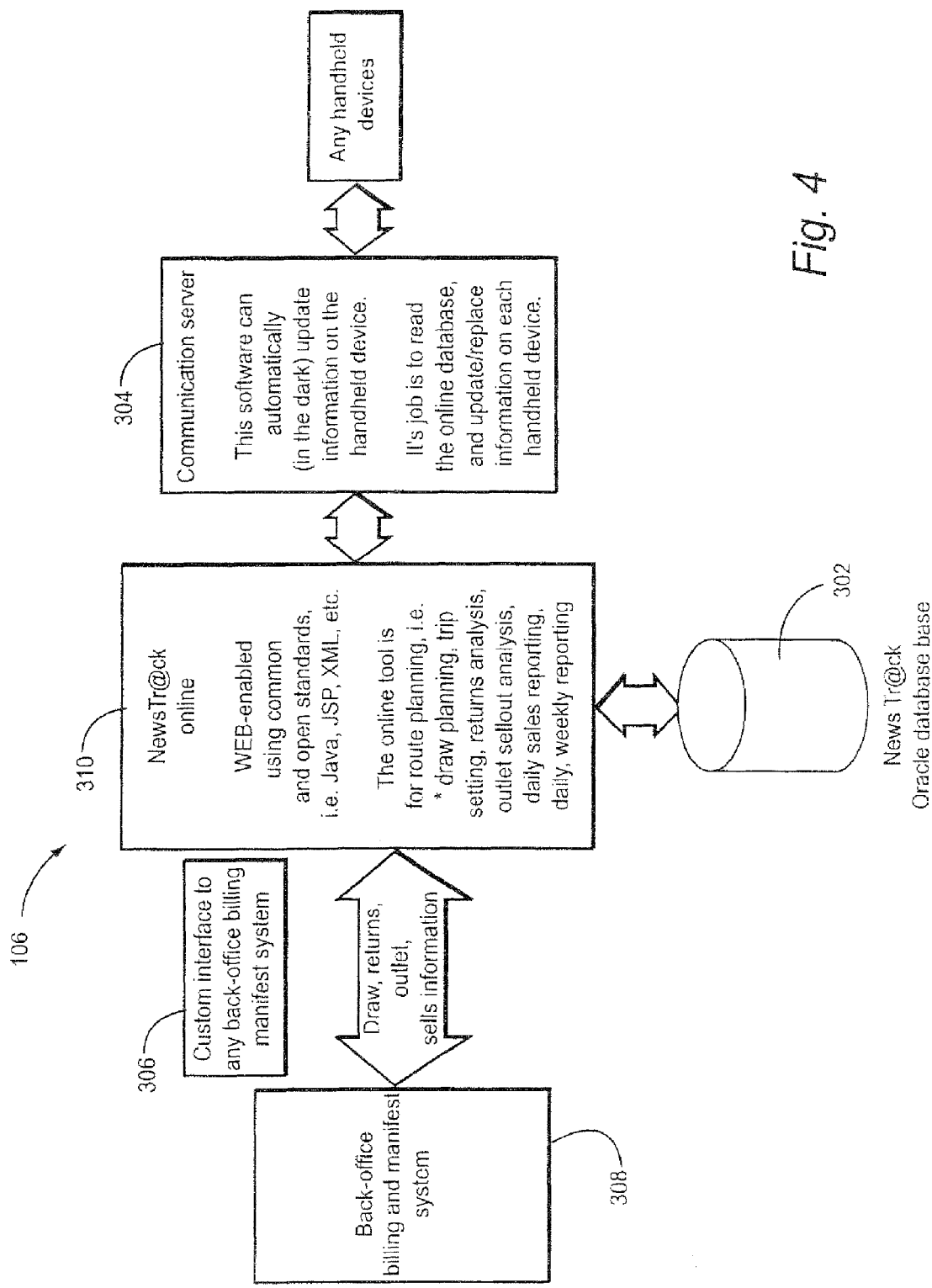
FIG. 4 shows a more detailed example implementation of computer infrastructure.

FIG. 4 shows a still more detailed view of an exemplary implementation of computing equipment 106. In this particular implementation shown, web server 310 may provide a variety of online tools for route planning such as for example:

draw planning,
trip setting,
returns analysis,
outlet sellout analysis,
daily sales reporting,
daily reporting,
weekly reporting,
other functionality.

Web server 300 allows route managers 110 to manipulate the draw and run lists for any desired of number of different delivery routes. Web server 300 in the exemplary illustrated embodiment also provides delivery receipts via fax, email or local printer to individual retail outlets or other locations. Route managers 110 are also able to view various reports for their area or route(s). Route managers 110 use standard Internet browsers operating on web enabled appliances 102 to perform these tasks from business locations or their homes. In the exemplary illustrated embodiment, web server 310 may run on any of a variety of conventional computers and may be programmed based on any of a variety of application programming languages including for example Java, JASP, XML, etc.

In the exemplary embodiment, database server 302 stores databases of route information. In one exemplary embodiment as mentioned above, database server 302 may cooperate with the back-office billing and manifest system 308 and/or a circulation computer system 306. For example, in one exemplary implementation, the master subscriber and route delivery database is stored and maintained by circulation computer system 306, with database server 302 obtaining the information from that other computer on an as-needed basis and writing it into local databases the database server itself maintains. Changes can then be made to the route lists or any other appropriate data. When changes are complete, the data may be sent by database server 302 back to circulation computer system 306 for maintenance and archival. Database server 302 also continually updates its database contents based on information received by communications server 304, and provides route and other requested information on demand to particular handheld devices 112 via the communications server.

In the exemplary embodiment, communications server 304 is a temporary repository for data. Route information originating at circulation computer system 306 and/or within database 302 is passed to the communications server 304 and/or from the web server 310 as needed. The communications server 304 ensures that the correct route information is downloaded into each individual handheld device 112. The communications server 304 also collects the collected delivery information from the handheld devices 112 and passes it to web server 310, database 302 and/or circulation computer system 306. The communications server 304 may also facilitate property control of the handheld devices 112. In the exemplary illustrative embodiment, communications server 304 may comprise one or more computers running specialized software that can automatically update information on handheld devices 112.

Because of the use of open standards, web enablement and other features, the exemplary implementation shown in FIG. 4 lends itself to an ASP/service bureau model of operation. Because web enabled appliances 102 can be located anywhere a data communications path is available, it is possible for report managers 110 to do their work at locations very distant from the installation of computing equipment 106. Similarly, there is no reason why communications server 304 needs to be local to the handheld devices 112 since the communications server can communicate its data via a wide area or other type of network 104 across great distances. Accordingly, computing equipment 106 shown in FIG. 4 could be operated on a shared basis for a number of different organizations that are geographically separated from one another. For example, a number of different newspapers could make use of the computing equipment 106 from all around the country or the world on a time-shared multiplexed basis. Alternatively or in addition, computing equipment 106 could be used by a national newspaper having a number of different branch offices located all around a region, the country or the world. Route managers 110 for different publications may all share access to computing equipment 106 and the associated resources of handheld devices 112 and delivery personnel 114 to provide efficient coordinated delivery of a wide variety of different products such as different newspapers, magazines, or virtually any other type of goods that need to be delivered.

Figure 5:
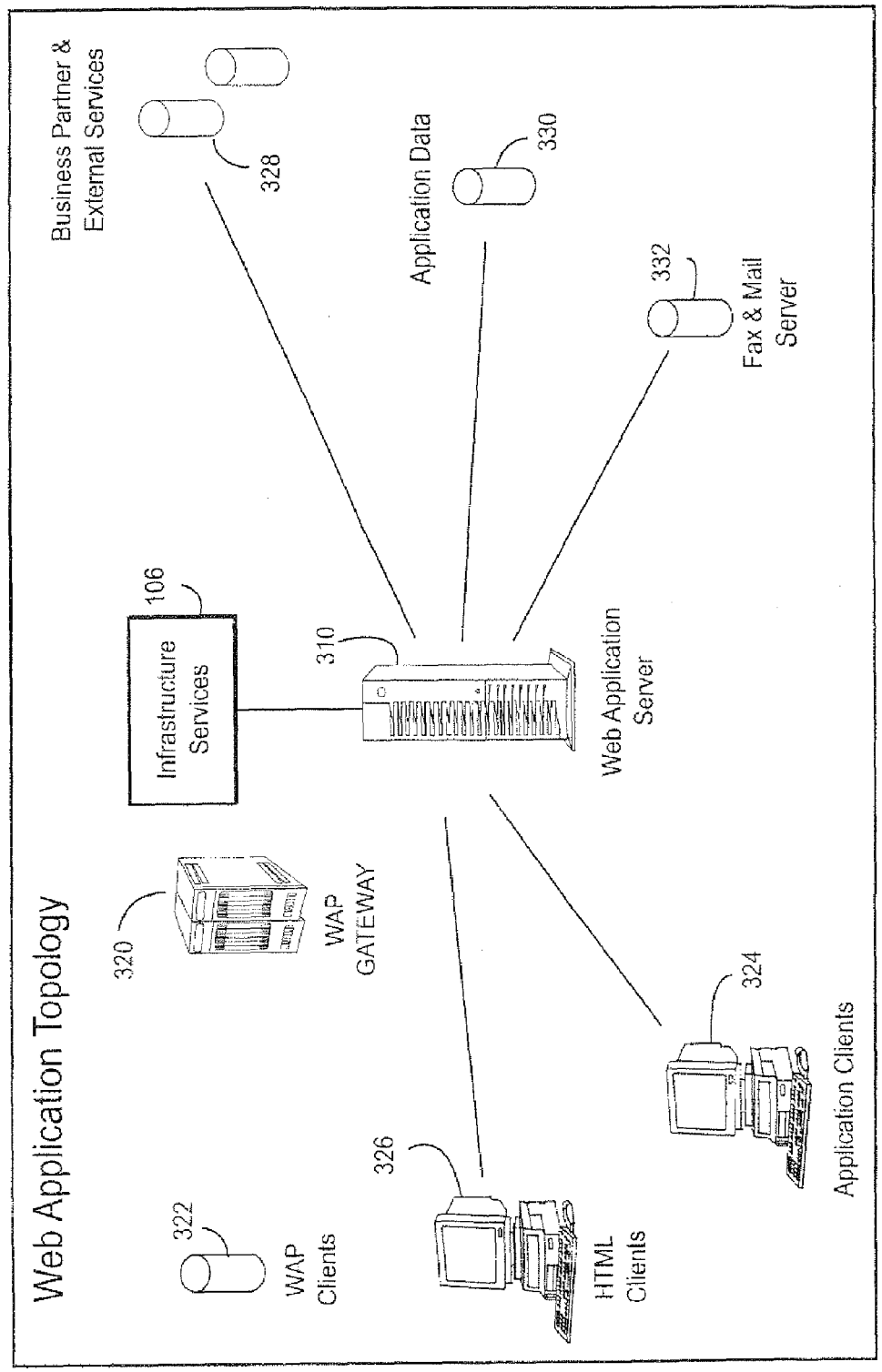
FIG. 5 illustrates an example web application topology.

FIG. 5 shows an example web application topology overlay for a particular implementation of the FIG. 4 system 106. In this exemplary web application topology, the computing equipment 106 represented by infrastructure services may be coupled to a WAP or other gateway 320 providing wireless or other access to WAP clients 322. Similarly, the web application server 310 may be accessed by application clients 324, HTML clients 326, and any number of other access points including for example business partner and external services 328, various sources of application data 330, fax and mail servers 332, and other applications and access points. In the FIG. 5 example, the user interface to be displayed on clients 322, 326 is generated by a web application that executes on the web application server 310. HTML and WAP clients 322, 326 may interact with the web application server 310 using HTTP, WAP or any other conventional communications protocol. Web application server 31—may respond to every request from clients 322, 326 with a new HTML/WML page.

Applications clients 324 may provide a user interface generated by part of a web application that executes on the client itself. An application client 324 may, for example, interact with the web application server 310 using HTTP, HOP, or any other convenient communications protocol.

Figure 6:
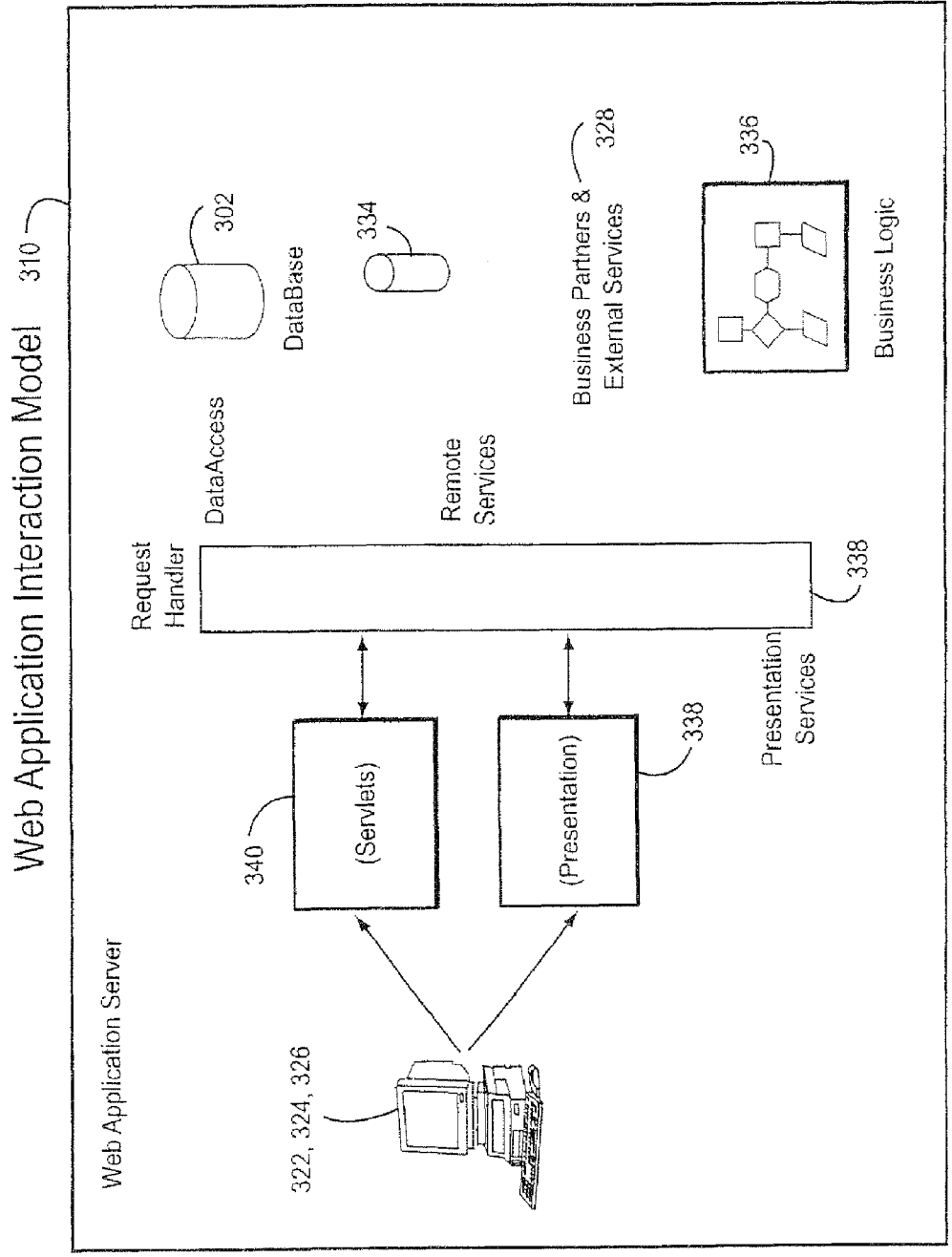
FIG. 6 illustrates an example web application server.

FIG. 6 shows an exemplary illustrative web application server 310 interaction model that may be used in conjunction with the FIG. 4 architecture. In this example, database 302, remote services 334 and business partner and external services 328 as well as business logic 336 may be accessed by a request handler 338. Request handler 338 may request presentation services for the various clients 322, 326, 324 from a presentation layer 338 and/or via conventional servlets 340. The presentation layer 338 may, for example, be based on conventional Java Server Page XML, XSTL or any other conventional presentation technique. In the exemplary embodiment, the business logic 336 provides logic used to accomplish the goals of the interaction with clients 322, 324, 326. Business logic programming 336 can be based, for example, on XML, EJB (Entity Bean), Business Objects (Java Bean), or any other conventional techniques for defining business rules and logic. Interaction control among the business logic 336, the presentation service 338 may be provided by servers 340 and via the request handler 338 which may provide both HTTP request handling and application requests handling in the exemplary illustrative embodiment.

Figure 7:
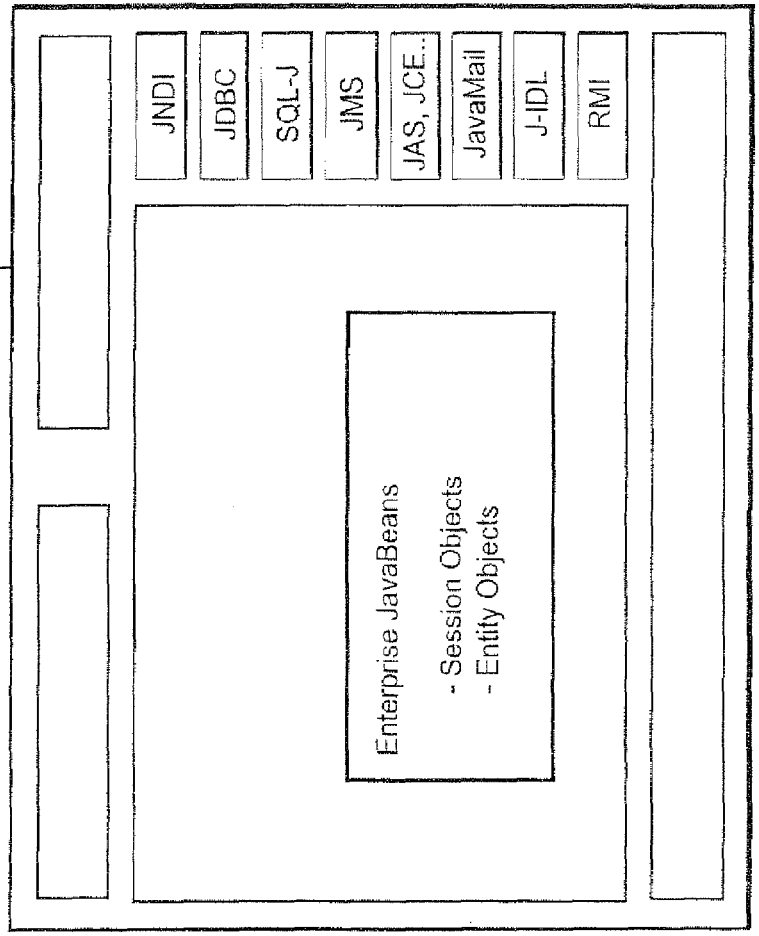
FIG. 7 illustrates an example business logic implementation.

FIG. 7 shows exemplary business logic 336 implemented using a variety of enterprise Java beans including session objects and entity objects. A variety of conventional interfaces and associated API's (e.g., JNDI, JDBC, SQL-J, JMS, JAS, JCE, Java Mail, J-IDL, RMI, etc.) may be used.

Figure 8:
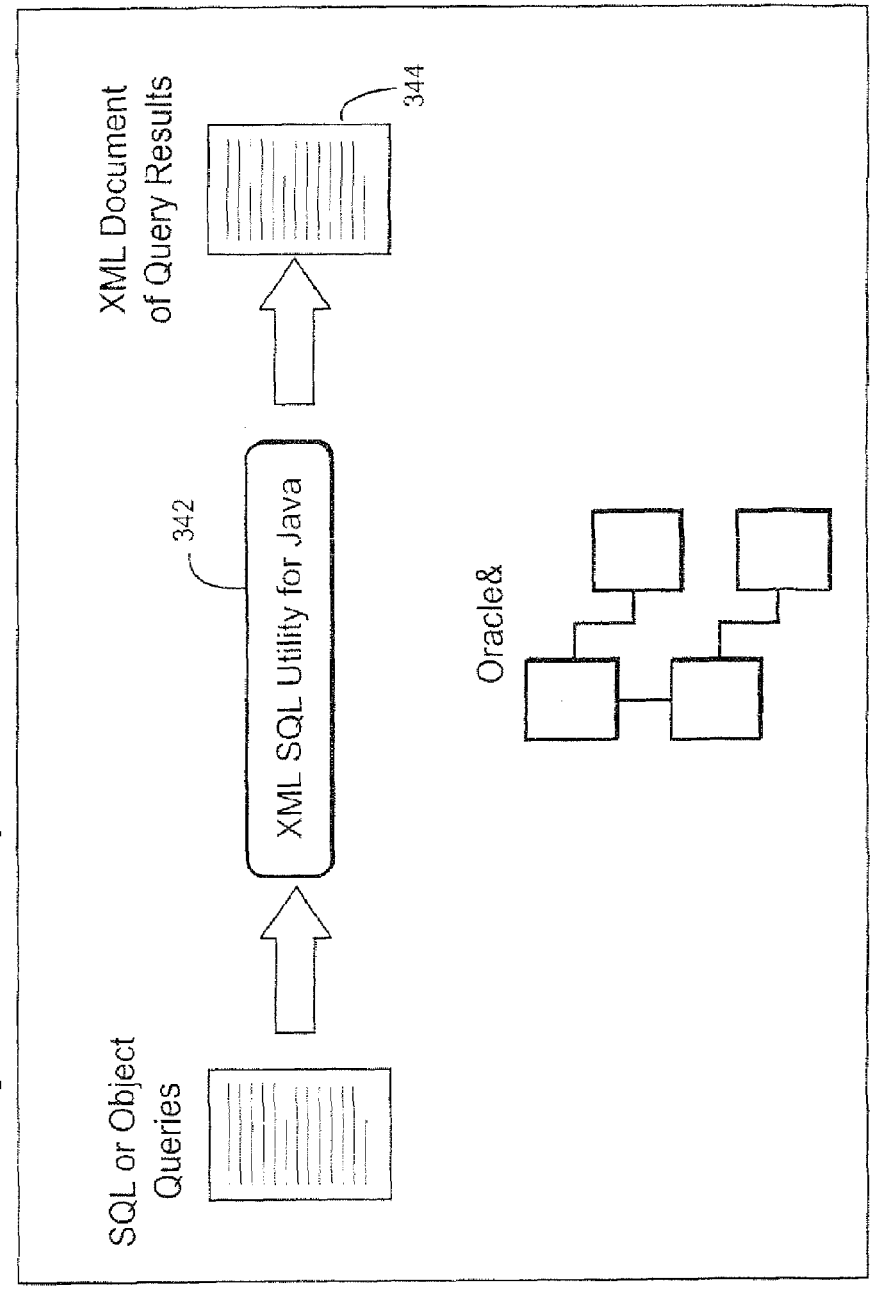
FIGS. 8-9 illustrate example database query/results translation.
Figure 9:
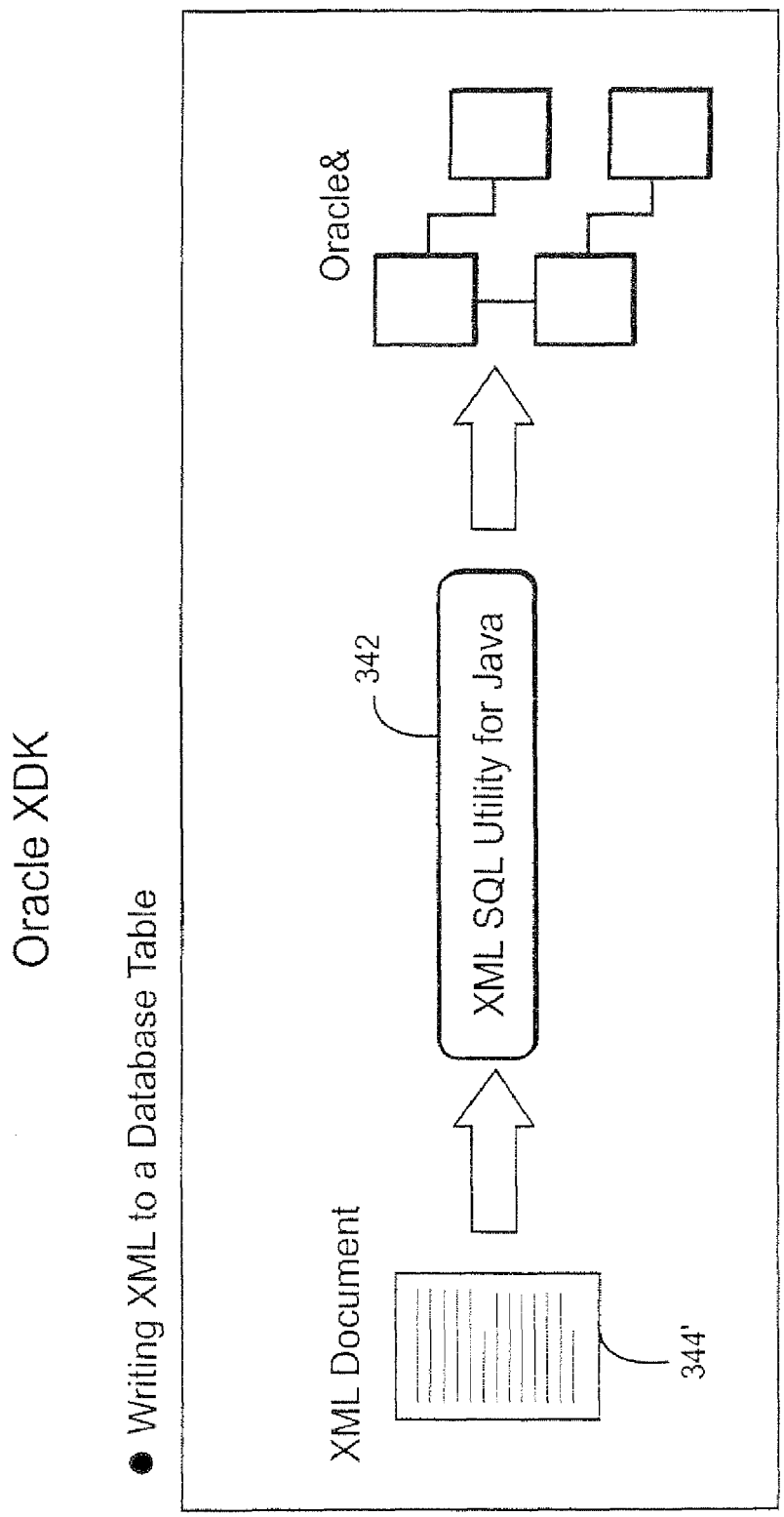

FIG. 8 shows example data access services provided through interface with or as part of database server 302. In this example illustrative embodiment, support for extended database services may be provided by leveraging the power of XML/XSTL to transform any raw database result set into standard XML, or by converting XML into any database with help of XSTL. In this example, SQL or object queries are passed through a XML SQL utility for Java (block 342) which provides a XML document 344 of the query result. This XML document can then be presented on a wide variety of different platforms. FIG. 9 shows an example technique used in the illustrative embodiment for converting an XML document 344 into SQL objects using the utility 342 so as to provide compatibility in the other direction.

Example Databases

In the exemplary illustrative embodiment shown, system 100 maintains a variety of different databases. Some of these databases are stored on handheld devices 112, while others of these databases are stored on database server 302. The databases may in some cases be generated on database server 302 and fully or partially downloaded onto handheld devices 112. In other cases, databases are created on the handheld devices 112 and are subsequently uploaded to the database server 302. Because of reliability and other issues, it is typically desirable for database server 302 to "know" everything that each of handheld devices 112 "knows", but in certain applications there may be instances in which handheld devices 112 store data that is not necessarily uploaded to database server 302 (e.g., permanent programming, security data or the like).

One class of database maintained by system 100 is read only databases that should in general be present on each handheld device 112. Other types of databases maintained by system 100 include the data collected by handheld devices 112. These collected databases will normally be backed up and removed from handheld devices 112 during any upload or download. In many cases, the databases that system 100 sends to the handheld computers 112 are subsets of the databases maintained on the database server 302. Generally, to conserve data exchange bandwidths and handheld device 112 memory storage space, data elements are typically included in the databases downloaded to individual handheld devices 112 only if they are actually going to be required by the application(s) running on the handheld devices. Generally speaking, all handheld databases are kept as small as possible and may be compressed if necessary to meet download time requirements.

Example databases maintained by system 100 include, as exemplary illustrations:

General information databases (these databases contain information specific to the route and general program information), holiday table database (used to designate which dates are on holiday/combined additions);

security table database (used for security in the web page application—used to authenticate access to web application server 310);

help database (contains screen specific help text used when "help" item is selected;

report types database (used to populate "report" screen on handheld devices 112—"canned" message texts include "rack damage", "rack stolen", "rack mech not working", "call store manager re draw", "call store manager re _____", other messages;

route delivery information database containing information about each route necessary for delivery (see example FIG. 10);

outlet table database (contains detailed information for each outlet on the route, allowing for single record updates on the handheld devices 112 (see FIG. 11);

route list database (contains the "run" lists). In general, there is a database for each product to be delivered on a given day. Preferably, three days worth of run list databases are maintained on each handheld device 112, while run list databases from previous days are deleted. There may be multiple run list databases stored on handheld devices 112 at all times for each day. Such run list databases contain the entire route for the product and day, although only the subset of the run list indicated by a selected trip is delivered by the delivery person 114 using a particular handheld device 112. In the exemplary illustration, there is one entry for each outlet on the route, and "route-number" is used to specify which true route number the outlet belongs to if this is a combined route. Note that a route manager for this route may, in an exemplary embodiment, edit a copy of the database and send it to other route personnel using an infrared transfer from one handheld device 112 to another. FIG. 12 shows an example route list database.

A draw history database stores draw, returns and net sales history. In the exemplary embodiment, there is an entry for each outlet, by outlet number and addition. FIG. 13 shows an example draw history database.

Edition table database is used to the edition numbers to names and attributes in the exemplary embodiment. The edition number is used as a key to other databases to provide linkages between databases. The edition table database may provide descriptions, valid days and other information. The "edition symbol" element is normally displayed by the handheld device 112 and other applications. An example of an edition table database is shown in FIG. 14.

An urgent instructions database contains urgent instructions for any outlet that requires them. Such urgent instructions are typically associated with specific run lists in the exemplary embodiment. These databases may be treated as "run list" databases and could be implemented as part of the run list database if desired.

Collected information databases are created to collect data for a run. They are presumably named or otherwise labeled so that they can be maintained and sorted by date. Examples of such collected information databases include the following in the illustrative embodiment:

Check-in database created from a check in screen and then passed to the communications server 304 during the check in process. This database may be maintained on the handheld devices 112 and uploaded during a check out process at the end of a delivery session. This database may include, for example, user ID, run number, date, sign in time, sign out time, etc.

Run delivery database contains all information collected for the run with the exception of a reports database. There is typically one entry per outlet or other delivery location in this run delivery database. An example of this database is shown in FIG. 15.

Time stamp database is used in the exemplary embodiment to store the time information collected while delivering the route. Several time stamps are preferably collected during the route delivery. The time stamp database may include, for example, an indication of the particular screen being displayed by the handheld device 112 at the time; an outlet number or other location identifier; and a time stamp providing the time in the amount of precision requirement.

Exemplary Handheld Applications

As described above, system 100 collects data at the route/outlet level, and formats it into usable data for variety of business reports and billing applications. In the exemplary illustrative embodiment, each delivery person 114 uses a handheld device 112 providing the following general operations:

receiving and storing manipulated route information,
recording newspapers sold, returned and associated signatures,
tracking reassignments of unallocated newspapers in the field,
uploading collected data to communications server 304 for processing,
time stamping operations and locations,
other functions.

Figure 16A:
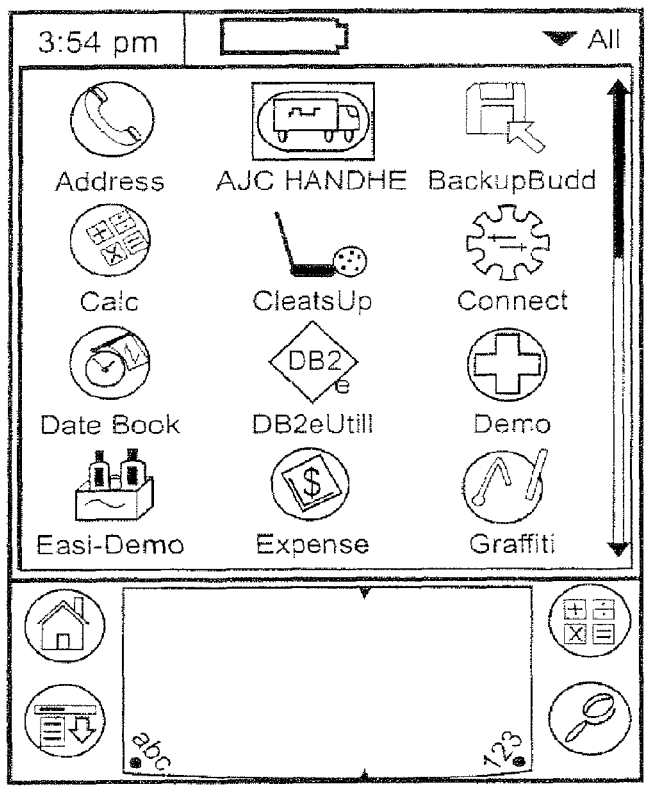
FIGS. 16A-Z and 16AA-16AC show example non-limiting illustrative handheld device screen display formats.
Figure 17A:
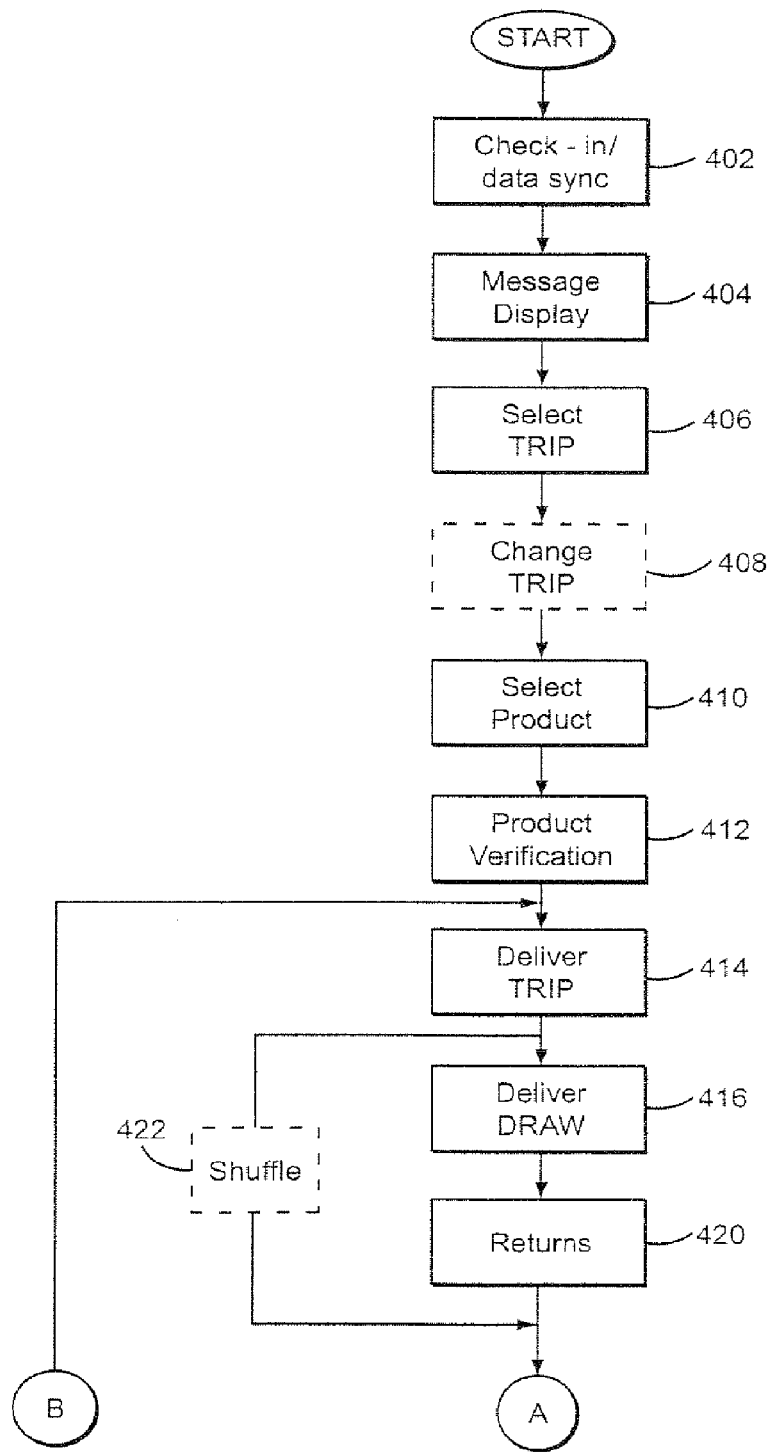
FIGS. 17A-17B show an example flowchart of illustrative non-limiting software executing on handheld devices.
Figure 17B:
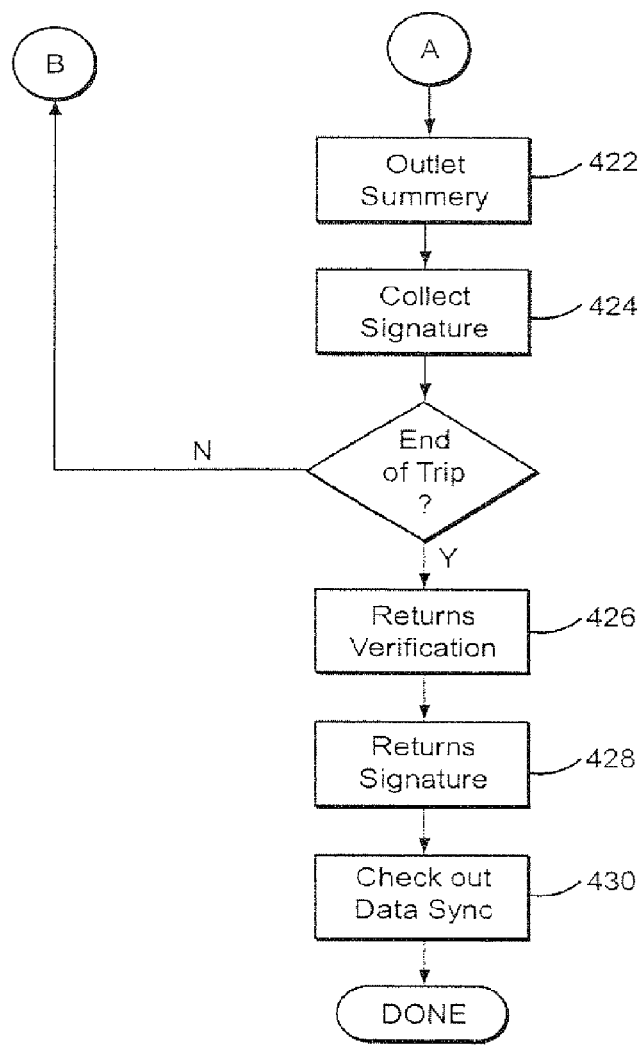

FIGS. 16A-16AC show example display screens provided by the illustrative handheld devices 112, and FIGS. 17A-17B show a flowchart of exemplary illustrative steps performed by handheld devices 114. The examples shown in these drawings are implemented on a PALM style device. Other handheld platforms would provide other styles of screen formats using different screen navigation techniques and the like. Generally, the exemplary screen displays provide a touch-sensitive user interface that can be activated by "tapping" with a stylus, writing symbols using the stylus, depressing buttons, etc. Custom screen overlays may be used to increase usability. Scrolling may be used to display more information than can fit on the screen at any one time. Customized assignment of user control buttons 122 may be used to provide more accessible user interfaces under certain conditions. For example, customized button assignments could include:

left side key—delivery
left middle key—returns
right middle key—shuffle
right side key—summary As discussed above, a conventional bar code may be printed on each product that system 100 is used to distribute. For example, a given newspaper may include, on each printed copy, a PDF bar code encoding the edition, date and day of the week. The bar code scanner 122*bcr* that is integral with exemplary illustrative handheld devices 112 can be used to automatically scan this bar code to avoid the need for user input in the field using a stylus. Handheld devices 112 may include additional data acquisition sensors such as for example wireless arrangements that query automatic counting mechanisms in newspaper or other vending machines and thereby acquire quantity-of-sale and/or other information.

Figure 16B:
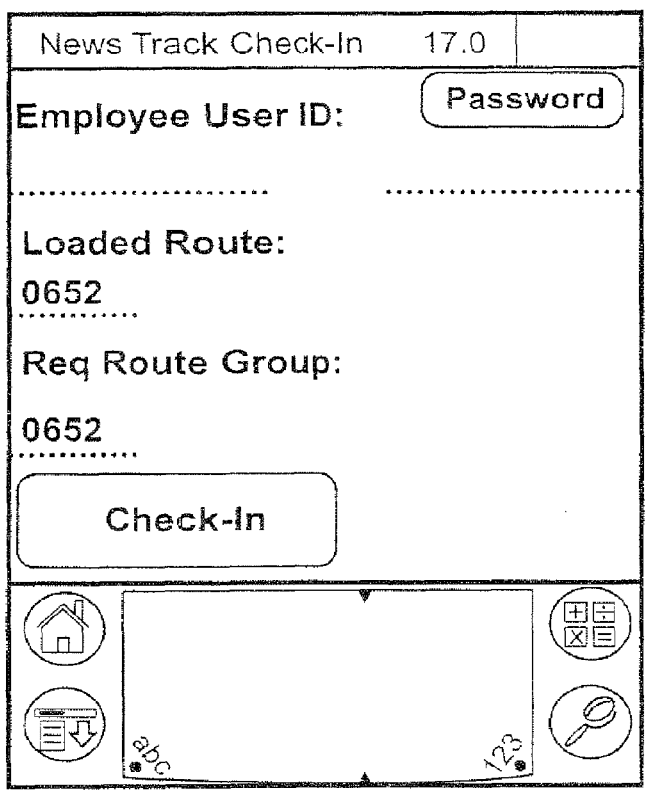
Figure 16C:
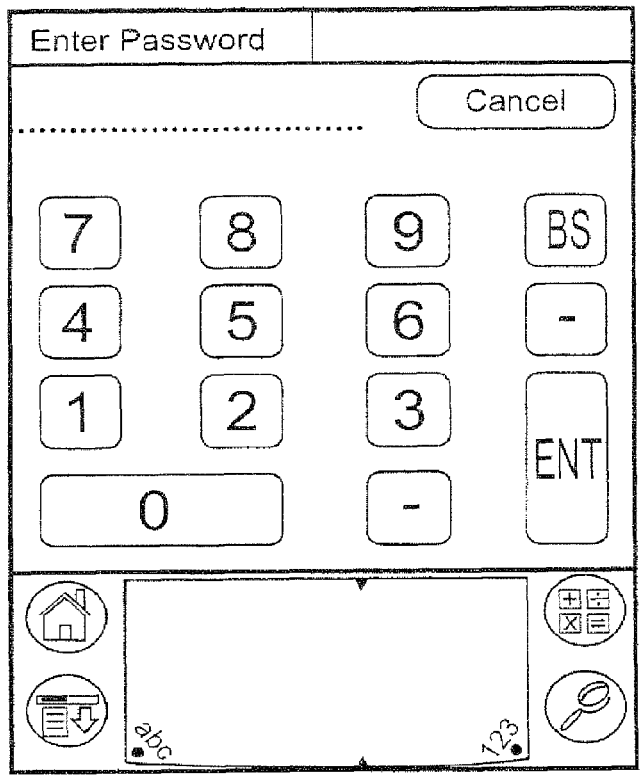
Figure 16D:
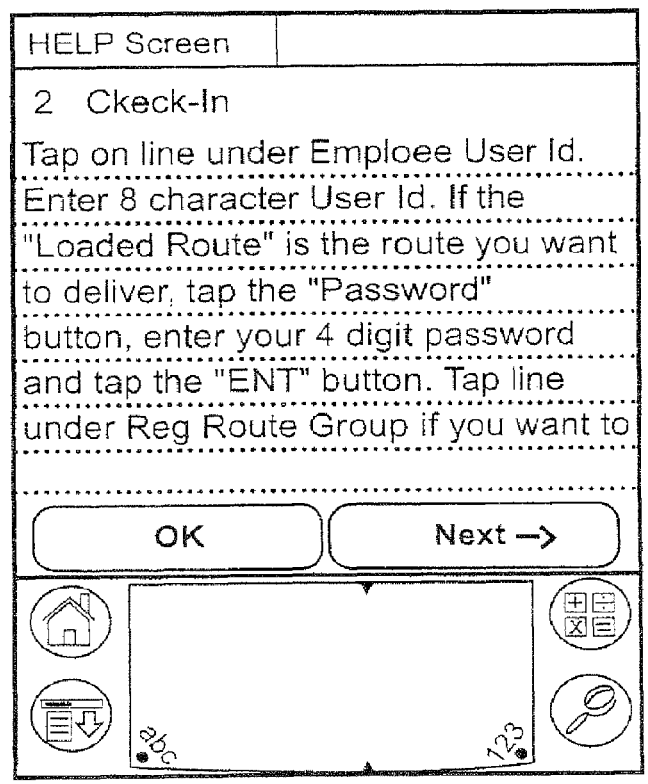

In more detail, in one exemplary non-limiting illustrative implementation, upon starting the customized application on handheld device 112, a "check-in" screen is displayed (see FIG. 17A block 402; FIG. 16B). In the exemplary illustrative embodiment, data upload/download is accomplished during the check-in operation since in one set of applications there is only intermittent interconnectivity between handheld devices 112 and communications server 340. As shown in FIG. 16B, the "check-in" screen requires data input of an employee user identifier and associated password. The employee user identifier may be inputted for example by using the barcode scanner 122 VCR to scan an employee badge encoded with a barcode. The associated password may be inputted using the stylus (see FIG. 16C).

At or prior to this time, requested route identifying information is inputted into the handheld device 112 which causes the handheld device to request and obtain a download from communications server 340 and computing equipment 106 of the route and trip information associated with that particular route. As shown in FIG. 16B, such download has already occurred since the handheld device 112 indicates that a "loaded route" is "0652." During such download operations, any outdated databases are updated and any collected data that has not previously been uploaded is uploaded. Software versions may also be checked and updated as necessary. The real time and date maintained by the handheld device 112 real time clock 123 is also updated to match a master time clock. Such a data exchange operation can be initiated using the FIG. 16B display screen by inputting the requested route group and then tapping the "check-in" button.

Once a download is complete, a message to that effect (not shown) may be displayed. Status messages may be displayed during the download operation providing an indication of progress such as for example "connecting to server," "connected to server," "downloading route information," "download complete," "server unavailable," or "download failed." In the exemplary illustrative embodiment, the databases for the current day and the next two days are all loaded at once. A time stamp may also be collected upon completion of this operation.

Figure 16E:
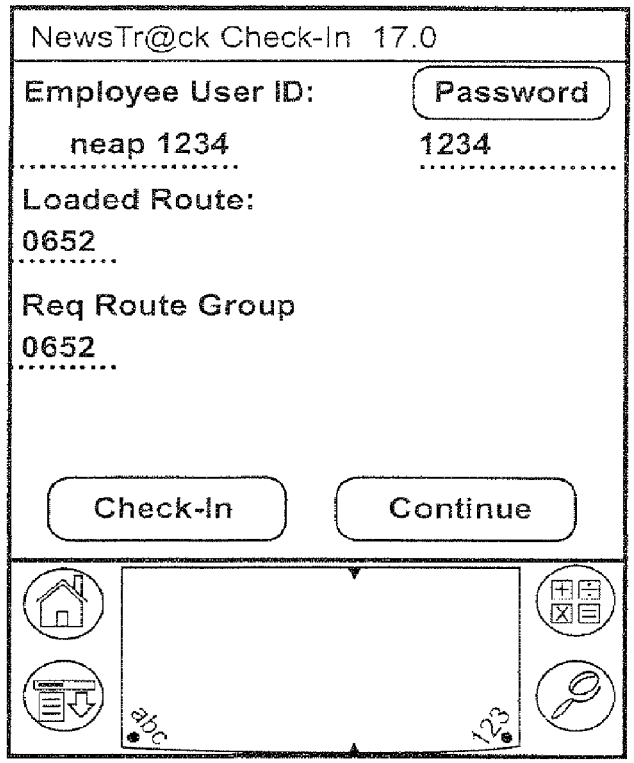
Figure 16F:
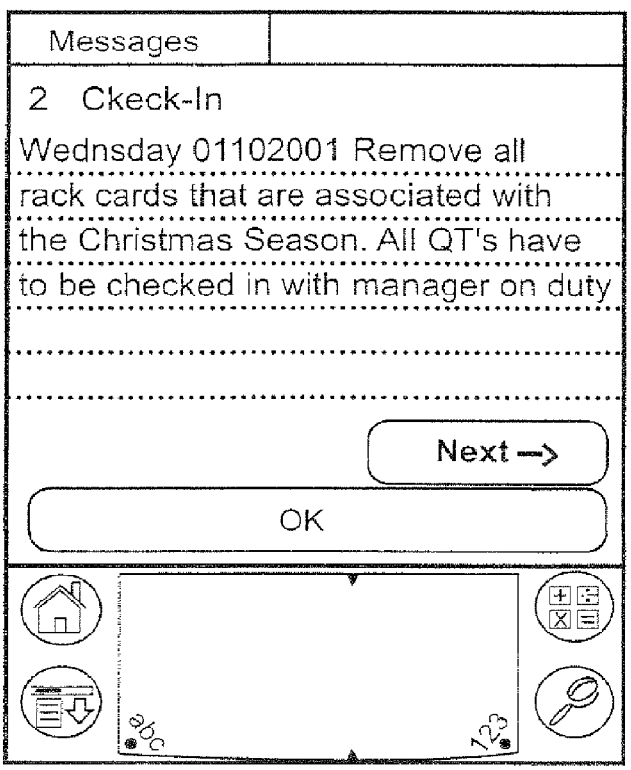
Figure 16G:
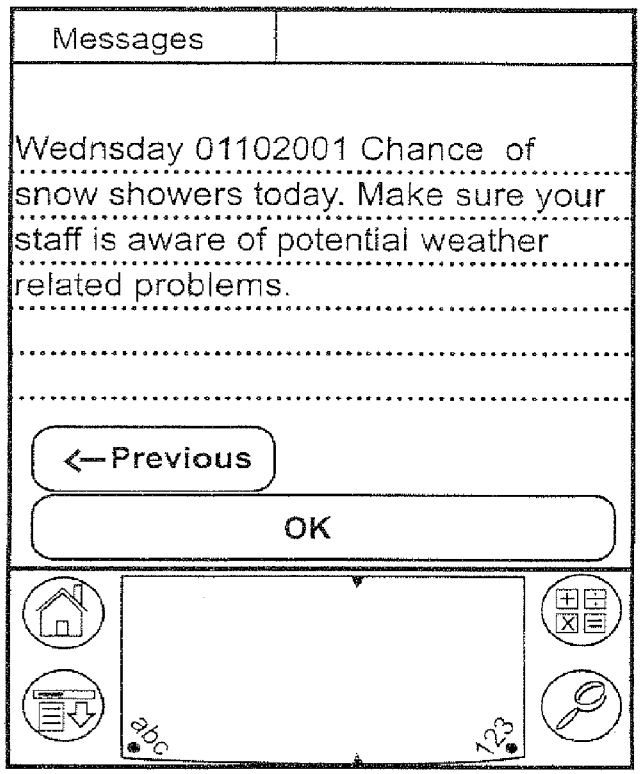

Once the delivery person 114 successfully logs onto the handheld device 112 (FIG. 16E), the device may display the text of messages received during the download to be displayed to the delivery person (see FIG. 17A, block 404). Such messages can be, for example, general messages for all delivery people 114, or they can be specific messages pertaining to the particular route that has been downloaded into that particular handheld device 112. See FIGS. 16F, 16G for an example of different message display screens.

Figure 16H:
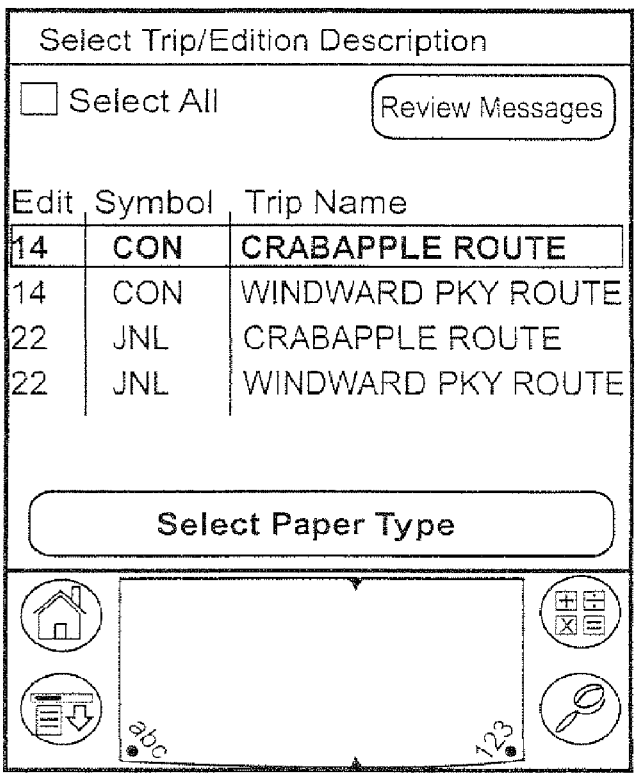

In the exemplary illustrative embodiment, handheld devices 112 next display a "select trip" screen that solicits the delivery person 114 to select between one of potentially several delivery routes that have been downloaded into handheld device 112 (FIG. 17A, block 406). In the exemplary embodiment, the FIG. 16H screen displays all delivery trip records for the route for the current day and time and requests the user to select an assigned delivery trip (e.g., by "tapping" on the check box with a stylus or otherwise making a selection). These different "trips" within a route are typically selected individually except in a "route manager mode" allowing a route manager to select the entire route (e.g., in the case of late draw changes or because of extremely late delivery trucks or personnel problems).

Figure 16I:
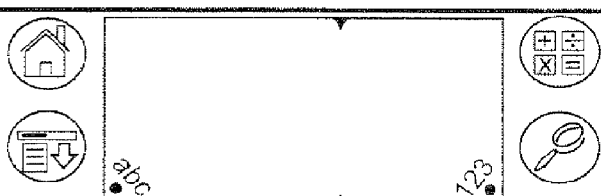
Figure 16J:
Figure 16K:
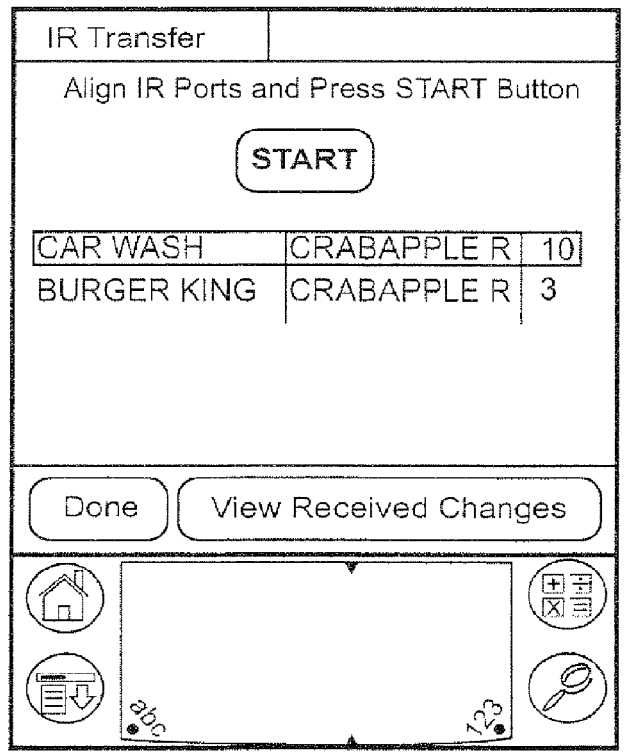
Figure 16L:
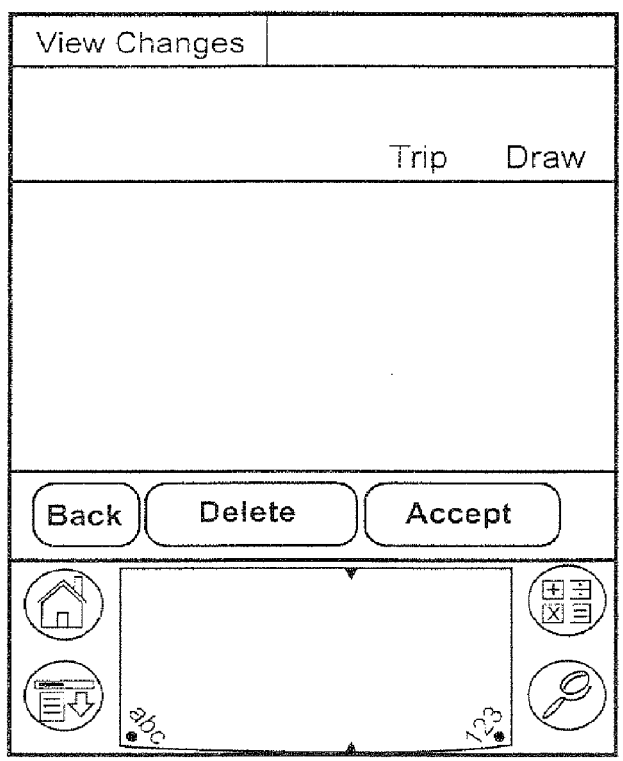

FIGS. 16I, 16J show example screens showing flexibility in terms of allowing trips to be changed on the handheld device 112 after downloading (FIG. 17A, block 408). For example, the operations shown in FIGS. 16I, 16J show how it is possible (with appropriate security authorization) to transfer a particular delivery location from one trip (e.g., Crabapple route) to a different trip (e.g., Windward Parkway route). Since it is possible and in fact often happens that multiple delivery people 114 deliver different trips of the same route, such a transfer may effect a transfer of responsibility for that particular location from one delivery person 114 to another. In the exemplary embodiment, this transfer is accomplished by using an infrared communication port 127 to communicate the individual location information from one handheld device 112 to another. See FIGS. 16K, 16l.

Figure 16M:
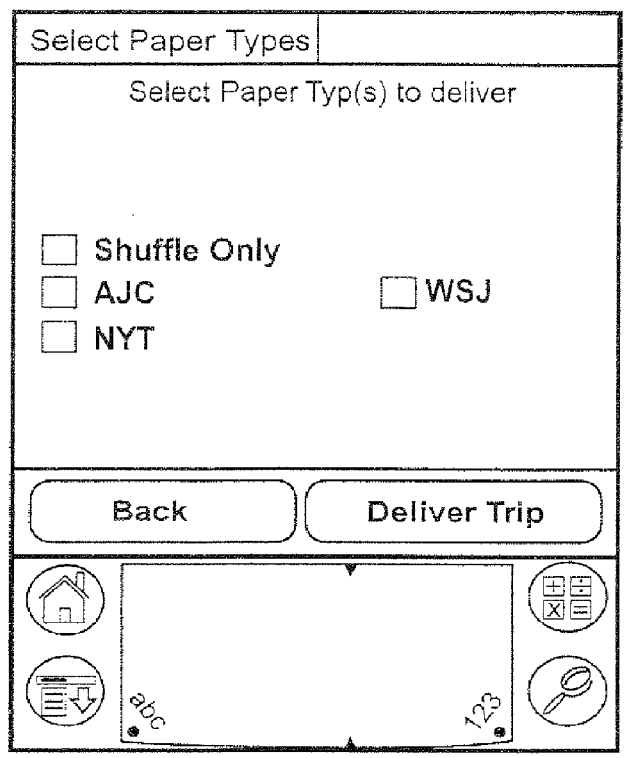
Figure 16N:
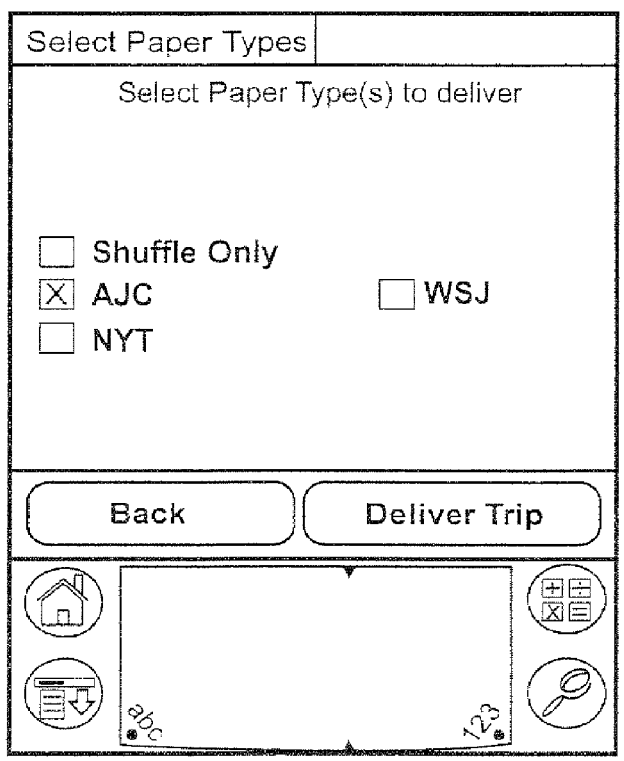

In the exemplary illustrative embodiment, the handheld device 112 next requests delivery person to select a product (see FIGS. 16M, 16N; FIG. 17A block 410). In the example embodiment, such a "select product" screen may include:
 shuffle only,
 newspaper or other product 1,
 newspaper or other product 2,
 newspaper or other product 3,
 other.

In the exemplary illustrative embodiment, the "shuffle only" option indicates that the draw for this run is to be ignored, that no papers will be delivered from the outlet's draw, and that only shuffle papers will be delivered or removed. Otherwise, a delivery person 114 is able to select any or all of the other listed products to indicate that he or she is going to deliver only one, or any combination of the other products. In the newspaper delivery context, for example, a delivery person 114 may be delivering a local or regional newspaper as well as national newspapers such as the New York Times and the Wall Street Journal.

In the exemplary embodiment, a "product verification" screen is next displayed asking the delivery person 114 to verify the product selection he or she has made (see FIG. 16O; FIG. 17A block 412). This same screen in the exemplary embodiment also displays the total draw (i.e., number of newspapers to be drawn from the depot) associated with this particular route and selected product.

The illustrative exemplary embodiment next displays a "delivery trip" display showing each of the delivery locations associated with that particular trip (see FIG. 16P, FIG. 17A block 414). Each location is shown along with the number of newspapers or other products to be delivered to that location. The delivery person 114 typically travels to one of the destinations displayed on this screen, and selects a "delivery" button to cause display of a "delivery" screen shown in FIG. 16B (FIG. 17A, block 416). The "delivery" screen shown in FIG. 16Q is the primary screen used in the exemplary illustrative embodiment for the delivery of newspapers and other products to outlets.

Figure 16Q:
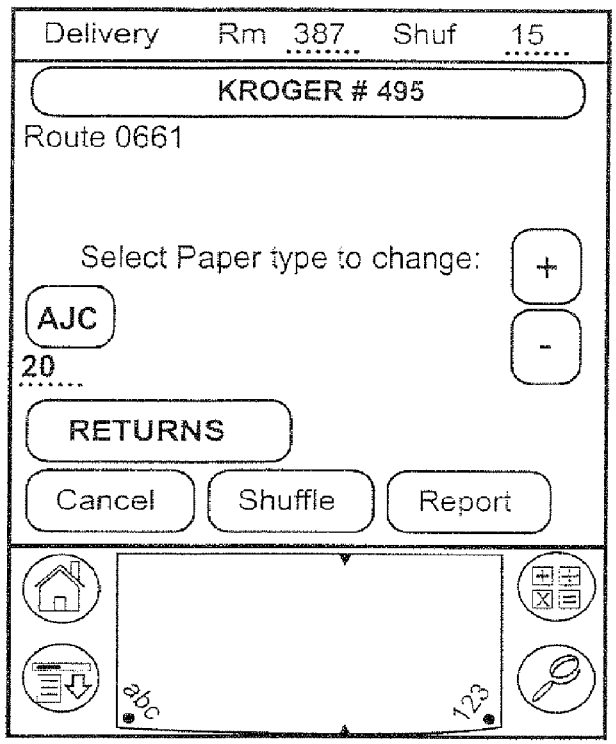

The delivery screen of FIG. 16Q indicates the "draw" for that location, i.e., the number of units of the product(s) to deliver to that location. The delivery person 114 in the illustrative embodiment is able to modify the draw for particular locations at this time (see FIG. 16Q; FIG. 17A, block 416). For example, delivery personnel 114 may dynamically modify the draw for a particular newspaper or other product based on the request of the retail outlet representative, or other factors within the judgment of the delivery person. The stylus is used to select an item to adjust ("plus" or "minus" signs increment or decrement the draw or quantity of newspapers to be left at that location). If that particular outlet does not accept or need all products being delivered, then the handheld device displays 112 only the particular products that are to be delivered to that location in the exemplary embodiment. In one exemplary embodiment, the delivery person 114 may then scan the barcode of a particular newspaper or other product to be delivered in order to confirm that the corrected edition and product is being left at the location.

Figure 16R:
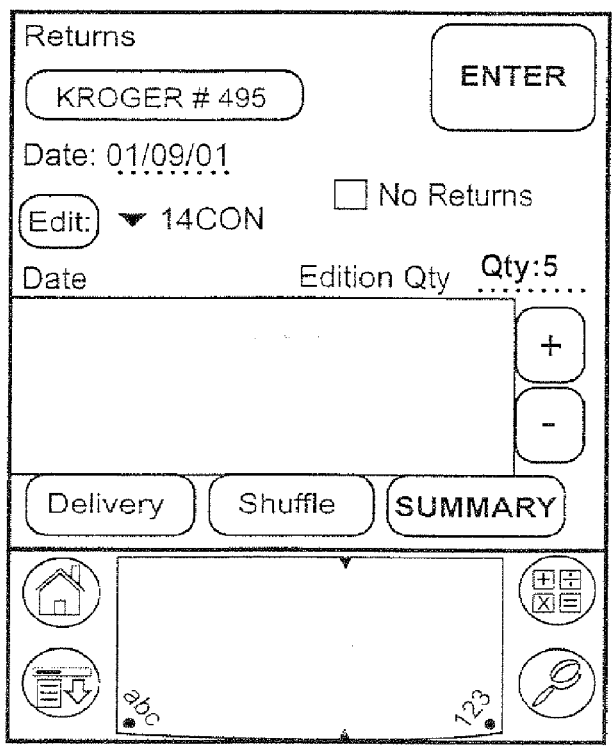

If desired, an additional screen may display special instructions for leaving product at this particular location. FIG. 16Q also shows a "return" button that the delivery person 114 may select to bring up display of a "Returns" screen (FIG. 16R; FIG. 17A block 418). The "returns" screen of FIG. 16R is used to indicate the number of returns from the previous delivery. The "returns" screen shown in FIG. 16R is used to record the return picked up at an outlet or other location. In the exemplary illustrative embodiment, the bar code scanner 122*bcr* is enabled to allow the delivery person 114 to automatically read the product identifier from the products being returned. Alternatively, the delivery person 114 may manually select the day or edition or other product identifier by manipulating the controls of the handheld device 112. The delivery person 114 may also manipulate the "plus" or "minus" displayed buttons to increment or decrement the number of returns to indicate the total number of units of that particular product being taken back (see FIG. 16R). If multiple products are being returned, the "returns" screen will display a list of each individual product being returned and the number of units of each—with the bar code reader 122*bcr* used to identify each different product in the exemplary embodiment.

Figure 16S:
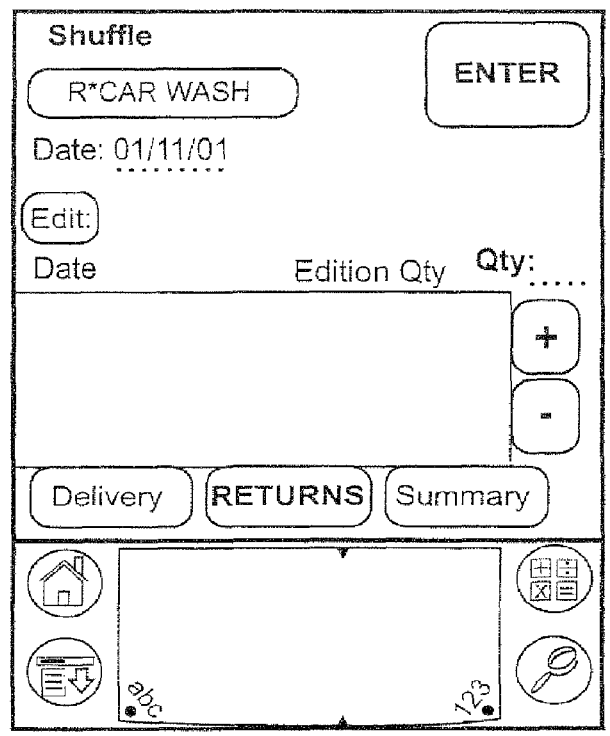

On a "shuffle" run, the FIG. 16S screen is displayed (block 422 of FIG. 17A). This screen is used to "shuffle" current editions between outlets or other locations. In the case of a "shuffle" run, there is no draw displayed since the issue here is how many newspapers or other products are being removed to shift to another location or added to the stock of this particular location (see FIG. 16S). In this example, the bar code scanner 122*bcr* is enabled to recognize automatically the product being shuffled. The day or edition may be changed by the use of a drop down list. The delivery person 114 may specify the number of units being shuffled (positive or negative, meaning that units are being added or taken away) by manipulating the "plus" or "minus" buttons, or by using the barcode scanner 122*bcr* to read the barcode off of each product (thereby counting the number of products). The exemplary illustrative embodiment collects time stamped information as part of this "shuffle" process.

Figure 16T:
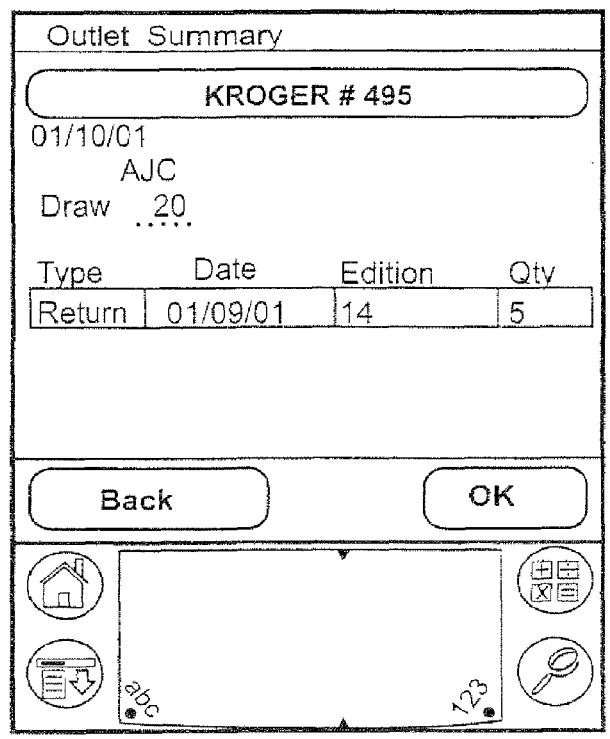
Figure 16V:
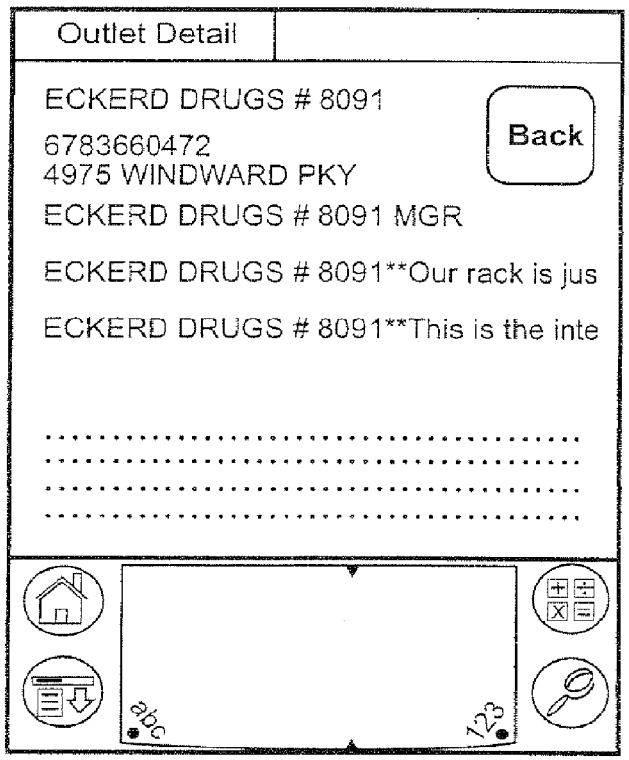
Figure 16W:
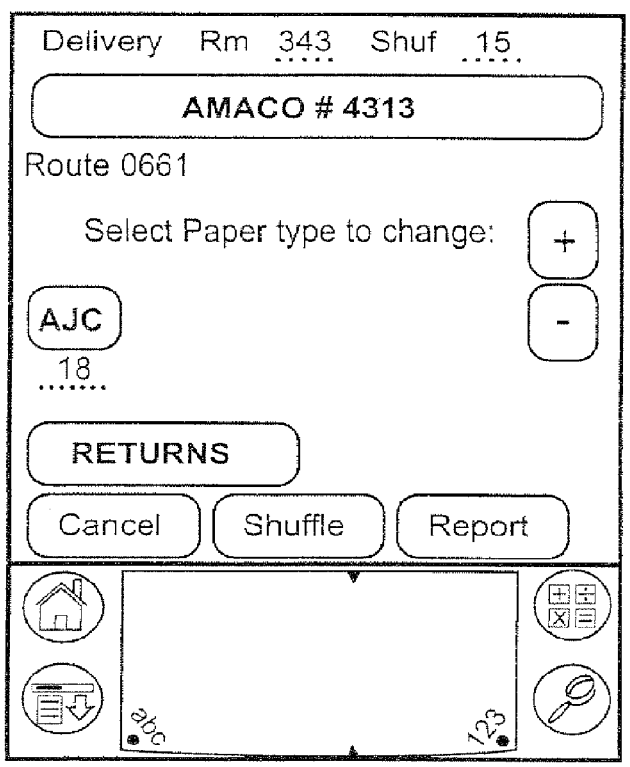
Figure 16X:
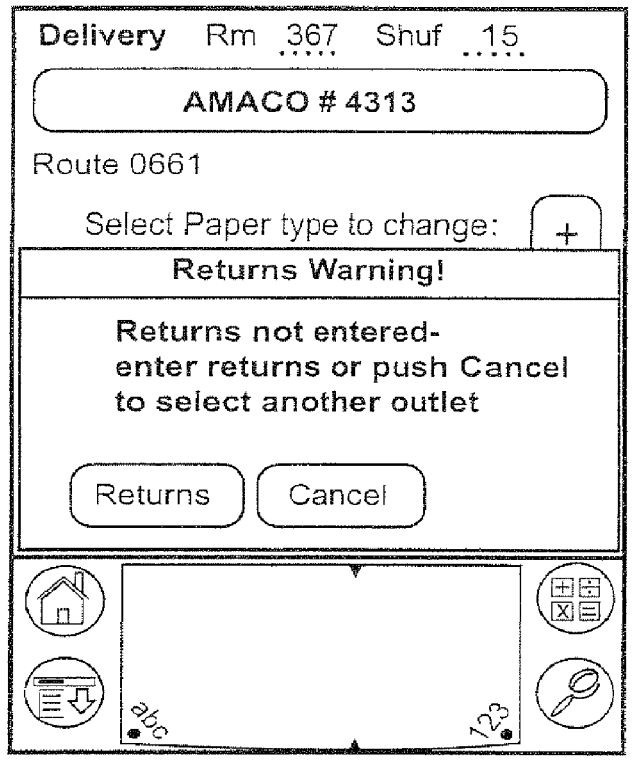
Figure 16Y:
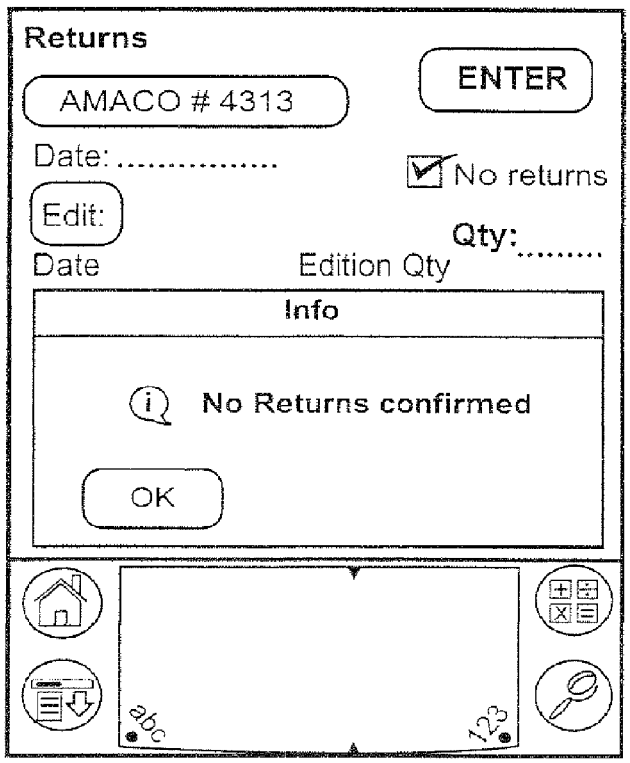
Figure 16Z:
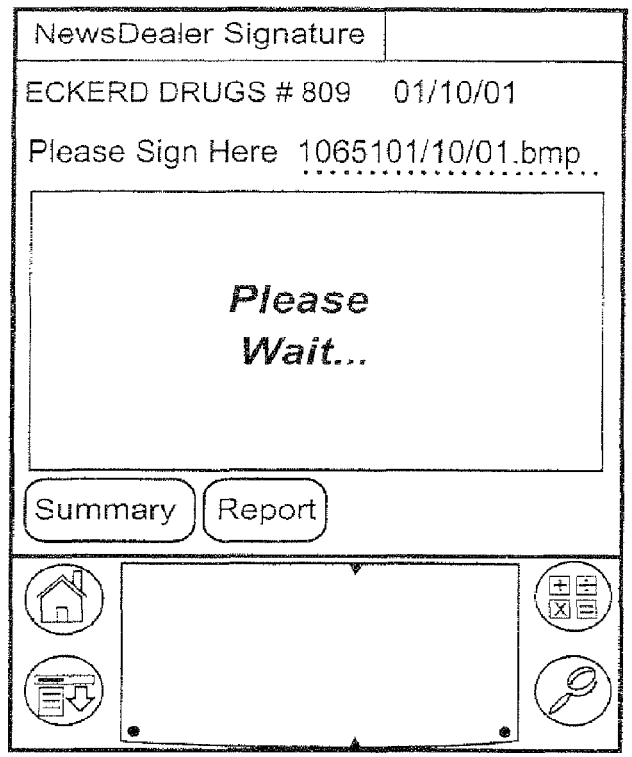
Figure 16A:
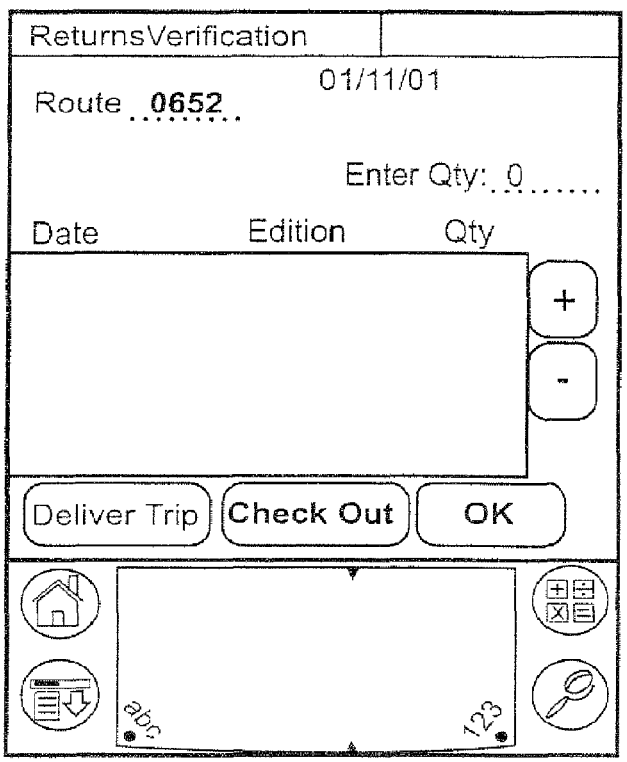
Figure 16A:
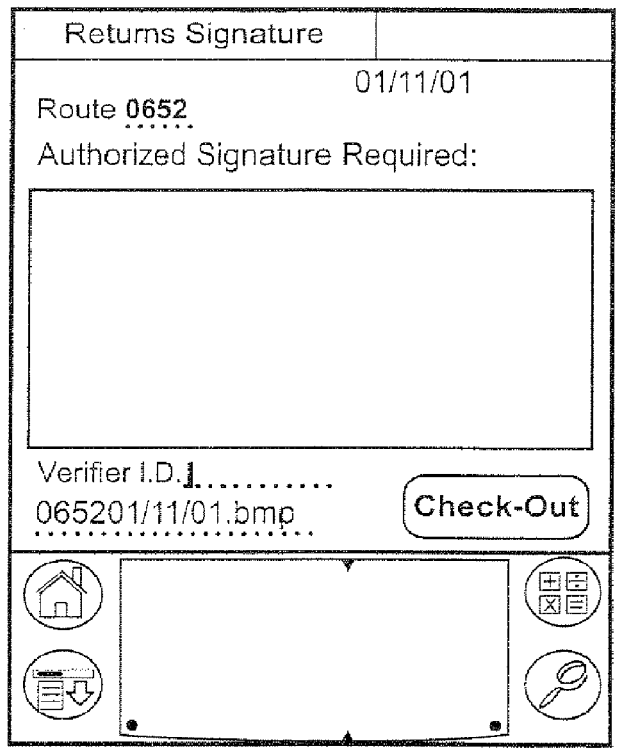
Figure 16A:
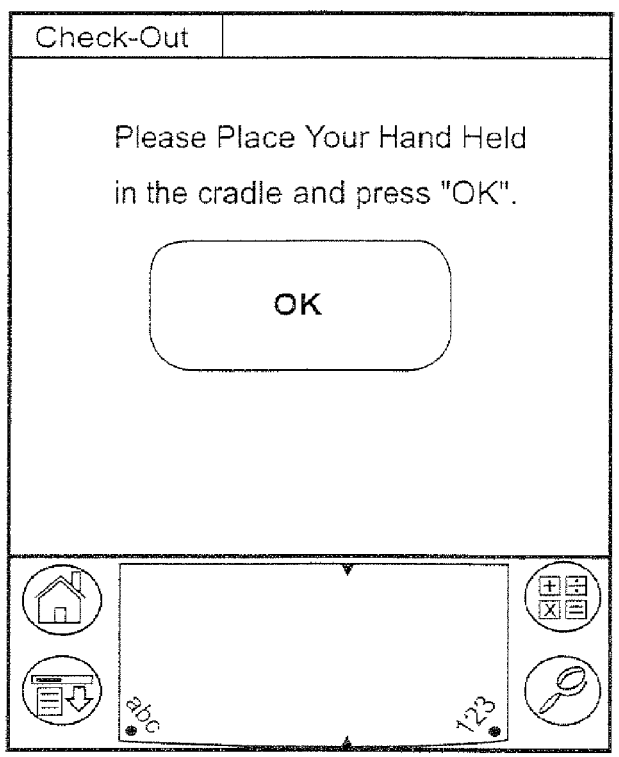

Once these various operations have been completed, the handheld device 112 displays a "outlet summary" display (see FIG. 16T; FIG. 17B, block 422) indicating the current activity for the current outlet or other location. In the exemplary embodiment, the data, edition and quantity is displayed for each product being delivered, returned or shuffled. The delivery person 114 is, in the illustrative embodiment, supposed to show this "outlet summary" screen (FIG. 16T) to a representative of the retail outlet if one is available so that the representative can confirm the counts shown on this screen. If the retail outlet representative disagrees with the information displayed, the delivery person 114 may "back" navigate to earlier screens in order to adjust or correct the information. If the displayed information on screen of FIG. 16T is entirely satisfactory, then the delivery person 114 causes handheld device 112 to display "news dealer signature" screen (see FIG. 16U1; FIG. 17B block 424) that requests the retail outlet representative to sign the display screen of handheld device using a stylus. Upon gathering this signature, the handheld device 112 may display a "please wait" message while the signature is compressed and stored (see FIG. 16U2) and then the handheld device 112 may display a report screen allowing the delivery person 114 to associate a message or comment with this particular delivery (see FIG. 16S).

The delivery person 114 may then leave that particular retail outlet or other location and proceed to the next outlet or other location indicated on the "deliver trip" screen of FIG. 16P. Note that in the exemplary embodiment, the FIG. 16P list of drop locations may be displayed in a particular efficient sequence as formulated by the route managers 110 to provide maximum efficiency in terms of delivering product to locations that open early first and/or geographic convenience depending upon what is desired. However, delivery personnel may scroll to different parts of the deliver trip list and go out of sequence if they desire. Since each delivery is time stamped based on the various screens described above as to when the operations have been completed, the route managers 110 will later be able to determine that the delivery personnel 114 have gone out of sequence and they may be able to inquire into the reasons why and if necessary route sequences to provide increased efficiency and convenience.

FIGS. 16U3, 16U4, 16U5, 16V, 16W, 16x, 16Y, 16Z show exemplary additional screens that may be used to provide returns verification functionality.

Upon completing a trip, in the exemplary illustrative embodiment, the delivery person 114 returns to the delivery depot with the stack of product returns he or she has collected during the trip. Handheld device 112 in the exemplary illustrative embodiment displays a "returns verification" screen (see FIG. 16AA; FIG. 17A block 426) displaying the total number of newspapers which the delivery person is returning to the branch. The current editions as well as shuffle returns are displayed. The delivery person 114 is supposed to show this screen to the branch person responsible for receiving returns before proceeding. That branch person may count the number of returns to be sure that the number of physical returns matches the number of returns indicated on the returns verification screen, and they may then provide a "returns signature" on the returns signature screen (see FIG. 16AB; FIG. 17B block 428) to verify that the correct number of returned units has been provided. A time stamp is collected on the completion of this operation in the illustrative embodiment. The delivery person 114 may then return the handheld device 112 to its cradle or other data communications orientation and request "check out" that prompts the handheld device to upload its collected database information (see FIG. 16AC; FIG. 17B block 430). Once again, the status of the upload may be displayed and a "upload successful" message or error message may be displayed as appropriate.

Exemplary Web-Enable Screen Formats

Figure 25C:
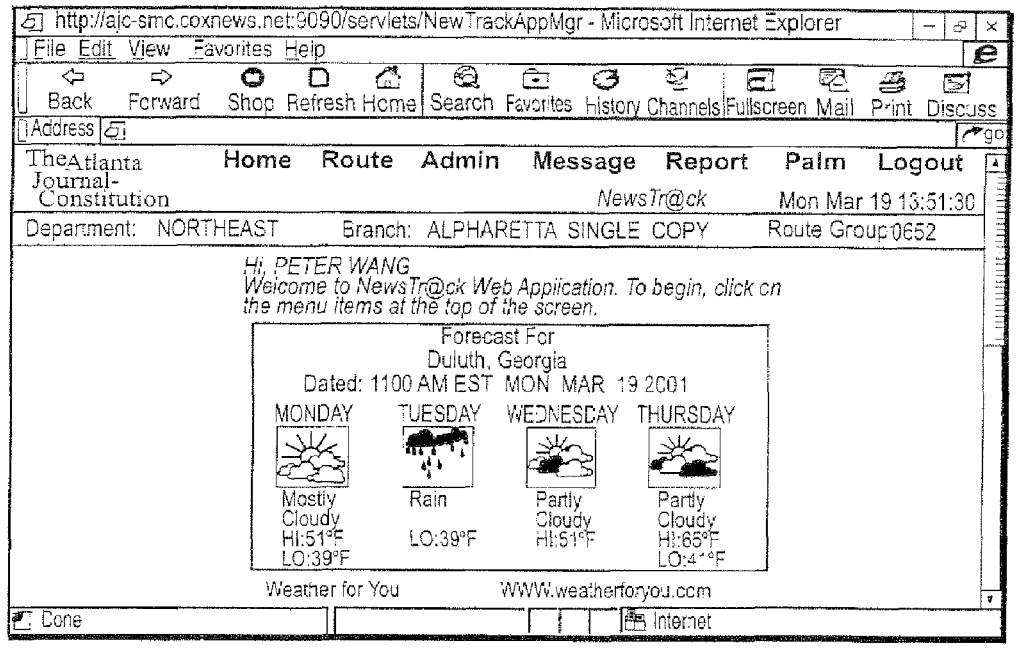
FIGS. 25A-25Z and 25AA-25AG show exemplary web-enabled planning screen formats.
Figure 25D:
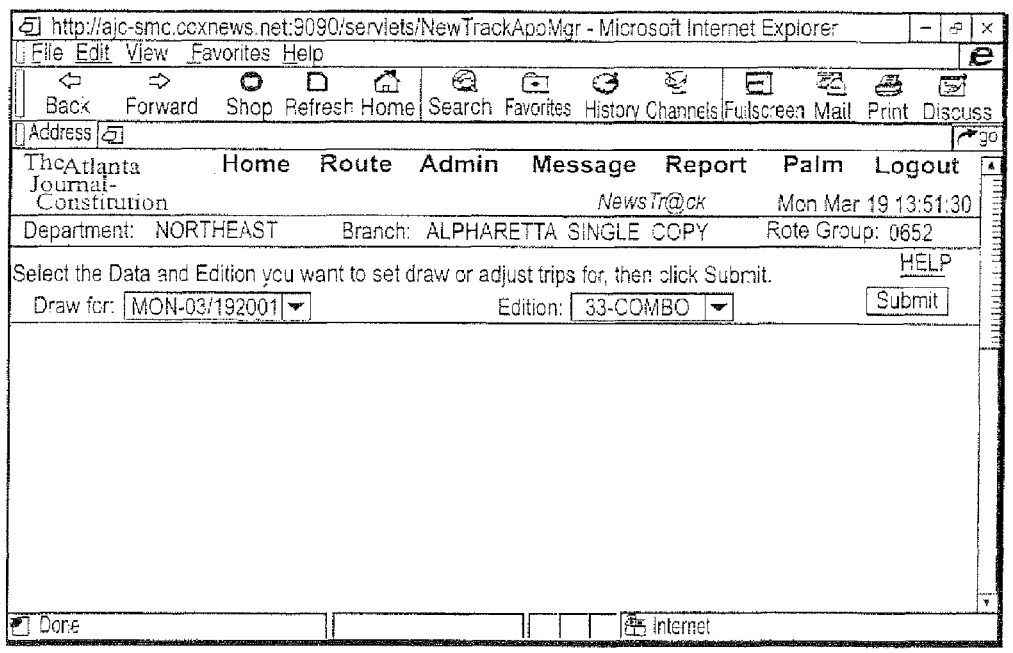
Figures 25G, 25H:
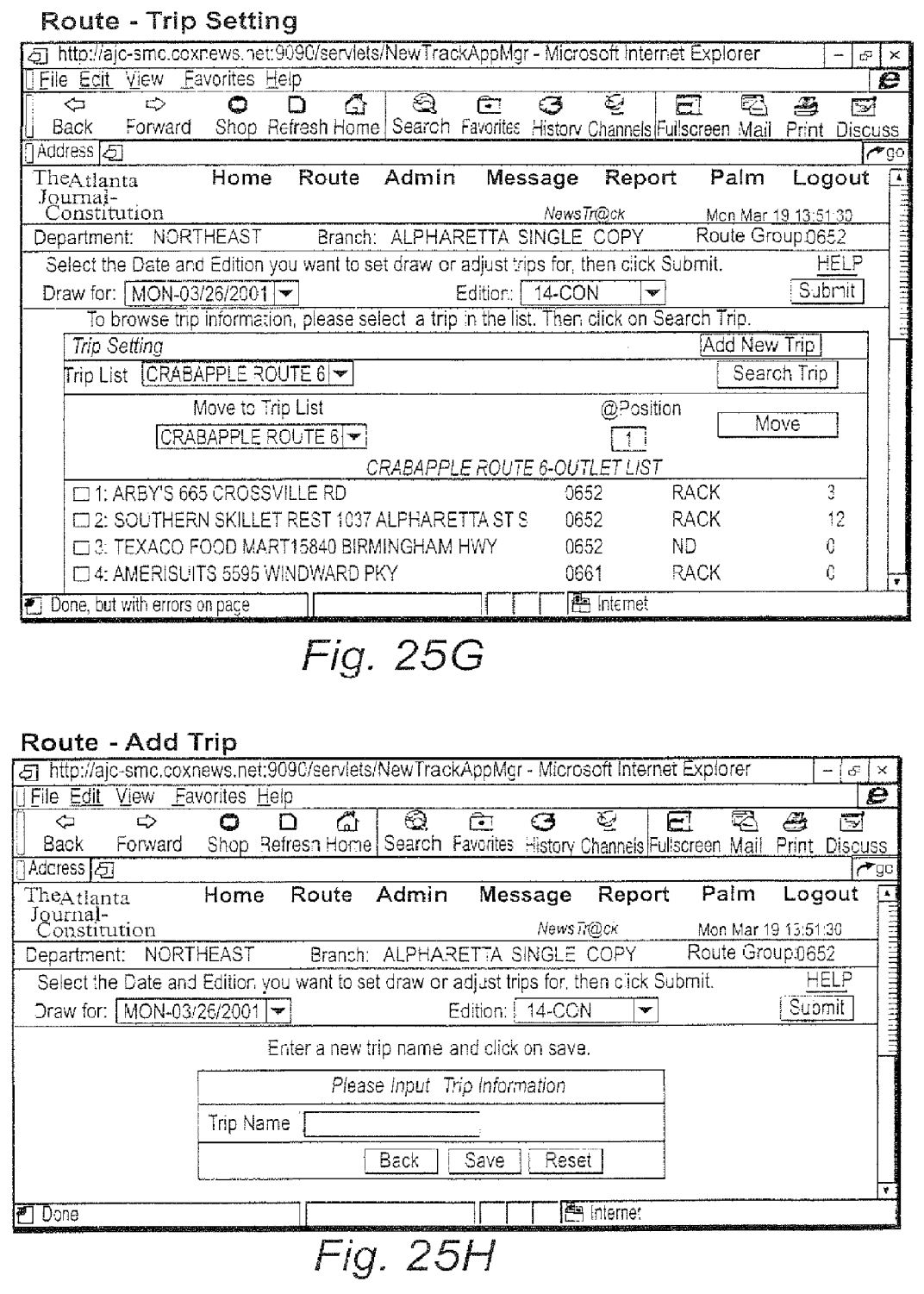
Figure 25K:
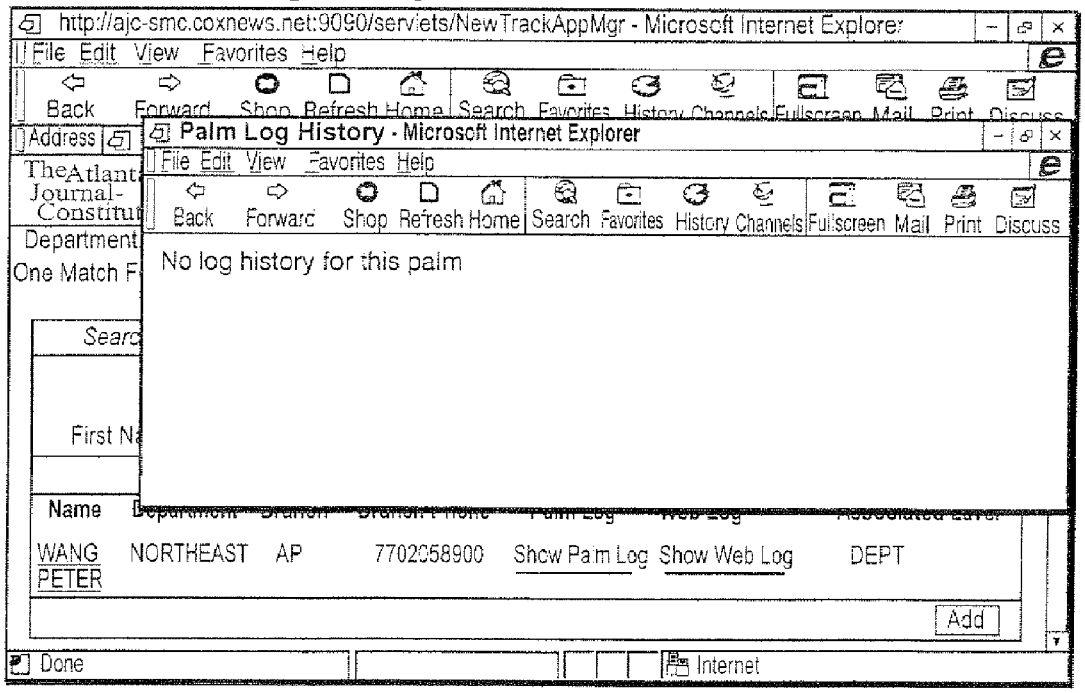
Figure 25L:
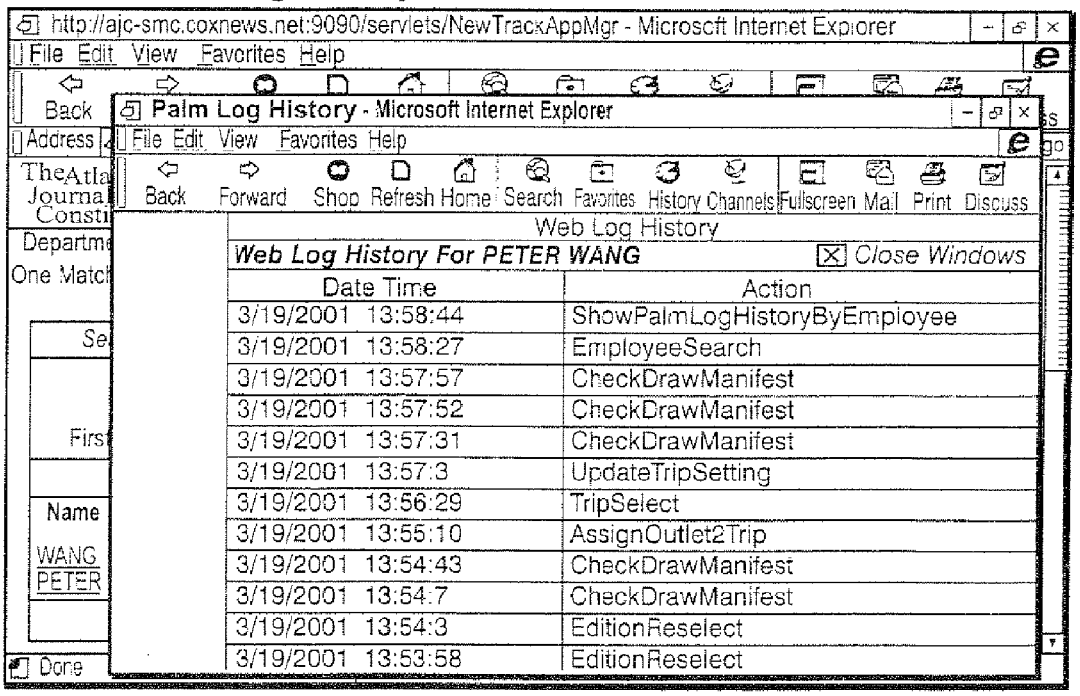
Figures 25U, 25V:
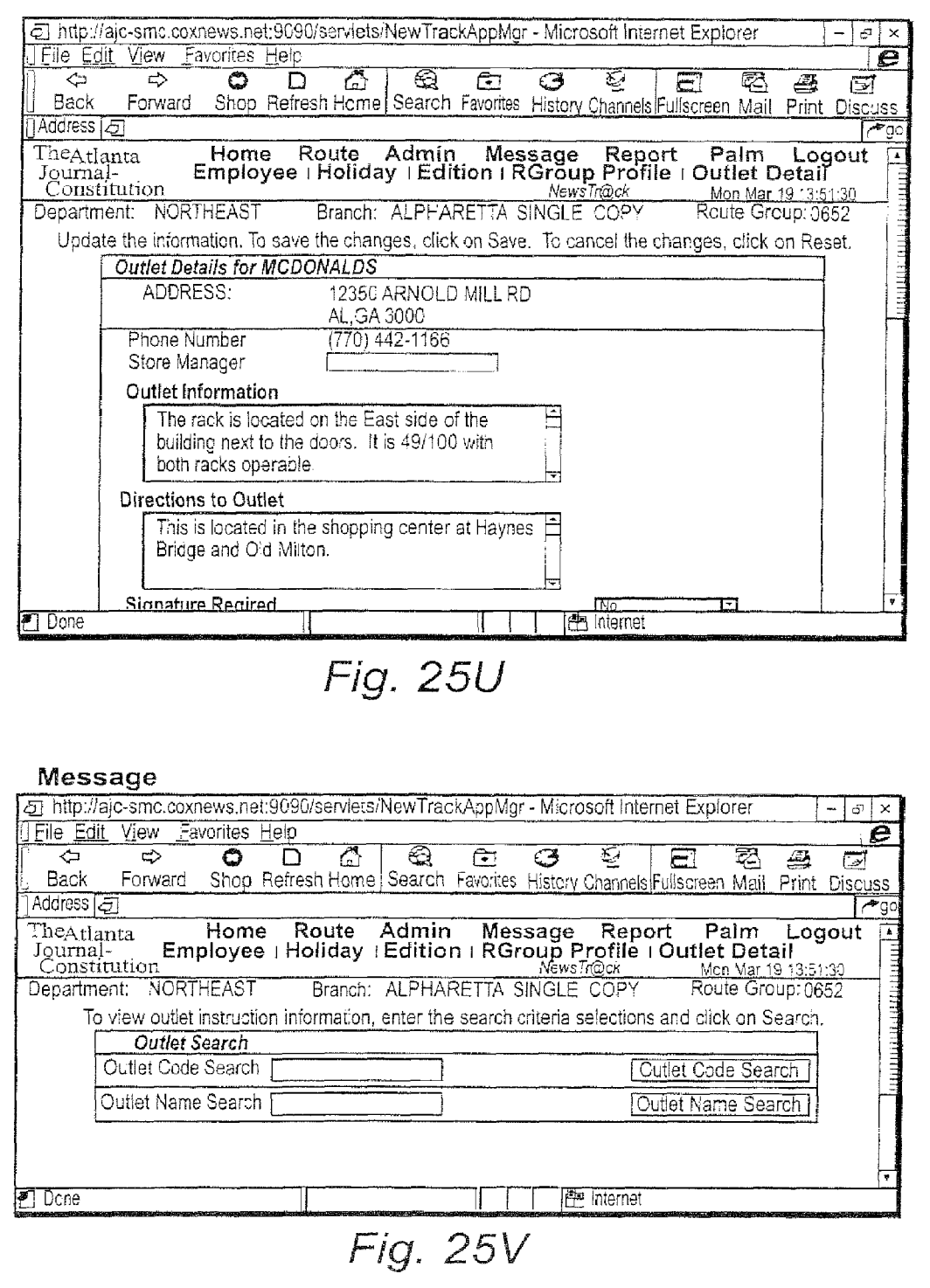
Figures 25Y, 25Z:
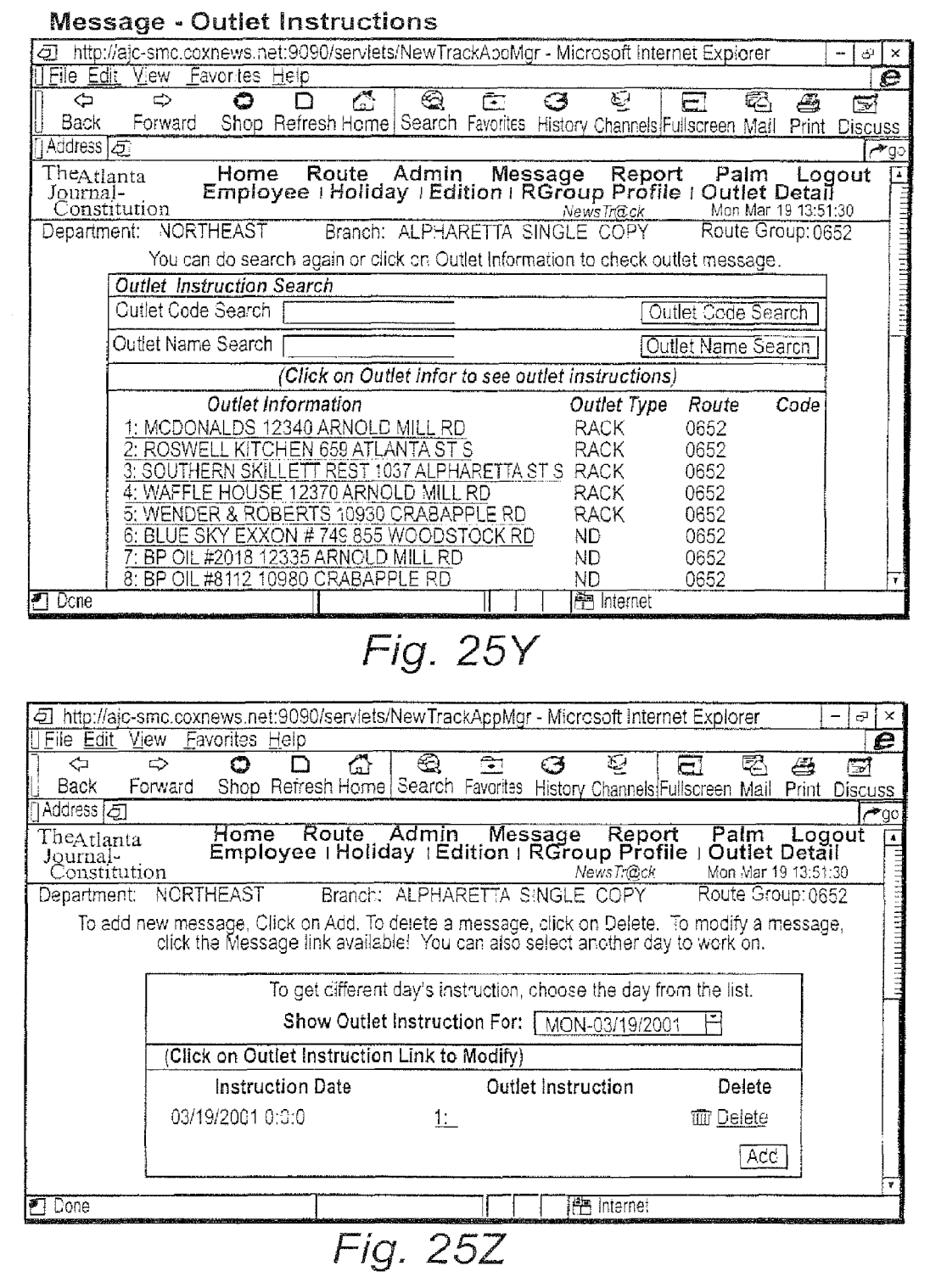
Figure 25A:
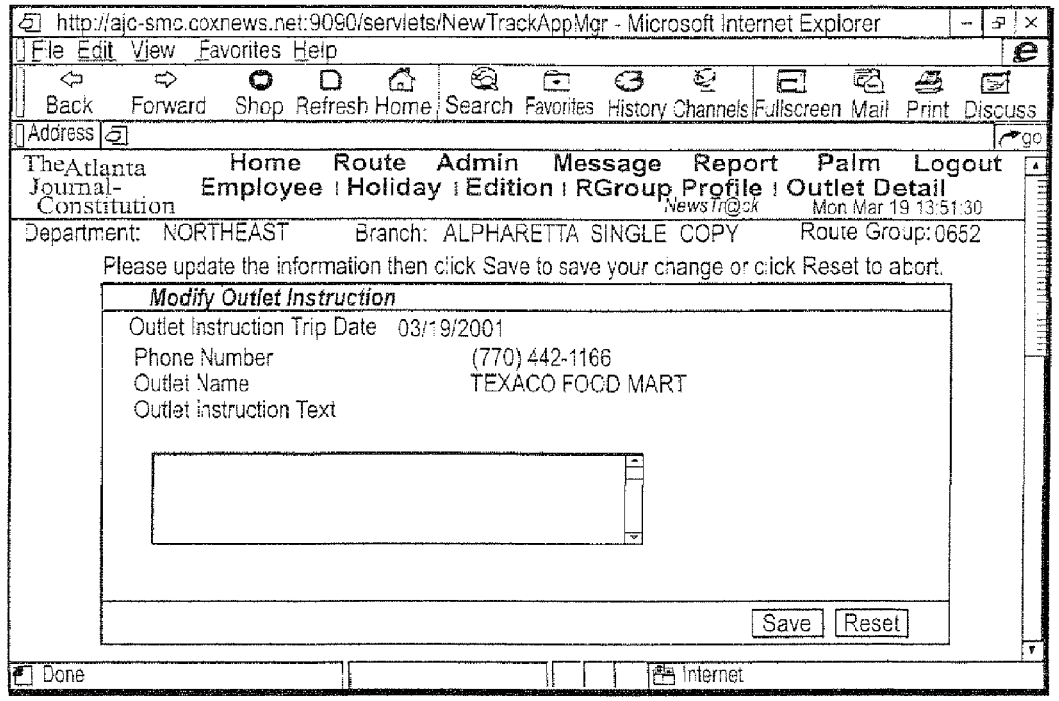
Figure 25A:
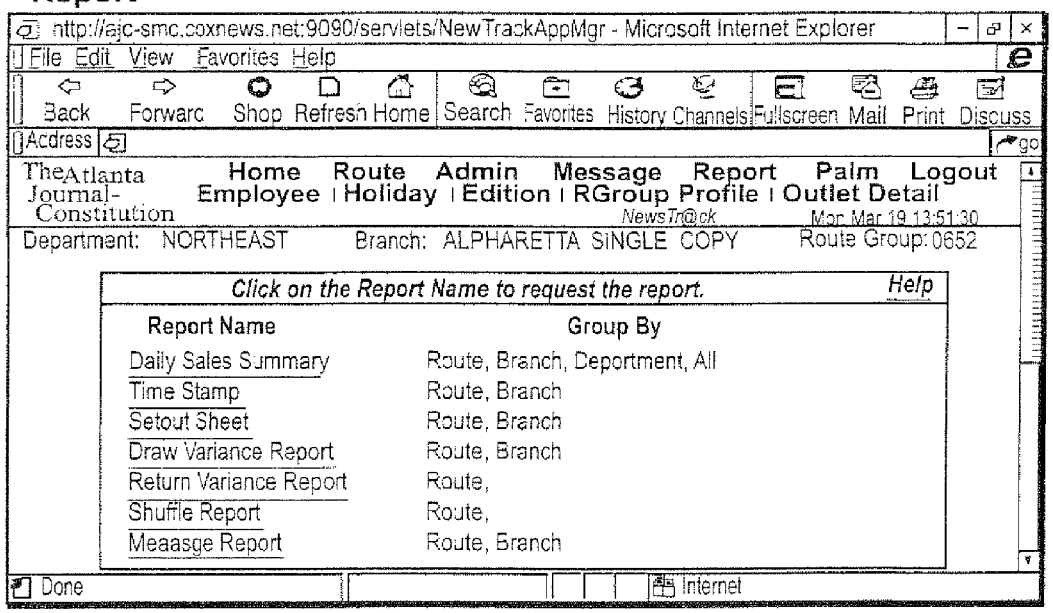
Figure 25A:
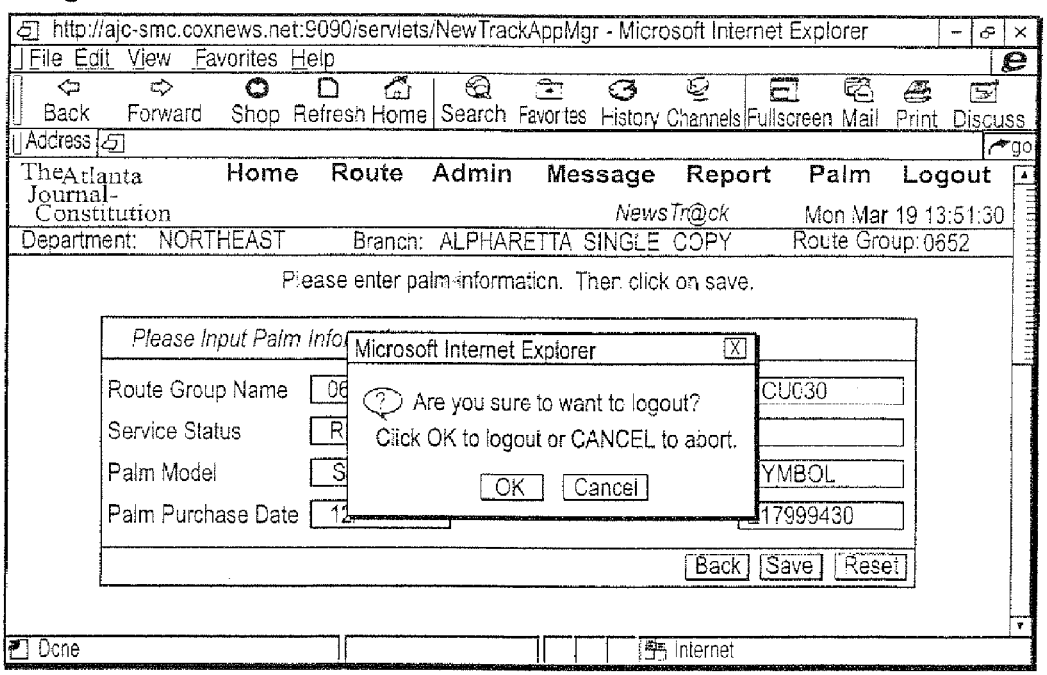

FIGS. 18-24 and 25A-25Z and 25AA-25AG show exemplary illustrative screen formats that computing equipment 106 (application web server 310) causes clients such as web browser appliances 102 to display to assist route managers 110 in planning and analyzing routes. These exemplary screen formats and associated underlying functionality provide the following exemplary functions:

daily sales summary by route report (FIG. 18)
daily sales summary by branch report (FIG. 19)
daily sales by department report (FIG. 20)
route time stamp report (FIG. 21)
branch time stamp report (FIG. 22)
setout sheet report (FIG. 23)
daily draw variance report (FIG. 24)
login (FIG. 25A)
"home" functionality (FIG. 25B)
route management/selection (FIGS. 25C, 25D)
assign new outlet (FIG. 25E)
set draw (FIG. 25F)
trip setting (FIG. 25G)
add trip (FIG. 25H)
administration (FIG. 25I)
employee administration (FIG. 25J)
handheld device history log (FIG. 25K)
web log history (FIG. 25L)
add new employee (FIG. 25M)
modify employee (FIG. 25N)
holiday administration (FIG. 25O)
modify/delete holiday (FIG. 25P)
edition administration (FIG. 25Q)
route Group Profile (FIG. 25R)
outlet detail (FIG. 25S, 25T)
message displays (FIG. 25U, 25V)
field message (FIG. 25W)
add field message (FIG. 25X)
outlet instruction message (FIG. 25Y, 25Z)
report (FIG. 25AA, 25AB)
variance by route report (FIG. 25AC)
handheld device search (FIG. 25AD)
handheld device information (FIG. 25AE, 25AF)
logout (FIG. 25AG)

While the invention has been described in connection with what is presently considered to be the most practical and preferred embodiments, it is to be understood that the invention is not to be limited to the disclosed embodiment. For example, in general, the business applications used in the systems and method described above can relate to deliveries of subscription-based orders of newspapers and other periodicals, deliveries of newspapers and other periodicals to retail outlets for sale on a single-copy basis and deliveries of promotional materials. However, the invention is by no means limited to newspapers and periodicals, but could be used with a wide variety of other perishable or non-perishable goods such as fruits, vegetables, meats, other food products, seasonal goods, goods subject to expiration dates, goods sold on consignment, goods subject to recall, trial goods, or any other type of goods. Additionally, in the typical implementation described above, most subscription, delivery and draw information can be provided from and stored at one or more central locations, but in other embodiments these functions can be distributed geographically and/or across a variety of different computers, databases and/or users. The information stored in databases described herein can be used to set up delivery schedules that could include, for example, the kind and number of newspapers and other periodicals to be delivered, the location of the delivery and the route used to deliver the items, but other types of planning, organizing and functionality could be provided in addition. Collected information can be used to set up billing accounts in the illustrative embodiment, but other arrangements need not include a billing component. With respect to single-copy deliveries to retail outlets, the centrally-stored information may be used to track the disparities between draws and demand, in order to adjust draws to reduce waste and maximize sales, but in other embodiments such tracking need not be performed. On the contrary, the invention is intended to cover various modifications and equivalent arrangements included within the scope of the appended claims.

We claim:

1. A method of providing delivery management services comprising:

using the at least one processor, operating web-enabled computing equipment providing a database and web enabled applications;

using the at least one processor allowing plural users to access said web-enabled computing equipment to define at least plural delivery routes and draws for delivery locations on said plural delivery routes;

using the at least one processor, communicating said delivery routes including draw information to respective remote handheld devices thereby enabling use of said handheld devices to collect delivery draw and return information for said delivery locations on said routes, the handheld devices each providing a user interface enabling delivery personnel to input draw and anal return information at the point of sale;

reporting said collected delivery draw and return information to said computing equipment;

based on said reported delivery draw and return information, using, said at least one processor to compile a draw history database storing at least draw and return information each of said delivery locations on said routes; and using the at least one processor, tracking based on the draw history database, disparities between draws and demand at each of said delivery locations in order to adjust draws for individual delivery locations and the delivery routes to reduce waste and improve sales.

2. The method of claim 1 wherein the handheld devices comprise portable handheld appliances for automatically managing periodical publication delivery to disparately located delivery outlets, said portable handheld appliance at least intermittently connecting to a server arrangement which maintains delivery route instructions and permits remote users using web-enabled appliances to specify and update said delivery route instructions.

3. The method of claim 2 wherein the handheld devices comprise communications interfaces that at least intermittently connect to the server arrangement, said communications interface receiving, from said server arrangement, at least one subset of said delivery route instructions relating to a particular delivery route.

4. The method of claim 1 wherein the handheld devices each comprise a memory device storing said received delivery route instruction subset.

5. The method of claim 1 wherein the handheld devices each comprise a display displaying said received and stored delivery route instruction subset in an order directing a user to stop at a sequence of delivery stops along a route, and the method further comprises presenting said sequence of delivery stops on said display one at a time in an order that maximizes efficiency and reduces fuel consumption.

6. The method of claim 1 wherein the handheld devices each comprise a printed indicia scanner automatically reading and recognizing edition and date information printed on periodical publications without requiring manual data entry.

7. The method of claim 6 wherein the handheld devices each comprise a processor coupled to said indicia scanner, the processor tallying quantities and types of publications or other items delivered and returned on a per-outlet basis based at least in part on information collected using said printed indicia scanner and accounting for shuffle run data representing re-distribution of publications or other items between outlets.

8. The method of claim 7 further including uploading collected information from the handheld devices so remote users can review delivery activity based, at least in part, on collected, tallied quantities and types of publications delivered and returned.

* * * * *